US012723006B2

(12) United States Patent
Xu

(10) Patent No.: US 12,723,006 B2
(45) Date of Patent: Sep. 1, 2026

(54) POLYMER-DERIVED CERAMIC REINFORCED WITH BORON NITRIDE

(71) Applicant: North Carolina State University, Raleigh, NC (US)

(72) Inventor: Chengying Xu, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 954 days.

(21) Appl. No.: 17/658,141

(22) Filed: Apr. 6, 2022

(65) Prior Publication Data

US 2022/0324760 A1 Oct. 13, 2022

Related U.S. Application Data

(60) Provisional application No. 63/174,197, filed on Apr. 13, 2021.

(51) Int. Cl.
*C04B 35/80* (2006.01)
*C04B 35/589* (2006.01)
*C04B 35/626* (2006.01)

(52) U.S. Cl.
CPC ............ *C04B 35/80* (2013.01); *C04B 35/589* (2013.01); *C04B 35/6267* (2013.01); *C04B 2235/3873* (2013.01); *C04B 2235/524* (2013.01); *C04B 2235/5256* (2013.01); *C04B 2235/5284* (2013.01); *C04B 2235/96* (2013.01)

(58) Field of Classification Search
CPC .. C04B 35/80; C04B 35/589; C04B 2235/524
See application file for complete search history.

(56) References Cited

U.S. PATENT DOCUMENTS 5,627,542 A * 5/1997 Paquette .................. H01Q 1/42
501/97.3

FOREIGN PATENT DOCUMENTS

CN 104163619 A * 11/2014
CN 110078517 A * 8/2019 ............. C04B 35/58
WO WO-2009035478 A1 * 3/2009 .............. F42B 10/46

OTHER PUBLICATIONS

CN-104163619-A machine translation (Year: 2014).*
CN110078517A machine translation (Year: 2019).*

* cited by examiner

*Primary Examiner* — Cameron K Miller
(74) *Attorney, Agent, or Firm* — Thomas | Horstemeyer, LLP

(57) ABSTRACT

In one aspect, the disclosure relates to nanocomposite radome materials incorporating boron nitride materials in a polymer derived ceramic matrix. In another aspect, the nanocomposite radome materials have superior electrochemical performance, excellent mechanical strength and stability, corrosion resistance and transparency to electromagnetic radiation, methods of making the same, and articles and components incorporating the same. In one aspect, the nanocomposite radome materials retain functionality in the presence of significant amounts of moisture. This abstract is intended as a scanning tool for purposes of searching in the particular art and is not intended to be limiting of the present disclosure.

19 Claims, 41 Drawing Sheets

FIG. 4A
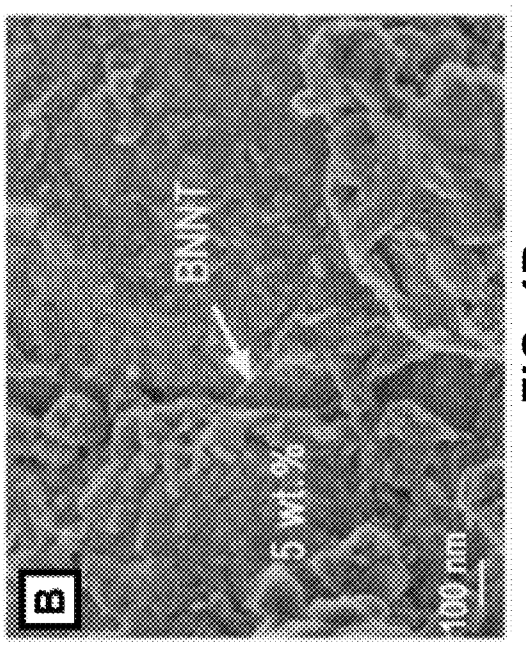
FIG. 4B
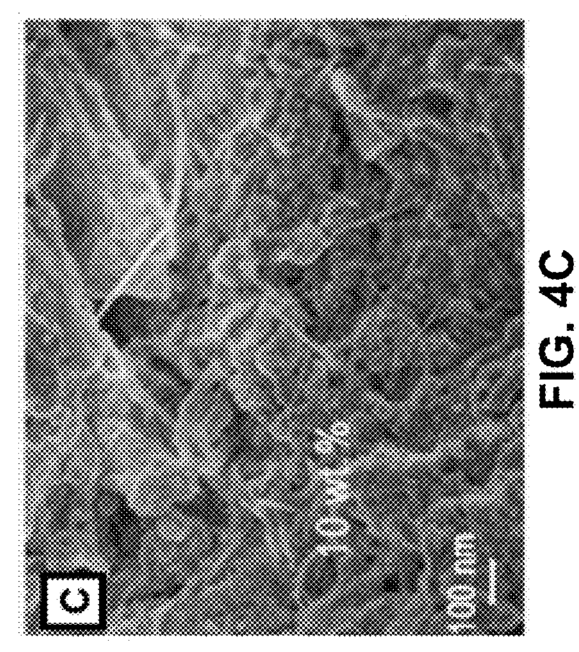
FIG. 4C
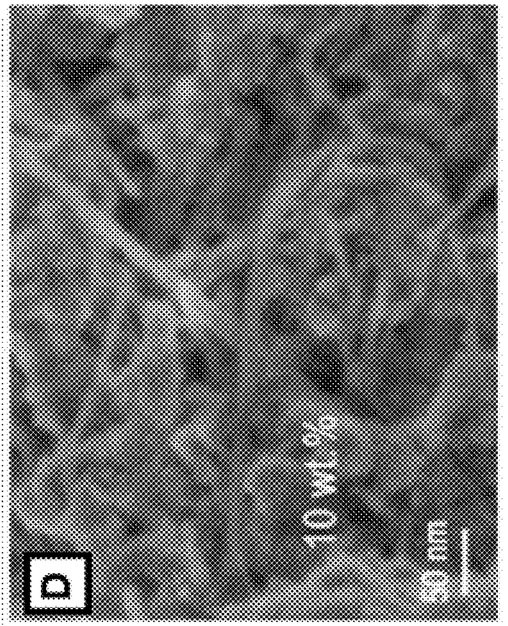
FIG. 4D

POLYMER-DERIVED CERAMIC REINFORCED WITH BORON NITRIDE

CROSS REFERENCE TO RELATED APPLICATIONS

This application claims the benefit of U.S. Provisional Application No. 63/174,197 filed on Apr. 13, 2021, which is incorporated herein by reference in its entirety.

BACKGROUND

High speed aerospace systems, particularly hypersonic systems, require the use of an RF radome window to protect sensitive electronics from the aggressive aerothermal environment of high speed flight while providing transparency to the RF electromagnetic energy used for guidance, communication, and sensing. These aperture materials are subjected to extreme thermal, mechanical, and chemical environments with oxidation during hypersonic flight that can limit the performance of the aperture and/or the platform. For example, shock waves and high heat loads produced during flight impart wavefront distortions and boresight errors upon guidance electronics, while aerothermal mechanical loads challenge aperture integration into flight vehicle aerostructures. As such, current hypersonic aperture implementations are constrained by their interdependent materials response to the high heat loads and dynamic stress states of hypersonic flight.

The space environment contains major hazards to space travel, among which are space radiation and micrometeoroid and orbital debris (MMOD). Space radiation consists mainly of electrons and protons, solar energetic particles (SEP), and galactic cosmic radiation (GCR). GCR is composed primarily of nuclei (fully ionized atoms) plus a small contribution (~2%) from electrons and positrons. There are a small but significant number of GCR particles with high atomic number (Z>10) and high energy (E>100 GeV). These high energy, high charge (HZE) particles comprise only 1% to 2% of the total GCR fluence, but they interact with very high specific ionizations and thus contribute about 50% of the long-term space radiation dose in humans. The GCR particles, which are positively charged, interact with materials mainly by Coulomb interactions with the negative electrons and positive nuclei in the materials and to a much smaller extent by collisions with atomic nuclei in the materials. For these reasons, the energy loss of the GCR particles increases approximately with the charge-to mass ratio of the materials. Additional radiation hazards come from neutrons and gamma rays produced in nuclear collisions and from X-rays arising after Coulomb interactions. Current solutions include the use of aluminum alloys for primary structures, retrofitted with polyethylene or water ($H_2O$) for radiation shielding. However, aluminum alloys may be heat sensitive and lack of the mechanical strength of other structural materials, especially under conditions of repeated exposure to fatigue.

Wave-transparent materials have attracted attention in the previous few decades as these types of materials are important to the manufacturing of antenna housings in order to protect the radar antenna system from the surrounding medium. In general, qualified wave-transparent materials possess two characteristics of low dielectric permittivity ($\varepsilon<4$) and low loss tangent (tan $\delta$: $10^{-2}$-$10^{-3}$) to reduce energy consumption. Wave-transparent polymer and ceramic materials are two main categories that are widely used in radio systems of hypersonic aircraft, reentry vehicles, high-speed missiles, and other devices. Compared to polymeric composites, the wave-transparent ceramic materials have additional unique advantages of a high melting point, abrasion resistance, atmospheric corrosion resistance, and more stable properties in harsh environments. For example, zinc sulfide (ZnS) has been used as a long-wave infrared antenna window material since the 1960s. However, harsh demands from the operating environment and the requirement for weight reduction show a need for lightweight, wave-transparent performance materials that combine the advantages of both ceramic and polymeric materials.

Boron nitride nanotubes (BNNTs), which are cylinders with sub-micrometer diameters and micrometer lengths, have attractive properties including the combination of low dielectric constant and high modulus of elasticity. BNNTs have been applied as a reinforcement material to make ceramic composites with exceptional thermal and dielectric composite materials. BNNTs are low-k dielectric materials with relative dielectric constants ranging from 1.0 to 1.1 (50 Hz to 2 MHz) and an elastic modulus of 10 MPa. However, based on the potential applications of wave-transparent materials in high-speed missiles, the remarkably high thermal conductivity (21.39 W/mK at 25 wt. % BNNTs) may limit its further applicability in this field.

Glass-ceramic, a novel polycrystalline solid material, is made of microcrystalline and amorphous phases. Silicon oxynitride (SiON) belongs to glass-ceramic, and its ultra-low thermal conductivity ((1.1-1.4 W/mK) and relative dielectric constant (3.7-3.9) may compensate the shortcomings that BNNTs possess. Typically, SiON powders can be synthesized through the reaction between silica powders and ammonia. However, the content of nitrogen incorporation during the reaction cannot be controlled accurately, and thus the quality of the resultant SiON product is unstable. Moreover, these formation methods are costly and complex.

Polymer derived ceramics (PDCs) are class of ceramics that can be synthesized by direct thermal decomposition of liquid, melt, or organic solution polymeric precursors. Different from conventional ceramics, properties of PDCs can be tuned by tailoring the chemical composition upon heat treatment. Additionally, PDCs are known to possess good oxidation resistance and creep resistance at high temperatures. The PDCs (often contained free carbon) with or without fillers were often designed for EM absorption or shielding materials because their conductivity is tunable when the pyrolysis temperature is changed. However, there has been limited research on the application of PDCs as EM transparent materials. In addition, PDCs also suffer from low thermal shock resistance due to their brittle performance in the harsh environment.

Radome materials used in harsh working environments require low relative permittivity and excellent resistance to thermal shock. Electromagnetic (EM) waves should not be altered significantly when transmitting through these materials, which requires the real relative permittivity ($\varepsilon'$) and the loss tangent (tan $\delta$) of the materials to be within a limited level as $\varepsilon'$=1-5 and tan $\delta\leq0.01$.

Common EM transparent materials used in harsh working environments are ceramics such as $SiO_2$, boron nitride (BN and/or h-BN), and $Si_3N_4$. However, $SiO_2$ and BN ceramics suffer from poor thermal shock resistance, while the $Si_3N_3$ ceramic has high real relative permittivity of 9.0, which limits their wide application. Therefore, searching for new ceramic composites that can meet the stringent demand has become an urgent requirement for developing EM transparent materials.

Despite advances in radome materials research, there is still a scarcity of materials having superior thermal stability and thermal conductivity, excellent electrochemical performance, and transparency to electromagnetic radiation in harsh working environments. An ideal radome material would further be resistant to radiation hazards outside the Earth's environment such as, for example, solar energetic particles, galactic cosmic radiation, neutrons, gamma rays, and X-rays. Further, an ideal radome material would exhibit superior mechanical, thermal, and chemical stability in harsh environments. These needs and other needs are satisfied by the present disclosure.

SUMMARY

In accordance with the purpose(s) of the present disclosure, as embodied and broadly described herein, the disclosure, in one aspect, relates to nanocomposite radome materials incorporating boron nitride materials in a polymer derived ceramic matrix. In another aspect, the nanocomposite radome materials have superior electrochemical performance, excellent mechanical strength and stability, corrosion resistance and transparency to electromagnetic radiation, methods of making the same, and articles and components incorporating the same. In one aspect, the nanocomposite radome materials retain functionality in the presence of significant amounts of moisture.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 3A, 3D-3G: pristine PDC (PB0). FIGS. 3B, 3L: PDC with 10 wt. % BNNTs (PB10). FIGS. 3C, 3H-3K: PDC with 25 wt. % BNNTs (PB25).

FIGS. 4A-4H show morphology analysis of BNNT-PDC nanocomposites reinforced with different fractions of BNNTs. Scanning electron microscope (SEM) images for FIG. 4A: 0 wt. %, FIG. 4B: 5 wt. % (PB5), FIGS. 4C-4D: 10 wt. %, FIGS. 4E-4F: 25 wt. %. FIGS. 4G-4H: Transmission electron microscope (TEM) image of the PDC nanocomposites reinforced with 25 wt. % BNNTs. The inset of FIG. 4G is the corresponding selected area electrodiffraction (SAED). The inset of FIG. 4H is the Fast Fourier Transform (FFT) of the framed area.

FIG. 5A: density, FIG. 5B: flexural strength, FIG. 5C: hardness, FIG. 5D: toughness of the BNNT-PDC nano-composites.

FIG. 7 (bottom) shows quality factor of PDC-BNNT with various weight fractions.

(FIG. 18A) real permittivity and (FIG. 18B) imaginary permittivity; and (FIG. 18C) loss tangent of pure BNNTs, PHPS-derived SiON, SiON/BNNTs samples (thickness ~6 mm) at frequencies of 26.5-40 GHz measured at room temperature, showing good electromagnetic wave-transparent performance.

FIGS. 23E-23F are the Fast Fourier Transform (FFT) of the selected area A and B in FIGS. 23C-23D, respectively. Insert of FIG. 23A is the Raman spectra of Pristine BNNTs showing h-BN peak. The SEM image, TEM image and XRD pattern after oxidation are obtained after polishing the surface of the nano-composites.

Figure 1A:
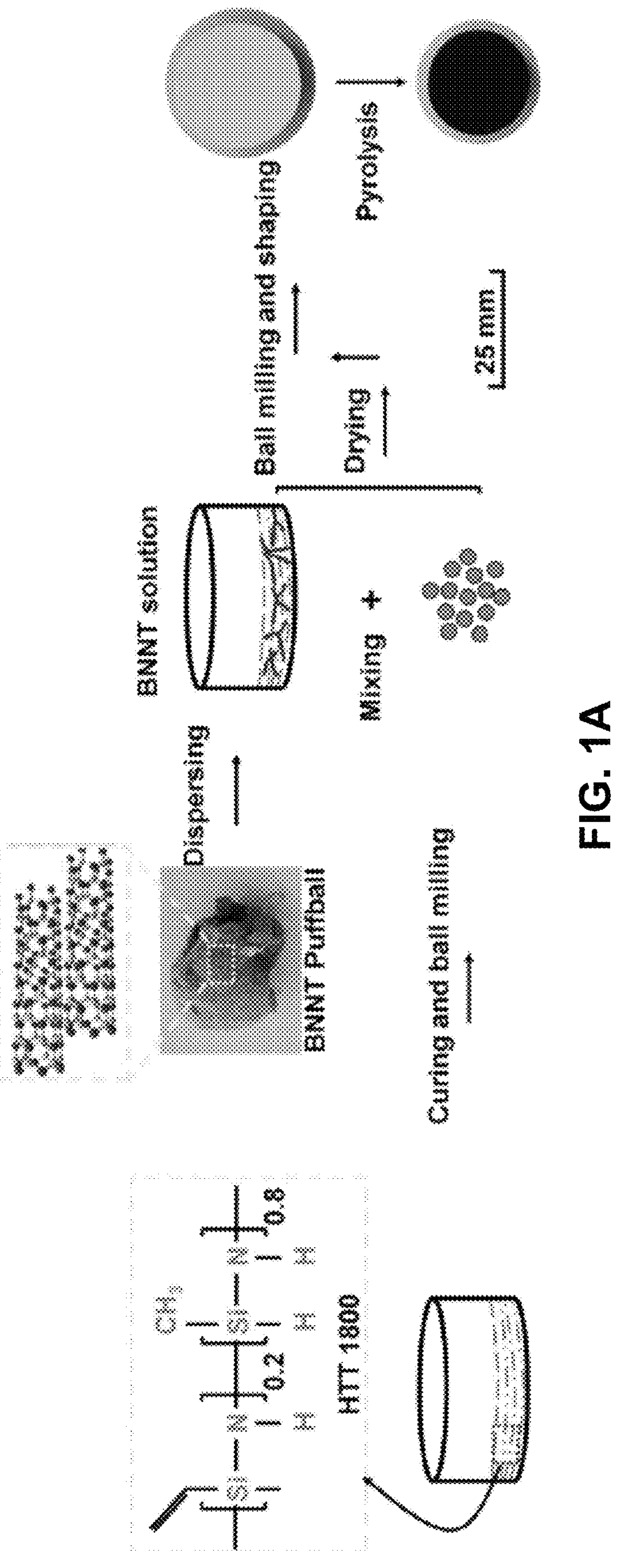
FIGS. 1A-1D show schematics of exemplary fabrication processes for boron nitride-PDC nanocomposites.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Currently, radome materials are typically made from polymers and have limited application temperatures. Disclosed herein are radome materials constructed from ceramics that can operate sustainably at high temperatures and in other extreme environments. In one aspect, the disclosed materials have advantageous properties such as, for example, electrical insulation, mechanical properties, thermal properties, resistance to nuclear radiation, and the like. In another aspect, the disclosed materials can be used in other applications including, but not limited to, use in batteries, use in the aerospace industry, and the like.

In one aspect, typical radio frequency (RF) transparent materials are designed to have favorable electrical properties through chemical doping, skin coating, or intricate geometrical design (e.g., layered structures, porous structures, honeycomb structures, etc.). Such conventional dielectric materials are often bottlenecked by mechanical strength and operating temperatures, limiting their use in environments such as encountered by hypersonic vehicles or spacecraft, or inside a gas turbine. In another aspect, the monolithic ceramic materials used today normally exhibit high dielectric constants at high temperature and are used at the cost of significant attenuation to incoming and outgoing radio signals.

In one aspect, the materials and compositions disclosed herein can be used in high temperature, high pressure, and radioactive environments while maintaining favorable RF transparency for use as a window tile or other covering material for radome applications. In a further aspect, radio communications can easily pass through the disclosed materials and compositions with minimum gain loss and phase distortion.

Hypersonic Radome Applications

In one aspect, high speed aerospace systems require the use of an RF radome window to protect sensitive electronics from the aggressive aerothermal environment of high speed flight while providing transparency to the RF electromagnetic energy used for guidance, communication, and sensing. In another aspect, aperture materials are subjected to extreme thermal, mechanical, and chemical environments with oxidation during hypersonic flight. Further in this aspect, these environmental stresses can limit the performance of the aperture and/or the platform. In another aspect, shock waves and high heat loads produced during flight impart wavefront distortions and boresight errors upon guidance electronics, while aerothermal mechanical loads challenge aperture integration into flight vehicle aerostructures.

In one aspect, polymer derived ceramics (PDCs) are a class of ceramics that can be synthesized by direct thermal decomposition of liquid, melt, or organic solution polymeric precursors. In another aspect, the properties of PDCs can be tuned by tailoring the chemical composition upon heat treatment. In some aspects, PDCs are known to possess good oxidation resistance and creep resistance at high temperatures. In some aspects, PDCs (often containing free carbon) with or without fillers have been used in designs for EM absorption or shielding materials because their conductivity is tunable when the pyrolysis temperature is changed. However, in another aspect PDCs suffer from low thermal shock resistance due to their brittle performance in the harsh environments to which they are exposed during use, including during hypersonic flight.

In one aspect, boron nitride materials, including, but not limited to, boron nitride nanotubes (BNNTs), have a wide-band gap and a similar structure to carbon nanotubes (CNTs). In another aspect BNNTs and other boron nitride materials have attractive properties, such as, for example, excellent mechanical properties and high thermal conductivity, and hydrogen storage capability. In still another aspect, BNNTs and other boron nitride materials also show significant superiority in thermal and chemical stability compared to CNTs in air. In some aspects, boron nitride materials including, but not limited to, BNNTs possesses perfect electrical insulation and superb oxidation resistance, which can be used to adjust the real relative permittivity, dielectric loss tangent of materials. In one aspect, then, BNNTs and other boron nitride materials therefore are excellent candidates for reinforcing polymers, ceramics, and metals, including for use in hypersonic flight applications and other aerospace applications.

In one aspect, provided herein is a method for reducing costs and effort involved in the formation of SiON. In a further aspect, the use of polymer derived ceramics (PDCs) allows the thermal processing of ceramic materials to be carried out at a relatively low temperature such as, for example, room temperature. In another aspect, the material referred to as PDCs allows the tailoring of polymeric precursors to produce elaborate shapes and alter their phase compositions. In an aspect, one kind of preceramic polymer called perhydropolysilazane (PHPS), has a repeated structure of $[-H_2Si-NH-]_n$ and can be converted into SiON or $SiO_2$ under nitrogen and air conditions, respectively. In a further aspect, the molar ratio of x and y in $SiO_xN_y$ is dependent on the annealing temperature and conditions. In still another aspect, differently from other PDC materials with an annealing temperature over 1000° C., PHPS has a unique ability to convert into amorphous SiON ceramics at or close to room temperature during the liquid-to-ceramic transformation.

In one aspect, disclosed herein are nanocomposite radome materials useful for hypersonic flight and aerospace applications. In another aspect, these materials include polymer derived ceramics reinforced with boron nitride. Also disclosed are processes for making the nanocomposite radome materials and radome structures made using the nanocomposite radome materials.

Exemplary Applications of the Nanocomposite Radome Materials

Radiation Shielding Applications

In another aspect, the disclosed nanocomposite radome materials can be useful for various radiation shielding applications, including in space flight applications conducted outside the Earth's atmosphere. For example, in one aspect, space radiation consists mainly of electrons and protons, solar energetic particles (SEP), and galactic cosmic radiation (GCR), and, in another aspect, a small but significant number of GCR particles with high atomic number ($Z>10$) and high energy ($E>100$ GeV). In one aspect, while these high energy, high charge (HZE) particles comprise only 1% to 2% of the total GCR fluence, they interact with very high specific ionizations and thus contribute about 50% of the long-term space radiation dose in humans. In another aspect, the energy loss of the GCR particles increases approximately with the charge-to mass ratio of the materials. Further in this aspect, hydrogen, with the highest charge-to-mass ratio of any element, provides the best shielding; thus, hydrogen containing polymers make the most suitable candidates for shielding. In a further aspect, additional radiation hazards come from neutrons and gamma rays produced in nuclear collisions and from X-rays arising after Coulomb interactions.

In one aspect, hydrogen is effective at (1) fragmenting heavy ions such as are found in galactic cosmic radiation (GCR), (2) stopping protons such as are found in solar particle events (SPE), and (3) slowing down neutrons such as are formed as secondaries when the GCR and SPE interact with matter. However, in another aspect, hydrogen by itself is not a structural material. In an aspect, polymers such as polyethylene, with its empirical formula of $-CH_2-$, contains a high percentage of hydrogen and is a solid material, but does not possess sufficient strength for load bearing aerospace structural applications.

In one aspect, boron nitride nanotubes and other boron nitride materials have extraordinary strength and high temperature stability. In another aspect, boron nitride materials are made up entirely of low Z (atomic number) atoms—boron and nitrogen. In another aspect, boron ($Z=5$) and nitrogen ($Z=7$) are larger than hydrogen ($Z=1$), but both are smaller than aluminum ($Z=13$). In one aspect, boron nitride materials can be processed into structural boron nitride materials, including structural BNNT. In another aspect, structural BNNT are thermally stable up to 800° C. in air and can be used for load bearing structures. In a further aspect, since the BNNT and other boron nitride materials are molecules, they can be incorporated into high hydrogen polymers and, in some aspects, the resulting combination can be used as matrix resins for structural composites. In one exemplary aspects, as nanotubes, BNNT have a useful molecular structure for hydrogen storage.

In yet another aspect, boron has one of the largest neutron absorption cross sections of all the elements of the periodic table, and nitrogen has a larger neutron absorption cross section than carbon. In an aspect, the neutron absorption cross section for the isotope $^{10}B$ is 3835 barns, so enriching the BNNT or BN (boron nitride) with $^{10}B$ would produce even better protection against neutrons. In an aspect, neutrons are produced as secondary radiation when the GCR and solar energetic particles (SEP) interact with the walls of space structures (vehicles, landers, habitats, and the like) and also with regoliths on the surfaces of the moon or planets. In a further aspect, this secondary neutron radiation has largely been ignored in previous space architectures, and yet neutron radiation is known to be damaging to humans, especially with regard to the formation of radiogenic cancers.

In an aspect, disclosed herein are nanocomposite radome materials that are also useful as multifunctional radiation shielding structural materials for future space exploration architectures. In a further aspect, these nanocomposite radome materials can be used as space radiation shielding materials having high efficacy for shielding all types of radiation while also having high strength for load bearing primary structures. In another aspect, the same materials and shielding principles are applicable for nuclear reactor applications for shielding nuclear irradiation.

Thermal Management Applications

In some aspects, carbon nanotubes (CNTs) have been used in thermal management applications. However, in another aspect, CNTs have oxidation resistance in air only up to about 400° C. and can be substantially burnt off above 700° C. In one aspect, BNNTs and other boron nitride materials display superior thermal and chemical stabilities when compared to CNTs.

In one aspect, BNNTs and other boron nitride materials have high thermal conductivity (~200 W/m·K). In a further aspect, this property makes BNNTs and other boron nitride materials ideal reinforcements for improving the thermal conductivity of composites used in applications in harsh environments. In a further aspect, the nanocomposite radome materials disclosed herein display increasing thermal conductivity with increasing boron nitride content. In an aspect, an exemplary BNNT-PDC nanocomposite (having 35.4 vol % BNNT) at room temperature had a thermal conductivity of 4.123 W/m·K, a 2100% increase over pristine PDC.

Additional Applications

In one aspect, the disclosed materials can be used in additional applications, particularly in extreme environments, where materials having the desired thermal, mechanical, and electrochemical performance may be useful. In a further aspect, the additional applications can include, but are not limited to, batteries, aerospace applications, coatings, gas separation membranes, sensors, actuators, high-temperature electronics, and the like.

Nanocomposite Radome Materials

In one aspect, disclosed herein are nanocomposite radome materials containing a ceramic material and a boron nitride material. In one aspect, the boron nitride material can be boron nitride nanotubes, boron nitride fibers, boron nitride particles, boron nitride sheets, boron nitride flakes, boron nitride nanobarb powders, another form of boron nitride, or any combination thereof. In some aspects, the ceramic material is SiCN, SiC, SiOC, SiON, another ceramic material, or any combination thereof. In one aspect, the ceramic material can be doped with a transition metal such as, for example, Hf, Ta, Zr, or any combination thereof.

In an aspect, the boron nitride material can be boron nitride nanotubes. In a further aspect, the boron nitride nanotubes have a diameter of less than about 5 nm, or of about 1, 2, 3, 4, or about 5 nm, or a combination of any of the foregoing values, or a range encompassing any of the foregoing values. In another aspect, the boron nitride nanotubes have a length of greater than about 5 μm, or of from about 5 μm to about 200 μm, or of about 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or about 200 μm, or a combination of any of the foregoing values, or a range encompassing any of the foregoing values.

In another aspect, the nanocomposite radome materials have from about 0 to about 90 wt % boron nitride material, from about 0.1 to about 30 wt % boron nitride material, or from about 1 to about 25 wt % boron nitride material, or about 0.1, 1, 5, 10, 15, 20, 25, 30, 35, 40, 45, 50, 55, 60, 65, 70, 75, 80, 85, or about 90 wt % boron nitride material, or a combination of any of the foregoing values, or a range encompassing any of the foregoing values.

Method for Making Nanocomposite Radome Material

First Exemplary Method

In one aspect, provided herein is an exemplary method for making a nanocomposite radome material, the method including at least the following steps:

(a) admixing a pulverized ceramic precursor with a source of boron nitride to form a first composition;

(b) compressing the first composition to form a solid material; and (c) pyrolyzing the solid material to form a nanocomposite radome material;

wherein pyrolyzing the solid material produces a ceramic material from the ceramic precursor.

In an aspect, the source of boron nitride can be boron nitride nanotubes, boron nitride fibers, boron nitride particles, boron nitride sheets, boron nitride flakes, boron nitride nanobarb powders, another form of boron nitride, or any combination thereof.

In some aspects, the ceramic precursor can be a polysilazane, a polysiloxane, a polycarbosilane, a polysilylcarbodiimide, a polycarbosiloxane, a perhydropolysilazane, another ceramic precursor, or any combination thereof. In one aspect, the ceramic precursor is doped with a transition metal such as, for example, Hf, Ta, Zr, or a combination thereof. In one exemplary aspect, when the ceramic precursor is a polysilazane, the polysilazane can be a compound of formula I:

Formula 1

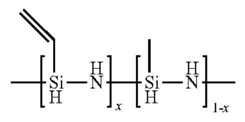

In another aspect, in formula I, x can be from about 0.1 to about 0.3, or can be about 0.2.

In one aspect, the method further includes curing the ceramic precursor prior to step (a). In some aspects, curing can be accomplished using a catalyst and the catalyst can be a platinum catalyst, a peroxide catalyst, or any combination thereof. In one aspect, when the catalyst is or includes a peroxide catalyst, the peroxide catalyst can be a dicumyl peroxide catalyst. In another aspect, thermal initiators, photoinitators, other curing initiators, and combinations thereof are also envisioned. In another aspect, from about 0.1 to about 10 wt % of the catalyst relative to the total weight of the ceramic precursor can be used, or from about 0.1 to about 1 wt %, or about 0.1, 0.5, 1, 2, 3, 4, 5, 6, 7, 8, 9, or about 10 wt %, or a combination of any of the foregoing values, or a range encompassing any of the foregoing values. In one aspect, 0.5 wt % catalyst can be admixed with the ceramic precursor to initiate curing. In still another aspect, curing can be accomplished at an elevated temperature such as, for example, from about room temperature to about 250° C., or from about 120° C. to about 350° C., or at about 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, or about 350° C., or a combination of any of the foregoing values, or a range encompassing any of the foregoing values. In still another aspect, curing can be accomplished in an inert atmosphere such as, for example, flowing argon, in air, or in a vacuum.

In one aspect, the ceramic precursor can be processed in a ball mill to form a pulverized ceramic precursor. In another aspect, when the boron nitride material is boron nitride nanotubes, the source of boron nitride nanotubes can be an as-grown boron nitride nanotube puffball. In one aspect, the boron nitride nanotube puffball can be sonicated in a solvent prior to step (a). In some aspects, the solvent can be ethanol.

In any of these aspects, the first composition can be dried while stirring prior to performing step (b). In some aspects, the first composition can be ball milled prior to performing step (b) such as, for example, after drying. In one aspect, ball milling is carried out for at least 5 minutes.

In one aspect, the first composition can be compressed at room temperature and/or under uniaxial pressure. In one aspect, the first composition can be compressed at a pressure of about 3.4 MPa. In another aspect, the first composition can be compressed in a mold.

In an aspect, pyrolysis can be conducted at a temperature ranging from about room temperature to about 2200° C., or from about 800° C. to about 2200° C., or at about 20, 100, 200, 300, 400, 500, 600, 700, 800, 900, 1000, 1100, 1200, 1300, 1400, 1500, 1600, 1700, 1800, 1900, 2000, 2100, or about 2200° C., or a combination of any of the foregoing values, or a range encompassing any of the foregoing values. In one aspect, the solid material can be pyrolyzed at about 1000° C. for about 3 hours. In another aspect, the solid material can be pyrolyzed in an inert environment, in air, or in a vacuum. In some aspects, the inert environment can include nigh purity nitrogen. A schematic of this exemplary method is provided in FIG. 1A.

Second Exemplary Method

In another aspect, provided herein is a second method for making a nanocomposite radome material, the method including the following steps:

(a) preparing a solution of a boron nitride material;
(b) preparing a cured ceramic powder;
(c) admixing the solution of the boron nitride material and the cured ceramic powder to create a mixed composition;
(d) drying the mixed composition; and
(e) pyrolyzing the mixed composition.

In one aspect, the boron nitride material can be or include boron nitride nanotubes, boron nitride fibers, boron nitride particles, boron nitride sheets, boron nitride flakes, boron nitride nanobarb powders, or any combination thereof. In another aspect, the boron nitride material is contacted with a solvent to prepare the solution. In one aspect, the solvent can be water. In another aspect, the solution is homogenized by mechanical stirring. In one aspect, mechanical stirring can be carried out for about 4 days. In another aspect, mechanical stirring can be conducted at a speed of at least about 600 rpm. Further in these aspects, mechanical stirring allows the boron nitride material to be fully dispersed in the solution.

In another aspect, the cured ceramic powder can be prepared from a ceramic precursor. In some aspects, the ceramic precursor can be a liquid such as, for example, a polysilazane. In a further aspect, in order to initiate and/or accelerate curing, a catalyst can be used. In one aspect, the catalyst can be a platinum catalyst, a peroxide catalyst, or any combination thereof. In one aspect, the catalyst can be added at about 0.5% by weight relative to the total weight of the ceramic precursor. In a further aspect, the mixture including the combined catalyst and liquid precursor can be stirred for about 30 minutes to ensure homogeneous distribution of the catalyst. In another aspect, following stirring, the composition can be cured at elevated temperature. In one aspect, curing is accomplished in a crucible. In another aspect, curing is accomplished at about 150° C. In still another aspect, curing is carried out for about 3 hours. In one aspect, following curing, the cured material is subjected to a milling process such as, for example, ball milling to form a powder. In an aspect, ball milling can be carried out for about 30 minutes. In still another aspect, the powder has an average particle diameter of about 5 μm.

In an aspect, the solution of the boron nitride material and the cured ceramic powder can then be mixed. In one aspect, the boron nitride material and the cured ceramic powder can be mixed in a solvent such as, for example, ethanol. In one aspect, mixing is accomplished by dispersing the cured ceramic powder in the solvent and adding the solution of boron nitride material to the ceramic material in the solvent. In one aspect, further mixing such as, for example, sonication can be conducted to ensure adequate dispersion. In still another aspect, following mixing of the boron nitride material and the cured ceramic powder, the solvent can be allowed to evaporate. In one aspect, any clumps of powder left after solvent evaporation can be broken up by standard means such as, for example, use of mortar and pestle or other grinding means.

In another example, the dried mixed composition can be pressed in a die. In one aspect, each die can contain about 500 mg of dried mixed composition. In some aspects, before pressing, several drops (e.g., from about 3 to about 5) of the liquid ceramic precursor can be added to the dried mixed composition. Without wishing to be bound by theory, the liquid precursor can assist in binding the powder together during pressing. In one aspect, the die can be circular. In another aspect, the die can have a diameter of from about 14 to about 15 mm, or of about 14, 14.1, 14.2, 14.3, 14.4, 14.5, 14.6, 14.7, 14.8, 14.9, or about 15 mm, or a combination of any of the foregoing values, or a range encompassing any of the foregoing values. In one aspect, the die has a diameter of about 14.85 mm.

In a further aspect, the dried mixed composition and optional additional drops of liquid precursor can be pressed at from about 75 to about 85 MPa, or at about 75, 76, 77, 78, 79, 80, 81, 82, 83, 84, or about 85 MPa, or a combination of any of the foregoing values, or a range encompassing any of the foregoing values. In a further aspect, the dried mixed composition can be held at this pressure for from about 5 to about 15 minutes, or for about 5, 6, 7, 8, 9, 10, 11, 12, 13, 14, or about 15 minutes, or a combination of any of the foregoing values, or a range encompassing any of the foregoing values.

In an aspect, pyrolysis can be conducted at a temperature ranging from about room temperature to about 2200° C., or from about 800° C. to about 2200° C., or at about 20, 100, 200, 300, 400, 500, 600, 700, 800, 900, 1000, 1100, 1200, 1300, 1400, 1500, 1600, 1700, 1800, 1900, 2000, 2100, or about 2200° C., or a combination of any of the foregoing values, or a range encompassing any of the foregoing values. In still another aspect, following compression, pyrolysis to form the nanocomposite radome material can be conducted at a temperature of about 1000° C. for about 1 h. In a further aspect, pyrolysis can be conducted in an inert atmosphere such as, for example, argon, in air, or in a vacuum.

The disclosed methods are general and are not intended to be limiting. In some aspects, steps can be performed in a different order and other modifications and/or variations to solvents, reagents, experimental parameters such as temperatures, pressures, mixing methods, and the like, can be made without departing from the scope of this disclosure. Also disclosed are nanocomposite radome materials made by the disclosed methods.

Third Exemplary Method

In another aspect, provided herein is a third method for making a nanocomposite radome material, the method including the following steps:

(a) preparing a solution of boron nitride material;
(b) drying the solution of boron nitride material to create a boron nitride mat;
(c) infiltrating the mat with liquid ceramic precursor to form an infiltrated mat; and
(d) pyrolyzing the infiltrated mat.

In one aspect, the boron nitride material can be or include boron nitride nanotubes, boron nitride fibers, boron nitride particles, boron nitride sheets, boron nitride flakes, boron nitride nanobarb powders, or any combination thereof. In another aspect, the boron nitride material is contacted with a solvent to prepare the solution. In one aspect, the solvent can be water. In some aspects, the solution further includes a surfactant such as, for example, cetrimonium bromide (CTAB). In another aspect, the solution is homogenized by mechanical stirring. In one aspect, mechanical stirring can be carried out for about 4 days. In another aspect, mechanical stirring can be conducted at a speed of at least about 600 rpm. Further in these aspects, mechanical stirring allows the boron nitride material to be fully dispersed in the solution.

In one exemplary aspect, the solution can include 100 mg of BNNT, 100 mg of CTAB, and 40 mL of water.

In one aspect, following dispersion, the solution can be filtered by a means such as, for example, vacuum filtration. In a further aspect, filtration can be used to remove water while creating a mat of boron nitride material. In still another aspect, prior to further processing, the boron nitride mat can be cut into smaller shapes. In a still further aspect, the smaller pieces of mat can be infiltrated with the liquid ceramic precursor. In some aspects, the infiltrated mats can be patted dry to remove excess precursor.

In an aspect, pyrolysis can be conducted at a temperature ranging from about room temperature to about 2200° C., or from about 800° C. to about 2200° C., or at about 20, 100, 200, 300, 400, 500, 600, 700, 800, 900, 1000, 1100, 1200, 1300, 1400, 1500, 1600, 1700, 1800, 1900, 2000, 2100, or about 2200° C., or a combination of any of the foregoing values, or a range encompassing any of the foregoing values. In still another aspect, pyrolysis to form the nanocomposite radome material can be conducted at a temperature of about 1000° C. for about 1 h. In a further aspect, pyrolysis can be conducted in an inert atmosphere such as, for example, argon, in air, or in a vacuum. A schematic of this process is provided in FIG. 1C.

Fourth Exemplary Method

In another aspect, provided herein is a fourth method for making a nanocomposite radome material, the method including the following steps:

(a) preparing a solution of boron nitride material;

(b) infiltrating a sheet of carbon fiber with the solution of boron nitride material;

(c) drying the sheet of carbon fiber;

(d) infiltrating the sheet with liquid ceramic precursor to form an infiltrated mat;

(e) curing the infiltrated mat to form a cured mat; and (f) pyrolyzing the cured mat.

In one aspect, the boron nitride material can be or include boron nitride nanotubes, boron nitride fibers, boron nitride particles, boron nitride sheets, boron nitride flakes, boron nitride nanobarb powders, or any combination thereof. In another aspect, the boron nitride material is contacted with a solvent to prepare the solution. In one aspect, the solvent can be water. In some aspects, the solution includes a surfactant such as, for example, CTAB. In another aspect, the solution is homogenized by mechanical stirring. In one aspect, mechanical stirring can be carried out for about 4 days. In another aspect, mechanical stirring can be conducted at a speed of at least about 600 rpm. Further in these aspects, mechanical stirring allows the boron nitride material to be fully dispersed in the solution.

In one exemplary aspect, the solution can contain 100 mg of BNNT, 100 mg of CTAB, and 40 mL of water.

In an aspect, the solution of the boron nitride material can be used to infiltrate a sheet of carbon fiber. In some aspects, both sides of the carbon fiber should be infiltrated. In a further aspect, multiple infiltrations may be required in order to increase the weight percentage of BNNT in the carbon fiber. In another aspect, following infiltration with boron nitride material, the carbon fiber sheet can be dried.

In one aspect, liquid ceramic precursor can be used to infiltrate the carbon fiber containing boron nitride material. In some aspects, the carbon fiber can be patted dry to remove excess precursor on the surface.

In an aspect, the infiltrated carbon fiber containing liquid ceramic precursor can be cured as discussed previously. In some aspects, curing is carried out at about 300° C. for about 3 hours.

In an aspect, pyrolysis can be conducted on the cured carbon fiber at a temperature ranging from about room temperature to about 2200° C., or from about 800° C. to about 2200° C., or at about 20, 100, 200, 300, 400, 500, 600, 700, 800, 900, 1000, 1100, 1200, 1300, 1400, 1500, 1600, 1700, 1800, 1900, 2000, 2100, or about 2200° C., or a combination of any of the foregoing values, or a range encompassing any of the foregoing values. In still another aspect, following compression, pyrolysis to form the nanocomposite radome material can be conducted at a temperature of about 1000° C. for about 1 h. In a further aspect, pyrolysis can be conducted in an inert atmosphere such as, for example, argon, in air, or in a vacuum. A schematic of this process is provided in FIG. 1D.

Properties of the Nanocomposite Radome Materials

In one aspect, the nanocomposite radome material can have a real relative permittivity of from about 1 to about 10 over a frequency range of from about 10 MHz to about 100 GHz, or of about 1, 2, 3, 4, 5, 6, 7, 8, 9, or about 10, or a combination of any of the foregoing values, or a range encompassing any of the foregoing values.

In another aspect, the nanocomposite radome material can have an imaginary relative permittivity of from about 0 to about 0.55 over a frequency range of from about 10 MHz to about 100 GHz, or of about 0, 0.05, 0.1, 0.2, 0.3, 0.4, or about 0.5, or a combination of any of the foregoing values, or a range encompassing any of the foregoing values.

In some aspects, the nanocomposite radome material can have a quality factor of from about 10 to about 10000 over a frequency range of from about 10 MHz to about 100 GHz, or of about 10, 50, 100, 250, 500, 750, 1000, 1500, 2000, 2500, 3000, 3500, 4000, 4500, 5000, 5500, 6000, 6500, 7000, 7500, 8000, 8500, 9000, 9500, or about 10000, or a combination of any of the foregoing values, or a range encompassing any of the foregoing values.

In some aspects, the nanocomposite radome material can have a loss tangent of from about 0.005 to about 0.05 over a frequency range of from about 10 MHz to about 100 GHz, or of about 0.005, 0.0075, 0.01, 0.02. 0.03, 0.04, or about 0.05, or a combination of any of the foregoing values, or a range encompassing any of the foregoing values.

In another aspect, the nanocomposite radome material can have an electrical resistivity of from about $10^6$ to about $10^8$ $\Omega \cdot m^2$, or of about $10^6$, $10^7$, or about $10^8$ $\Omega \cdot m^2$, or a combination of any of the foregoing values, or a range encompassing any of the foregoing values.

In an aspect, the nanocomposite radome material has a porosity of from about 0.5% to about 45%, or of about 0.5, 1, 5, 10, 15, 20, 25, 30, 35, 40, or about 45%, or a combination of any of the foregoing values, or a range encompassing any of the foregoing values.

In another aspect, the nanocomposite radome material can have a density of from about 1.2 to about 2 g/cm$^3$, or of about 1.2, 1.25, 1.3, 1.35, 1.4, 1.45, 1.5, 1.55, 1.6, 1.65, 1.7, 1.75, 1.8, 1.85, 1.9, 1.95, or about 2 g/cm$^3$, or a combination of any of the foregoing values, or a range encompassing any of the foregoing values.

In some aspects, the nanocomposite radome material can have a flexural strength of from about 1.5 to about 3 GPa, or of about 1.5, 1.75, 2, 2.25, 2.5, 2.75, or about 3 GPa, or a combination of any of the foregoing values, or a range encompassing any of the foregoing values.

In some aspects, the nanocomposite radome material can have a hardness of from about 0.5 to about 2.5 GPa, or of about 0.5, 0.75, 1, 1.25, 1.5, 1.75, 2, 2.25, or about 2.5 GPa, or a combination of any of the foregoing values, or a range encompassing any of the foregoing values.

In an aspect, the nanocomposite radome material can have a toughness of from about 75 to about 300 MPa, or of about 75, 100, 125, 150, 175, 200, 225, 250, 275, or about 300 MPa, or a combination of any of the foregoing values, or a range encompassing any of the foregoing values.

In some aspects, the nanocomposite radome material has a real relative permittivity of from about 2 to about 10 in the presence of from 0.1 wt % to about 6 wt % moisture content, or of about 2, 2.5, 3, 3.5, 4, 4.5, 5, 5.5, 6, 6.5, 7, 7.5, 8, 8.5, 9, 9.5, or about 10, or a combination of any of the foregoing values, or a range encompassing any of the foregoing values.

In another aspect, the nanocomposite radome material can have an imaginary relative permittivity of from about 0 to about 0.6 in the presence of from about 0.1 wt % to about 6 wt % moisture content, or of about 0, 0.1, 0.2, 0.3, 0.4, 0.5, or about 0.6, or a combination of any of the foregoing values, or a range encompassing any of the foregoing values.

In an aspect, the nanocomposite radome material can have a quality factor of from about 5 to about 10000 in the presence of from about 0.1 wt % to about 6 wt % moisture content, or of about 5, 10, 50, 100, 250, 500, 750, 1000, 1500, 2000, 2500, 3000, 3500, 4000, 4500, 5000, 5500, 6000, 6500, 7000, 7500, 8000, 8500, 9000, 9500, or about 10000, or a combination of any of the foregoing values, or a range encompassing any of the foregoing values.

In one aspect, the nanocomposite radome material can be hydrophobic. In another aspect, the nanocomposite radome material can have a water contact angle of from about 130° to about 150°, or of about 130°, 131°, 132°, 133°, 134°, 135°, 136°, 137°, 138°, 139°, 140°, 141°, 142°, 143°, 144°, 145°, 146°, 147°, 148°, 149°, or about 150°, or a combination of any of the foregoing values, or a range encompassing any of the foregoing values.

In some aspects, the nanocomposite radome material is transparent to electromagnetic radiation. In another aspect, the nanocomposite radome material is resistant to corrosion and/or to thermal shock. In one aspect, the disclosed nanocomposite radome materials are stable and do not change shape at temperatures of at least 200, 300, 400, 500, 600, 700, 800, 900, 1000, or greater than 1000° C. in an oxygen-containing atmosphere.

Articles, Components, and Structures Incorporating the Nanocomposite Radome Materials In one aspect, disclosed herein are radome structures including the nanocomposite radome materials disclosed herein. In another aspect, the radome structures can be components of warheads, aircraft, spacecraft, satellites, protective structures for stationary antennas, protective structures for radar dishes, or nuclear reactors.

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a polymer derived ceramic," "a solvent," or "a source of boron nitride nanotubes," include, but are not limited to, mixtures and/or combinations of two or more such polymer derived ceramics, solvents, or sources of boron nitride nanotubes, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of boron nitride material refers to an amount that is sufficient to achieve the desired improvement in the property modulated by the formulation component, e.g. achieving the desired dielectric properties and mechanical properties for the disclosed nanocomposite radome materials. The specific level in terms of wt % in a composition required as an effective amount will depend upon a variety of factors including the dimensions of the material, weight percent of the material, type of polymer derived ceramic, processing conditions, intended use, and shape of the components made using the disclosed materials.

As used herein, the terms "optional" or "optionally" means that the subsequently described event or circumstance can or cannot occur, and that the description includes instances where said event or circumstance occurs and instances where it does not.

As used herein, "radome" refers to an enclosure that protects equipment such as, for example, antennas, radar equipment, weather detection equipment, communications equipment, components of nuclear reactors, and the like. Radomes are ideally transparent to electromagnetic radiation and resistant to thermal shock, high temperatures, and other effects of extreme environments. In one aspect, disclosed herein are nanocomposite radome materials containing boron nitride materials in a ceramic matrix and having useful structural, electric, and dielectric properties.

"Relative permittivity" as used herein is also sometimes referred to as a dielectric constant and is defined as the absolute permittivity of a material expressed as a ratio relative to vacuum permittivity. Relative permittivity is dimensionless and has real ("real relative permittivity") and imaginary ("imaginary relative permittivity") parts. In one aspect, the nanocomposite radome materials disclosed herein have low relative permittivities (i.e. do not reflect a large portion of the electromagnetic radiation that is intended to pass through the materials). In another aspect, the relative permittivities of the materials are stable under a variety of environmental conditions including high moisture and/or high relative humidity.

As used herein, "quality factor" refers to a dimensionless parameter that is the reciprocal of the "loss tangent" ($\tan\delta$), which is a quantitative measure of the dissipation of electromagnetic radiation that occurs as the radiation passes through the disclosed nanocomposite radome materials. In one aspect, the disclosed materials have relatively high quality factors compared to other ceramic radome materials.

"Electrical resistivity" as used herein refers to a property of the disclosed nanocomposite radome materials that quantifies how strongly the materials resist electric current. In one aspect, inclusion of boron nitride materials in ceramic materials increases the electrical resistivity of the materials.

As used herein, "porosity" refers to the volume of the nanocomposite radome materials occupied by empty space (i.e. "pores"). Pores may be of various sizes and porosity depends, in one aspect, at least partially on the weight fraction of boron nitride material in the disclosed materials.

"Flexural strength" as used herein refers to a property of a material defined as the stress of the material just prior to yielding in a flexural test such as, for example, a three point flexural test. In one aspect, the disclosed nanocomposite radome materials have high flexural strengths and are resistant to impact and other mechanical shocks.

As used herein, "hardness" refers to resistance of a material to plastic deformation. In one aspect, hardness can be measured by a standard test such as, for example, the Vickers hardness test. In another aspect, the disclosed nanocomposite radome materials have a high hardness value.

"Toughness" as used herein refers to the ability of a material to absorb energy and undergo plastic deformation without fracturing. In one aspect, when stress versus strain of a material is plotted, toughness can be derived from the area under the curve. In one aspect, ceramics are strong but have limited ductility and are thus not typically considered tough. In another aspect, the disclosed polymer-derived ceramics have increased toughness due to the presence of boron nitride material.

"Room temperature" as used herein refers to an ambient temperature or a range of ambient temperatures typically found comfortable by humans in indoor settings. In one aspect, room temperature can be from about 20° C. to about 25° C., or can be 20, 21, 22, 23, 24, or 25° C.

"Silicon oxynitride" or "SiON" as used herein refers to a nonstoichiometric, dielectric ceramic material that can be represented by a chemical formula $SiO_xN_y$. This material typically has an intermediate number of oxygen atoms and nitrogen atoms between the endpoints of $SiO_2$ (silica) and $Si_3N_4$ (silicon nitride), SiON as used herein should be interpreted as encompassing intermediate possibilities for $SiO_xN_y$ including, but not limited to, crystalline forms such as, for example, $SiN_2O$, and amorphous forms where x and y can have other values, including integer values, decimal values (e.g., 0.1, 0.25, and the like), and combinations thereof.

Unless otherwise specified, temperatures referred to herein are based on atmospheric pressure (i.e. one atmosphere).

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

ASPECTS

The present disclosure can be described in accordance with the following numbered aspects, which should not be confused with the claims.

Aspect 1. A nanocomposite radome material comprising:

(a) a ceramic material; and (b) a boron nitride material.

Aspect 2. The nanocomposite radome material of aspect 1, wherein the boron nitride material comprises boron nitride nanotubes, boron nitride fibers, boron nitride particles, boron nitride sheets, boron nitride flakes, boron nitride nanobarb powders, another form of boron nitride, or any combination thereof.

Aspect 3. The nanocomposite radome material of aspect 1 or 2, wherein the ceramic material comprises SiCN, SiC, SiOC, SiON, another ceramic material, or any combination thereof, wherein the ceramic material is optionally doped with a transition metal.

Aspect 4. The nanocomposite radome material of any one of aspects 1-3, wherein the nanocomposite radome material comprises from about 0 wt % to about 90 wt % boron nitride material.

Aspect 5. The nanocomposite radome material of any one of aspects 1-3, wherein the nanocomposite radome material comprises from about 0.1 wt % to about 30 wt % boron nitride material.

Aspect 6. The nanocomposite radome material of any one of aspects 1-3, wherein the nanocomposite radome material comprises from about 1 wt % to about 25 wt % boron nitride material.

Aspect 7. A method for making a nanocomposite radome material, the method comprising:

(a) admixing a pulverized ceramic precursor with a source of boron nitride to form a first composition;

(b) compressing the first composition to form a solid material; and (c) pyrolyzing the solid material to form a nanocomposite radome material;

wherein pyrolyzing the solid material produces a ceramic material from the ceramic precursor.

Aspect 8. The method of aspect 7, wherein the source of boron nitride comprises boron nitride nanotubes, boron nitride fibers, boron nitride particles, boron nitride sheets, boron nitride flakes, boron nitride nanobarb powders, another form of boron nitride, or any combination thereof.

Aspect 9. The method of aspect 7 or 8, wherein the ceramic precursor comprises a polysilazane, a polysiloxane, a polycarbosilane, a polysilylcarbodiimide, a polycarbosiloxane, a perhydropolysilazane, another ceramic precursor, or any combination thereof, wherein the ceramic precursor is optionally doped with a transition metal.

Aspect 10. The method of any one of aspects 7-9, further comprising curing the ceramic precursor prior to step (a).

Aspect 11. The method of aspect 10, wherein curing is accomplished using a catalyst.

Aspect 12. The method of aspect 11, wherein the catalyst comprises a platinum catalyst, a peroxide catalyst, a thermal initiator, a photoinitiator, another curing initiator, or any combination thereof.

Aspect 13. The method of aspect 12, wherein the peroxide catalyst comprises a dicumyl peroxide catalyst.

Aspect 14. The method of any one of aspects 11-13, further comprising admixing from about 0.1 to about 10 wt % of the catalyst with the ceramic precursor, relative to a total weight of the ceramic precursor, to initiate curing.

Aspect 15. The method of any one of aspects 11-13, further comprising admixing from about 0.1 to about 1 wt % of the catalyst with the ceramic precursor, relative to a total weight of the ceramic precursor, to initiate curing.

Aspect 16. The method of any one of aspects 10-15, wherein curing is accomplished at a temperature of from about room temperature to about 350° C.

Aspect 17. The method of any one of aspects 10-16, wherein curing is accomplished in an inert atmosphere, in air, or in a vacuum.

Aspect 18. The method of any one of aspects 7-17, wherein the solid material is pyrolyzed at a temperature of from about room temperature to about 2200° C.

Aspect 19. The method of any one of aspects 7-18, wherein the solid material is pyrolyzed in an inert atmosphere, in air, or in a vacuum.

Aspect 20. A method for making a nanocomposite radome material, the method comprising:

(a) preparing a solution of boron nitride material;

(b) drying the solution of boron nitride material to create a boron nitride mat;

(c) infiltrating the mat with liquid ceramic precursor to form an infiltrated mat; and (d) pyrolyzing the infiltrated mat.

Aspect 21. The method of aspect 20, wherein the boron nitride material comprises boron nitride nanotubes, boron nitride fibers, boron nitride particles, boron nitride sheets, boron nitride flakes, boron nitride nanobarb powders, another form of boron nitride, or any combination thereof.

Aspect 22. The method of aspect 20 or 21, wherein the liquid ceramic precursor comprises a polysilazane, a polysiloxane, a polycarbosilane, a polysilylcarbodiimide, a polycarbosiloxane, a perhydropolysilazane, another ceramic precursor, or any combination thereof, wherein the ceramic precursor is optionally doped with a transition metal.

Aspect 23. The method of any one of aspects 20-22, wherein the infiltrated mat is pyrolyzed at a temperature of from about room temperature to about 2200° C.

Aspect 24. The method of any one of aspects 20-23, wherein the solid material is pyrolyzed in an inert atmosphere, in air, or in a vacuum.

Aspect 25. A method for making a nanocomposite radome material, the method comprising:

(a) preparing a solution of boron nitride material;

(b) infiltrating a sheet of carbon fiber with the solution of boron nitride material;

(c) drying the sheet of carbon fiber;

(d) infiltrating the sheet of carbon fiber with liquid ceramic precursor to form an infiltrated mat;

(e) curing the infiltrated mat to form a cured mat; and (f) pyrolyzing the cured mat.

Aspect 26. The method of aspect 25, wherein the boron nitride material comprise boron nitride nanotubes, boron nitride fibers, boron nitride particles, boron nitride sheets, boron nitride flakes, boron nitride nanobarb powders, another form of boron nitride, or any combination thereof.

Aspect 27. The method of aspect 25 or 26, wherein the liquid ceramic precursor comprises a polysilazane, a polysiloxane, a polycarbosilane, a polysilylcarbodiimide, a polycarbosiloxane, a perhydropolysilazane, another ceramic precursor, or any combination thereof, wherein the ceramic precursor is optionally doped with a transition metal.

Aspect 28. The method of any one of aspects 25-27, wherein curing is accomplished at a temperature of from about room temperature to about 350° C.

Aspect 29. The method of any one of aspects 25-28, wherein curing is accomplished in an inert atmosphere, in air, or in a vacuum.

Aspect 30. The method of any one of aspects 25-29, wherein the cured mat is pyrolyzed at a temperature of from about room temperature to about 2200° C.

Aspect 31. The method of any one of aspects 25-30, wherein the solid material is pyrolyzed in an inert atmosphere, in air, or in a vacuum.

Aspect 32. A nanocomposite radome material produced by the method of any one of aspects 7-31.

Aspect 33. The nanocomposite radome material of any one of aspects 1-6 or 32, wherein the nanocomposite radome material has a real relative permittivity of from about 1 to about 10 over a frequency range of from about 10 MHz to about 100 GHz.

Aspect 34. The nanocomposite radome material of any one of aspects 1-6, 32, or 33, wherein the nanocomposite radome material has an imaginary relative permittivity of from about 0 to about 0.5 over a frequency range of from about 10 MHz to about 100 GHz.

Aspect 35. The nanocomposite radome material of any one of aspects 1-6 or 32-34, wherein the nanocomposite radome material has a quality factor of from about 10 to about 10000 over a frequency range of from about 10 MHz to about 100 GHz.

Aspect 36. The nanocomposite radome material of any one of aspects 1-6 or 32-35, wherein the nanocomposite radome material has a loss tangent of from about 0.005 to about 0.05 over a frequency range of from about 10 MHz to about 100 GHz.

Aspect 37. The nanocomposite radome material of any one of aspects 1-6 or 32-36, wherein the nanocomposite radome material has an electrical resistivity of from about $10^6$ to about $10^9$ $\Omega \cdot m^2$.

Aspect 38. The nanocomposite radome material of any one of aspects 1-6 or 32-37, wherein the nanocomposite radome material has a porosity of from about 0.5 to about 45%.

Aspect 39. The nanocomposite radome material of any one of aspects 1-6 or 32-38, wherein the nanocomposite radome material has a density of from about 1.2 to about 2 $g/cm^3$.

Aspect 40. The nanocomposite radome material of any one of aspects 1-6 or 32-39, wherein the nanocomposite radome material has a flexural strength of from about 1.5 to about 3 GPa.

Aspect 41. The nanocomposite radome material of any one of aspects 1-6 or 32-40, wherein the nanocomposite radome material has a hardness of from about 0.5 to about 2.5 GPa.

Aspect 42. The nanocomposite radome material of any one of aspects 1-6 or 32-41, wherein the nanocomposite radome material has a toughness of from about 75 to about 300 MPa.

Aspect 43. The nanocomposite radome material of any one of aspects 1-6 or 32-42, wherein the nanocomposite radome material has a real relative permittivity of from about 2 to about 10 in the presence of from 0.1 wt % to about 6 wt % moisture content.

Aspect 44. The nanocomposite radome material of any one of aspects 1-6 or 32-43, wherein the nanocomposite radome material has an imaginary relative permittivity of from about 0 to about 0.6 in the presence of from 0.1 wt % to about 6 wt % moisture content.

Aspect 45. The nanocomposite radome material of any one of aspects 1-6 or 32-44, wherein the nanocomposite radome material has a quality factor of from about 5 to about 10000 in the presence of from 0.1 wt % to about 6 wt % moisture content.

Aspect 46. The nanocomposite radome material of any one of aspects 1-6 or 32-45, wherein the nanocomposite radome material is hydrophobic.

Aspect 47. The nanocomposite radome material of any one of aspects 1-6 or 32-46, wherein the nanocomposite radome material has a water contact angle of from about 130 to about 150°.

Aspect 48. The nanocomposite radome material of any one of aspects 1-6 or 32-47, wherein the nanocomposite radome material is transparent to electromagnetic radiation.

Aspect 49. The nanocomposite radome material of any one of aspects 1-6 or 32-48, wherein the nanocomposite radome material is resistant to corrosion.

Aspect 50. The nanocomposite radome material of any one of aspects 1-6 or 32-49, wherein the nanocomposite radome material is resistant to thermal shock.

Aspect 51. The nanocomposite radome material of any one of aspects 1-6 or 32-50, wherein the nanocomposite radome material is stable at 1000° C. in an oxygen-containing atmosphere.

Aspect 52. A radome structure comprising the nanocomposite radome material of any one of aspects 1-6 or 32-51.

Aspect 53. The radome structure of aspect 52, wherein the radome structure is a component of a warhead, an aircraft, a spacecraft, a satellite, a protective structure for a stationary antenna, a protective structure for a radar dish, or a nuclear reactor.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1: Materials and Methods

Material Preparation (First Method)

The matrix in this work is polymer-derived SiCN ceramic synthesized by thermal decomposition of polysilazane (HTT-1800 THERMAL CURE) purchased from Extreme Environment Materials Solutions (EEMS), LLC. The molecular formula of the liquid precursor is shown in FIG. 1A. Raw BNNTs with tube length over a few micrometers and diameter less than 5 nm (manufactured by BNNT, LLC) were used as reinforcements. 0.5 wt. % catalyzer (CLC-PB058, EEMS) was added to cure liquid precursor. FIG. 1A also shows the detailed fabrication process of the PDC-BNNT nanocomposites. The liquid precursor was first cured at 350° C. in a flowing argon atmosphere. The cross-linked precursor was ball milled in 8000D Mixer/Mill®-Dual High-Energy Ball Mill until powdered. The BNNT puffballs were then dispersed in ethanol using Q500 Sonicator. The ball milled powders were then mixed with the dispersed BNNT solution under stirring. The mixture was then dried under stirring and ball milled for 5 minutes to make sure uniformly mixed. The final mixture was compressed under uniaxial pressure (3.4 MPa) into a 25 mm disk at room temperature. The shaped product was finally pyrolyzed at 1000° C. for 3 hours with a ramping rate of 1° C./min under a high purity 4.8 grade nitrogen environment to obtain the PDC-BNNT nanocomposite. The PDC-BNNT nanocomposites with BNNT weight fractions of 0, 5, 10, 15, 20, 25 and 30 were marked as PB0, PB5, PB10, PB15, PB20 and PB25, PB30, respectively.

Alternate Material Preparation (Second Method)

A BNNT solution was generated by mechanically stirring a source of BNNT in water for about 4 days at a speed of at least 600 RPM. This allowed full dispersal of the BNNT in the solution.

Liquid polysilazane (PSZ) precursor was mixed with 0.5 wt % liquid catalyst (proprietary catalyst supplied by the vendor) and stirred for 30 minutes. This mixture was then placed in a crucible and cured at 150° C. for 3 hours. The cured product was then ball milled for 30 minutes to form PSZ fine powder (~5 μm).

The BNNT solution and cured PSZ powder were then mixed using ethanol as the solvent. The PSZ powder was dispersed in the ethanol and the BNNT solution was added to the mixture. The mixed solution was sonicated for 5 minutes to ensure a good dispersion and was then placed in the fume hood overnight to allow the ethanol to evaporate. The powder mixture dried up in small clump and a pestle and mortar were used to break up these powder clumps back into a fine particle size.

Figure 1B:
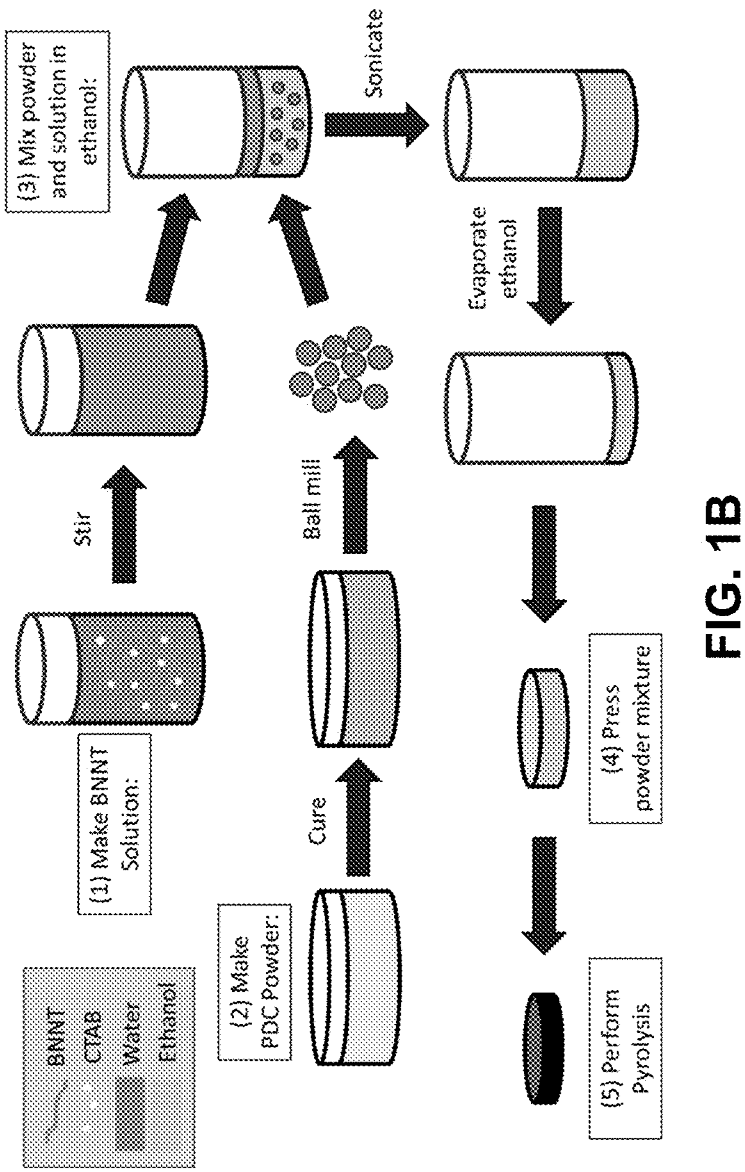
Figure 1C:
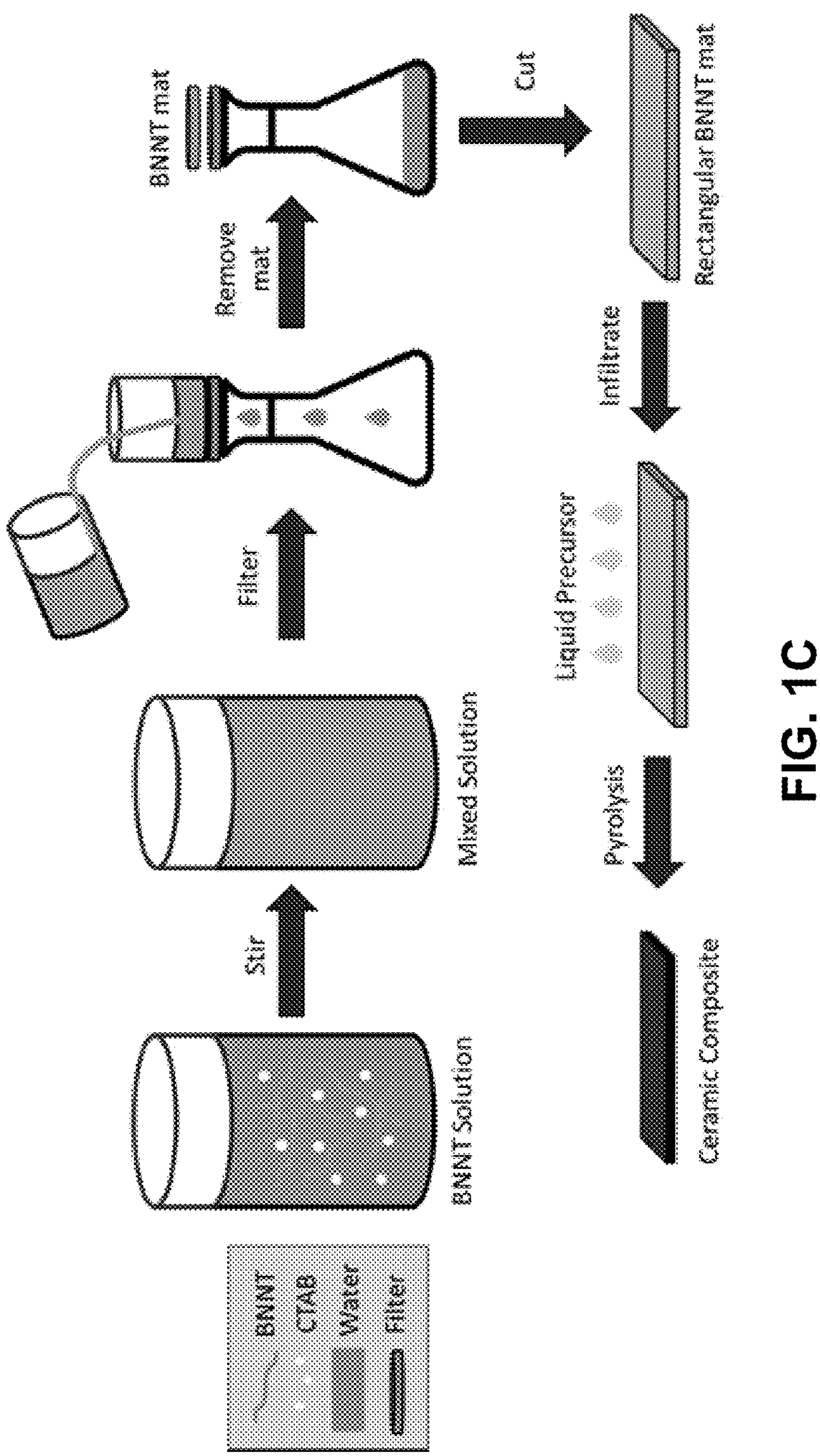
Figure 1D:
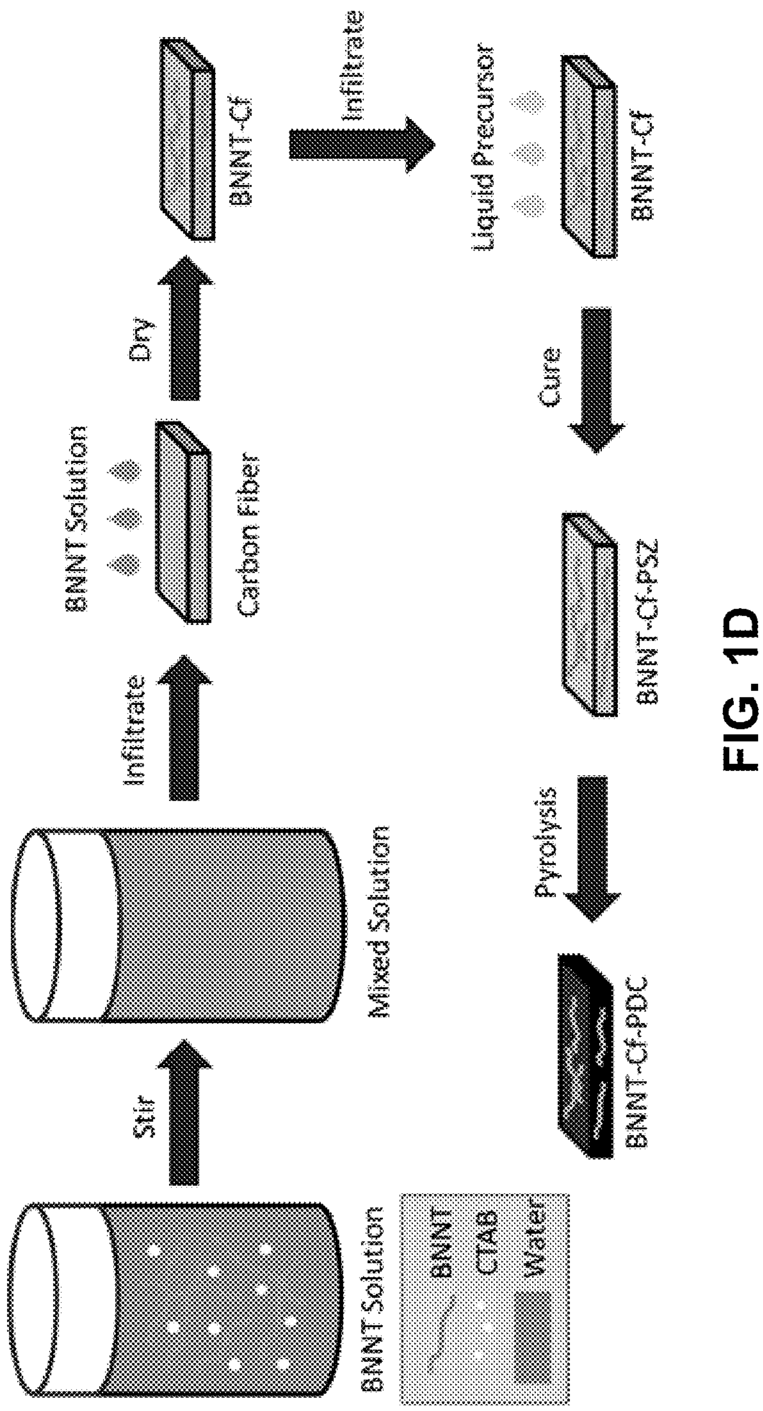

Before the powders were pressed, 3-5 drops of the liquid precursor were added and mixed with the pestle and mortar. The liquid precursor helps bind the powder together during the cold press. Each press used 500 mg of powder. The powder was loaded into a circular die with a diameter of 14.85 mm. The powder was pressed at about 79 MPa and held at that pressure for 10 minutes. The compacts then underwent pyrolysis at 1000° C. for 1 hour in an argon atmosphere. A schematic detailing this process is provided in FIG. 1B.

Alternate Material Preparation (Third Method: Polymer Infiltration and Pyrolysis)

A solution consisting of BNNT, cetrimonium bromide (CTAB), and water was prepared. The ratio for the solution is as follows: 100 mg of BNNT, 100 mg of CTAB, and 40 mL of water. The solution was stirred for about 4 days at 600 rpm to let the BNNT fully disperse in the water. Next, a vacuum filtration device was used to create the BNNT mat. A Teflon filter paper was then used to capture the BNNT while allowing the water to pass through. Once the water was been fully removed, all the BNNT were present on the surface of the filter paper. The BNNT mat was carefully removed from the filter paper and cut into rectangular shapes using a razor blade. The liquid ceramic precursor was then infiltrated in the mat until fully soaked. The mat was then patted dry with a paper towel to remove excess precursor on the surface. The sample was then pyrolyzed at 1000° C. for 1 hour. A schematic detailing this process is provided in FIG. 1C.

A Knoop micro-hardness test was performed on the ceramic composite and the pristine composite. No improvement to mechanical properties was observed with the composite prepared by this method. Results are presented in Table 1:

TABLE 1

| Properties of PIP Nanocomposites | | | | | | |
|---|---|---|---|---|---|---|
| Sample | BNNT wt % | Thickness (μm) | Diagonal (μm) | Indent Depth (μm) | HK (Knoop Micro-Hardness) | Density ($g/cm^3$) |
| SiCN (pristine) | 0 | 171.6 | 31.27 ± 0.46 | 1.09 | 728 ± 22 | 2.03 |
| BNNT-SiCN | 44 | 62.81 | 62.81 ± 4.01 | 2.20 | 182 ± 24 | 1.21 |

In these initial experiments, the polymer infiltration and pyrolysis (PIP) method for preparing nanocomposite radome materials did not improve mechanical properties with BNNT as the matrix. A tougher and aligned BNNT mat should overcome these limitations and result in improved properties.

Alternate Material Preparation (Fourth Method, BNNT-CF-PDC PIP Method)

A solution consisting of BNNT, cetrimonium bromide (CTAB), and water was prepared. The ratio for the solution is as follows: 100 mg of BNNT, 100 mg of CTAB, and 40 mL of water. The solution was stirred for about 4 days at 600 rpm to allow the BNNT to fully disperse in the water. The next step was to cut out a sheet of carbon fiber (CF) from a roll and infiltrate it with the BNNT solution. Both sides of the carbon fiber need to be infiltrated and multiple infiltrations may be needed to increase BNNT weight percentage. Once the sheet was dry, the liquid ceramic precursor was fully infiltrated and then the sheet was patted dry with paper towels to remove excess precursor on the surface. The carbon fiber composite then underwent curing at 300° C. for 3 hours and pyrolysis at 1000° C. for 3 hours. A schematic detailing this process is provided in FIG. 1D.

Four types of sample were created, with three replicates of each type being prepared: SiCN×1 PIP, SiCN×2 PIP, BNNT 5 wt %, and BNNT 10 wt %. Characterization and properties of the samples are provided below in Table 2:

TABLE 2

| BNNT-CF-PDC Dimensions | | | | | |
|---|---|---|---|---|---|
| Sample | Description | CF Mass | BNNT Mass | SiCN Mass | Final Mass (g) |
| 1 | SiCN ×1 PIP | 9.8 (45%) | — | 12.0 (55%) | 21.8 |
| 2 | SiCN ×1 PIP | 9.1 (57%) | — | 6.9 (43%) | 16.0 |
| 3 | SiCN ×1 PIP | 9.2 (49%) | — | 9.7 (51%) | 18.9 |
| 4 | SiCN ×2 PIP | 4.1 (32%) | — | 8.9 (68%) | 13.0 |
| 5 | SiCN ×2 PIP | 3.4 (31%) | — | 7.5 (69%) | 10.9 |
| 6 | SiCN ×2 PIP | 3.5 (32%) | — | 7.6 (68%) | 11.1 |
| 7 | BNNT 5 wt % | 8.5 (56%) | 0.4 (3%) | 6.6 (41%) | 15.2 |
| 8 | BNNT 5 wt % | 8.5 (57%) | 0.8 (5%) | 5.6 (38%) | 14.9 |
| 9 | BNNT 5 wt % | 7.5 (40%) | 0.9 (5%) | 10.4 (55%) | 18.8 |
| 10 | BNNT 10 wt % | 5.0 (40%) | 1.1 (9%) | 6.4 (51%) | 12.5 |
| 11 | BNNT 10 wt % | 7.2 (44%) | 1.3 (8%) | 7.7 (48%) | 16.2 |
| 12 | BNNT 10 wt % | 7.5 (37%) | 1.8 (9%) | 10.8 (54%) | 20.1 |

Samples were subjected to tensile testing. Dog-bone shapes were punched from the samples and fracture stress was evaluated. Results of tensile testing are provided below in Table 3:

TABLE 3

| Tensile Test Results for Ceramic Composites | | |
|---|---|---|
| Sample[a] | Fracture Stress (MPa) | Comments |
| 1 | 4.88 | — |
| 2 | 3.54 | — |
| 3 | 0.9 | — |
| 4 | — | Sample became powder under punch force for sample preparation |
| 5 | 2.78 | — |
| 6 | 2.26 | — |
| 7 | — | Cracked before tension |
| 8 | 1.9 | — |
| 9 | — | Cracked before tension |
| 10 | 1.27 | — |
| 11 | — | Cracked before tension |
| 12 | — | Cracked before tension |

[a]Sample numbers/compositions in Table 3 correspond to sample numbers/compositions in Table 2.

Some samples were too brittle for the tensile test although fracture stress could be evaluated for some samples as indicated in Table 3. Further refinements to the procedure should result in improved properties.

Characterization

The relative complex permittivity of samples was measured through the waveguide method according to ASTM D 5568-08. The microwave scattering parameters were measured by a vector network analyzer (Keysight, N5225A PNA, 10 MHz to 50 GHz). The relative complex permittivity of the samples was calculated based on the Nicolson-Ross-Weir (NRW) algorithm. The dimension of the samples was 7.112 mm×3.556 mm×3.018 mm and the frequency range was from 26.5 to 40 GHz (Ka band).

DC conductivity of the nanocomposites was measured by the I-V curve on a Keithley 6514 series multimeter (Tektronix, Inc. Beaverton, USA) at room temperature. Carbon paint (SPI, West Chester, Pennsylvania, USA) was then pasted on the surfaces as the electrodes. The voltage used in the conductivity measurements is 5 mV. Three samples of each kind were used for the conductivity measurement.

The microstructure of the nanocomposites was characterized by Raman spectroscopy, X-Ray Diffraction (XRD), field emission scanning electron microscope (SEM, FEI Verios 460L) and transmission electron microscopy (TEM, Talos F200X G2 (USA)). Raman spectra were obtained on LabRAM HR Raman microscopes (HORI BA Scientific) with the 442 nm line of $Ar^+$ laser as the excitation source. XRD data were acquired using a Malvern PANalytical Empyrean X-ray diffractometer with Cu K-alpha radiation (wavelength 0.15418 nm) in a 2-theta range of 10 to 80 degree. The step size and time per step used in these measurements are 0.026 degree and 87 sec/step, respectively.

The chemical state of the element elements in the nano-composites was evaluated by X-ray photoelectric spectroscopy (SPECS FlexMod XPS with Hemispherical analyzer PHOIBIS 150) with Mg kα excitation (1254 eV). Base pressure in the analysis chamber is in $10^{-10}$ mbar range. X-Ray incidence angle is ~30° from surface and X-ray source to analyzer ~60°. Energy calibration was established by referencing to adventitious carbon (C1s line at 285.0 eV binding energy).

The density of the composites ($\rho_0$) was calculated by measuring the weight and volume of the samples. The density of the fully dense PDC 2.23 g/cm$^3$ and the density of 1.38 g/cm$^3$ are used as the theoretical densities of PDC (ρPDC) and the BNNTs (ρBNNTs), respectively. Three samples of each kind were measured for the density and porosity. The room temperature mechanical properties of the samples were characterized by a 3-point bending test based on ASTM C1341-13 and Vickers Hardness test. The sample dimension for the 3-point bending test is 19.00×3.00×2.80 mm$^3$. The samples' span length is 12.28 mm. Three samples of each type were tested. The load of the Vickers Hardness test is 500 gf. Five samples of each type were tested.

Example 2: Results and Discussion

Microstructure of the Fabricated Nanocomposites

Figure 2:
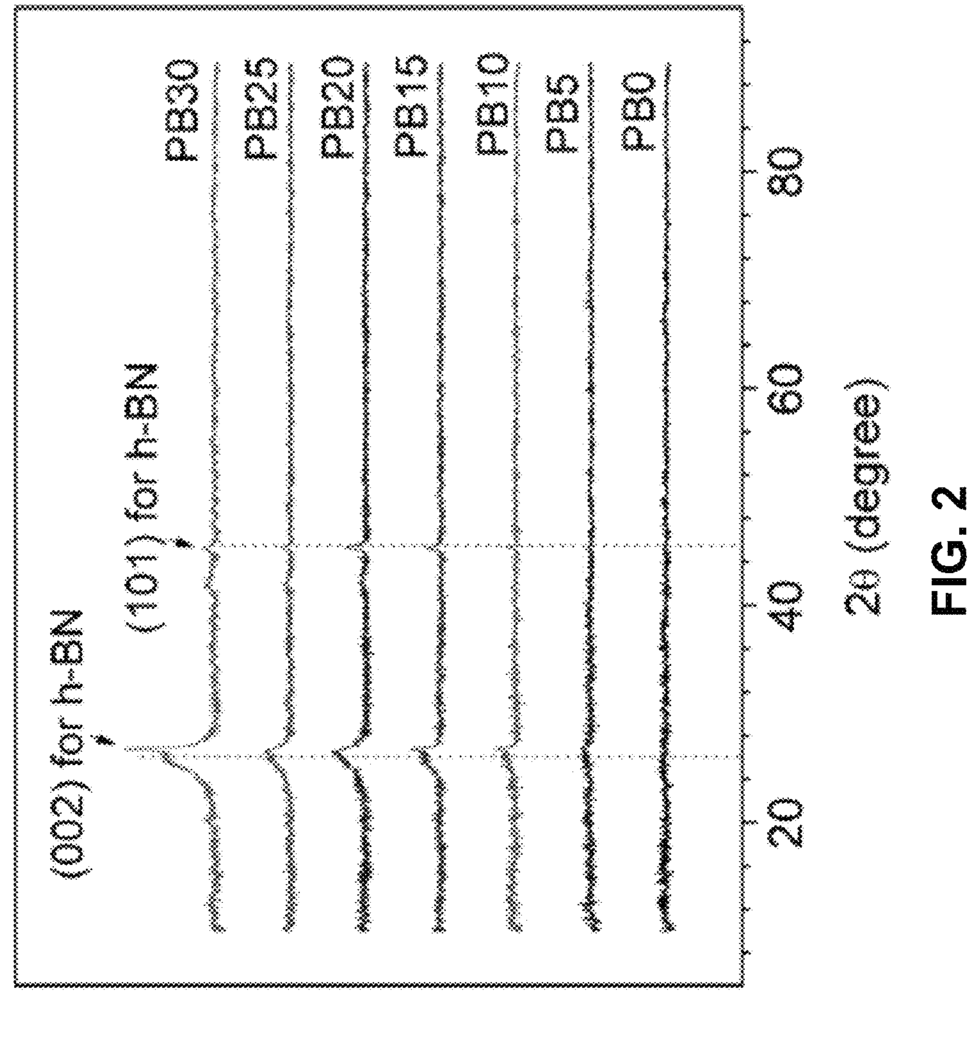
FIG. 2 shows X-ray diffraction (XRD) patterns of the BNNT-PDC nanocomposites.

FIG. 2 shows the XRD patterns of the BNNT-PDC nano-composites. There are no evident peaks detected in the pristine PDC sample (it is difficult to find a broad peak for the main peaks for the matrix ((111) peak for SiCN at 2θ around 35°, PDF 01-074-2309 and graphite at 2θ around) 26°), indicating an amorphous structure of the ceramic. BNNT peaks can be observed in all the BNNT-PDC nano-composites, evidenced by the increasingly obvious peaks for (002) and (101) plane for h-BN with the increase of the BNNT content. Above observation reveals that crystalline BNNTs are dispersed in the amorphous ceramic matrix.

Figures 3A, 3B, 3C, 3D, 3E, 3F:
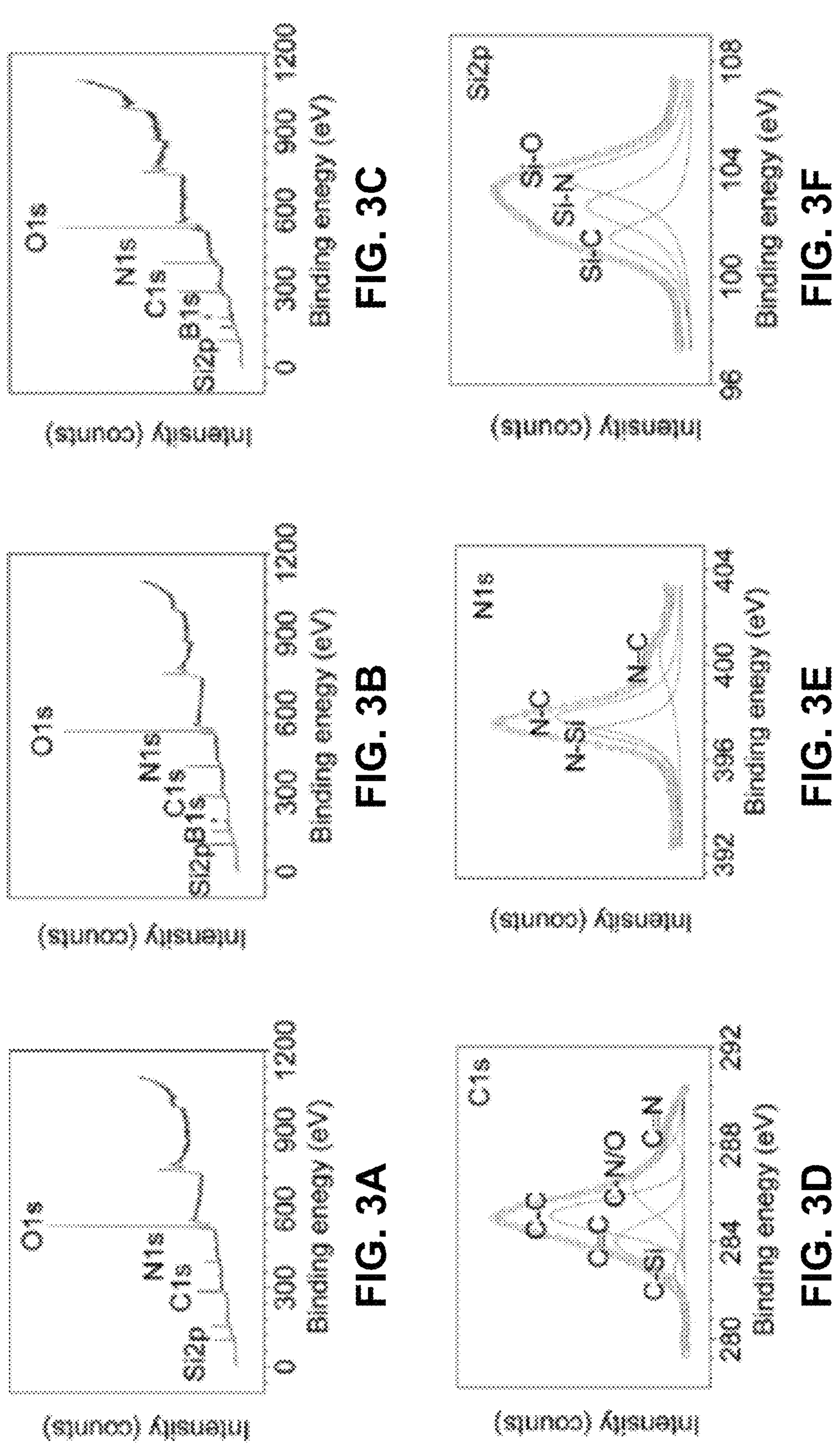
FIGS. 3A-3L show X-ray photoelectron spectroscopy (XPS) analysis of the BNNT-PDC nanocomposites.
Figures 3G, 3H, 3I, 3J, 3K, 3L:
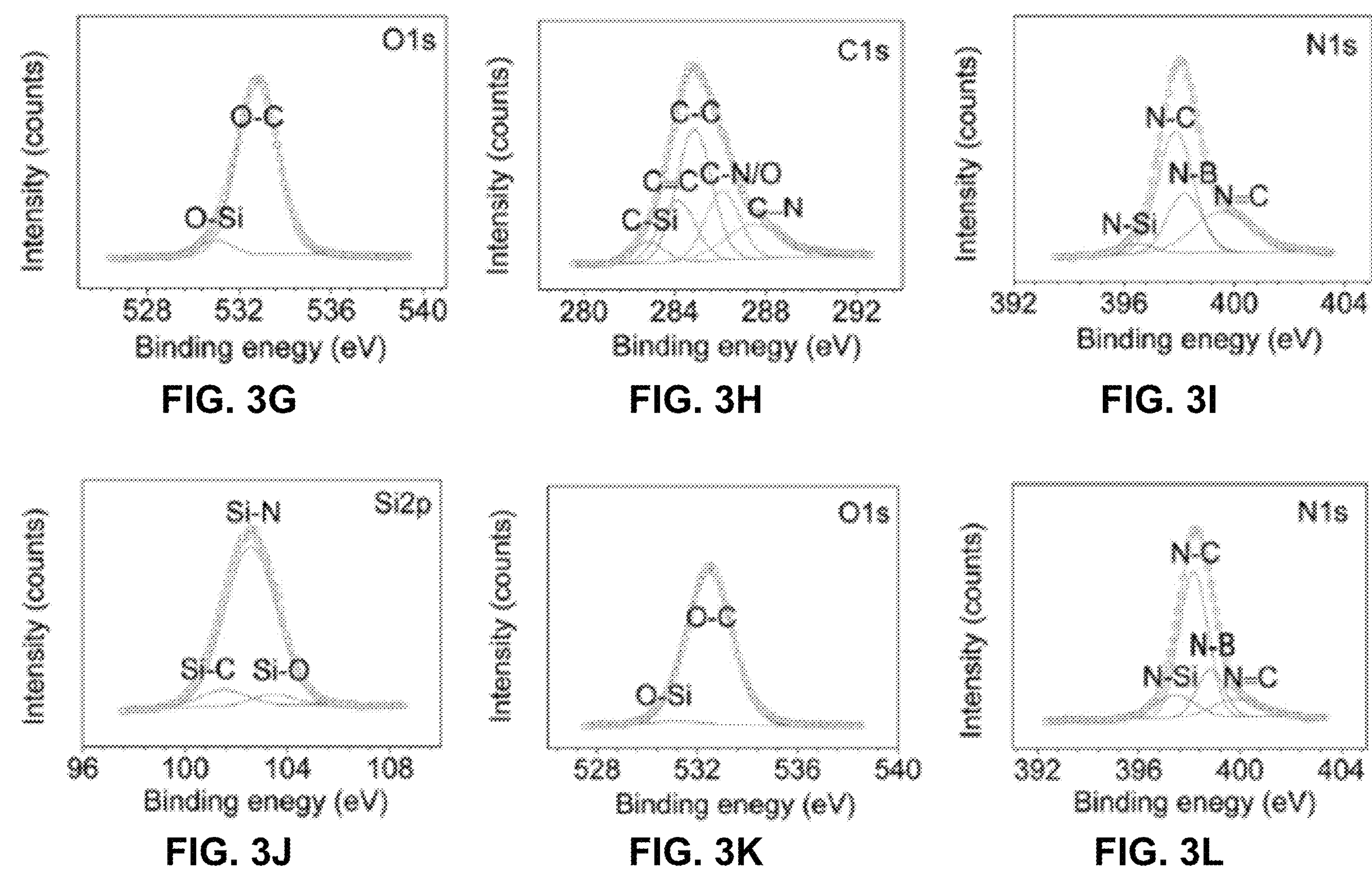

In order to know the detailed composition of the BNNT-PDC nano-composites, XPS analysis was conducted for the BNNT-PDC nano-composites, as shown in FIGS. 3A-3L. The element survey of the pristine PDC indicates a composition of Si—C—N for the ceramic. The introduction of O is because that the solution is dispersed in air. The element survey clearly shows the introduction of BNNTs for the BNNT-PDC nanocomposites (FIGS. 3A-3C). FIGS. 3D-3L show the XPS results for C1 s, N1s, Si2p, and O1s peaks, which were fitted by Lorentzian sum function. It can be seen that the C1s spectrum can be split into five peaks, centered at around 282.7, 284.0, 285.1, 286.3, and 288.8 eV, which can be assigned to C—Si, C═C, C—C, C—N/O, and C═N bonds, respectively. The peaks around 284.0 and 285.1 eV are attributed to sp$^3$ and sp$^2$ of free carbon formed by decomposition of the pre-ceramic precursor. The peaks located at 286.3 and 288.8 eV are attributed to the formation of $CN_x$. The N1s spectrum of the pristine PDC can split in three peaks, which are related to N—Si, N—C, and N═C bonds, centered at 397.2, 397.8, and 400.4 eV, respectively. There is an additional peak centered at around 398.6 eV for the BNNT-PDC nano-composites, which can be attributed to the N—B bond for the BNNTs. This peak is increasingly evident with the increase of BNNT content, as compared in FIGS. 3E, 3I, and 3L. The Si2p spectrum can split in three peaks, centered at 101.4, 102.6, and 103.7 eV, corresponding to the Si—C, Si—N, and Si—O bonds, respectively. The O1s spectrum can split in two peaks, centered at 531.0 and 532.8 eV, associated with the O—C and O—Si bonds, respectively. From these results, the pristine PDC illustrates a Si—C—N network structure, while the BNNT-PDC nano-composites is composed of Si—C—N network structure and crystalline BNNTs, which is consistent with the XRD analysis. Besides, O contamination is presented in the materials, which was introduced during the dispersion of the catalyzer into the liquid precursor. The O contamination might decrease the real relative permittivity of the PDC. However, by the comparison of the Si2p of the pristine PDC and PDC with 25 wt. % BNNTs, the influence of O contamination is reduced for the PDC with BNNTs (FIGS. 3F and 3J).

FIGS. 4A-4F show the SEM images of the PDC nano-composites reinforced with different fractions of BNNTs. The pristine PDC reveals a morphology feature with angular dense sections, loose boundaries, and pores. Some of the BNNTs show bridging above the gaps in the PDC, as seen from the PDC nano-composites reinforced with 5 wt. % BNNTs. Normally, the bridging of BNNTs is beneficial for the toughness of the PDC. Some of the BNNTs lap together when the BNNT fraction increases to 10 wt. %. As the BNNT fraction increases to 25 wt. %, networks form in the PDC matrix. Such BNNT networks indicate that the nanotubes are well embedded and distributed uniformly in the PDC matrix.

Figure 4E:
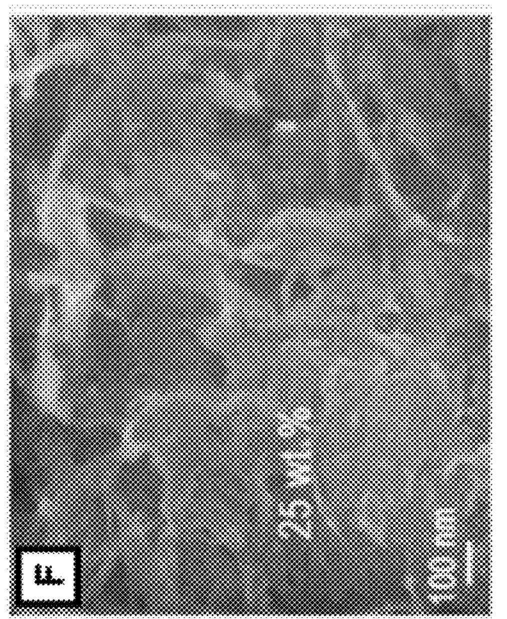
Figure 4F:
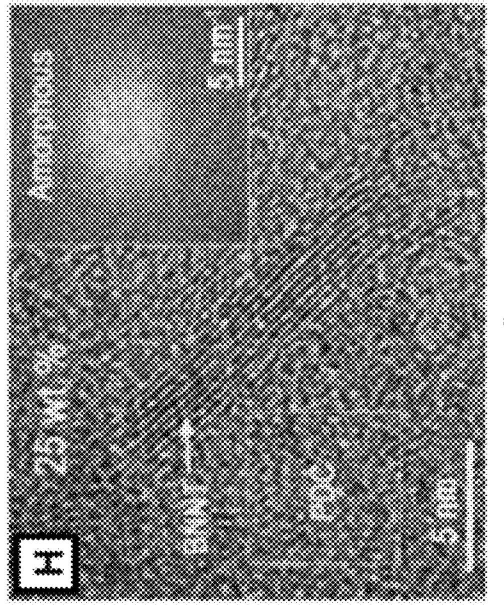
Figure 4G:
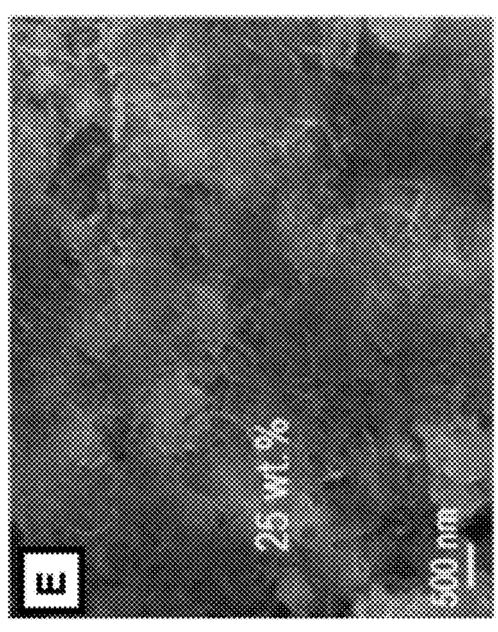
Figure 4H:
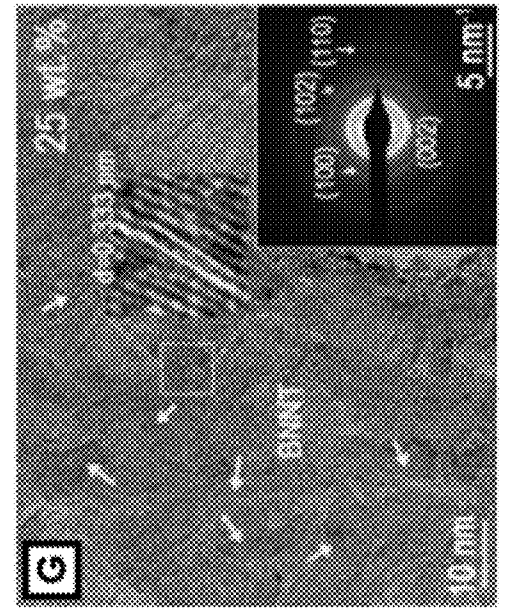

FIG. 4G is the TEM images and the corresponding selected area electro diffraction (SAED) of the PDC nano-composites reinforced with 25 wt. % BNNT. The (002), (100), (102) and (110) plane for h-BN verifies that the embedded nanotubes are BNNTs. The TEM image reveals that the BNNTs formed a percolation in the PDC matrix when the BNNT content is 25 wt. %. The percolation network will increase the difficulty for the electron to hop in the PDC matrix. FIG. 4H shows a BNNT possessing clean interface with the PDC matrix, indicating that the BNNT plays an inert filler role for the PDC system. The Fast Fourier Transform (FFT) of the framed area shown in FIG. 4H reveals an amorphous structure of the PDC matrix.

Mechanical Properties of the Fabricated Nanocomposites

Figure 5A:
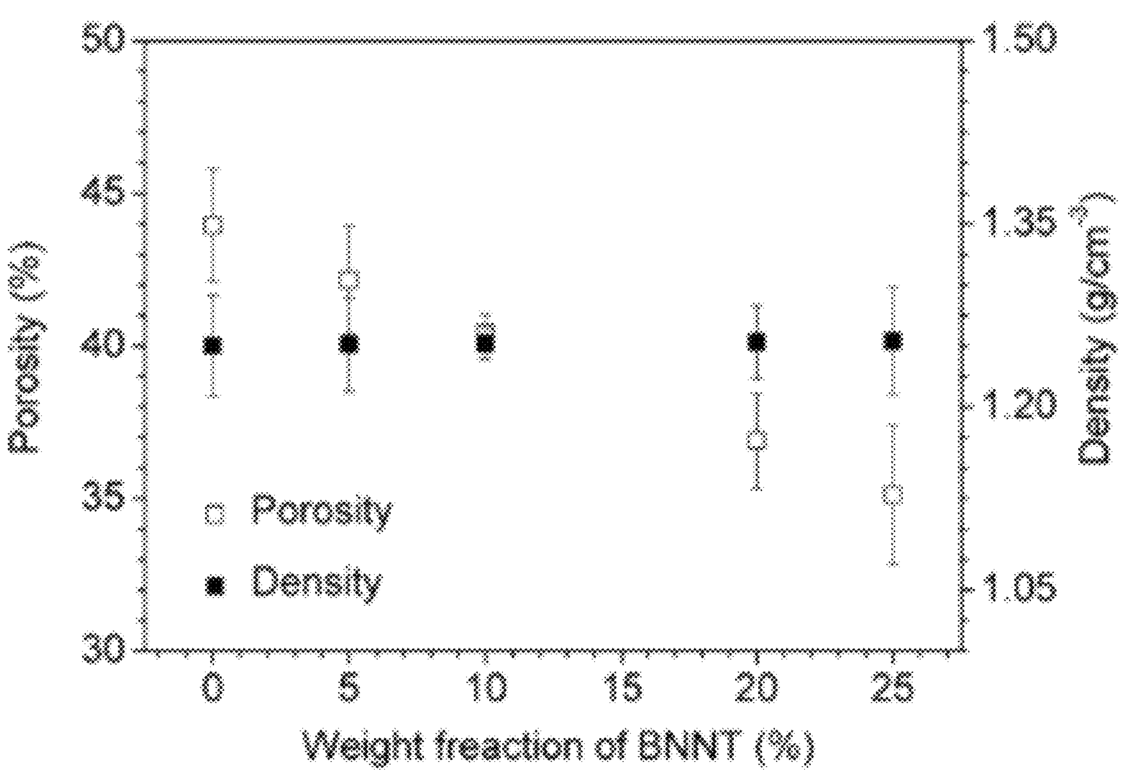
FIGS. 5A-5D show porosity.
Figure 5B:
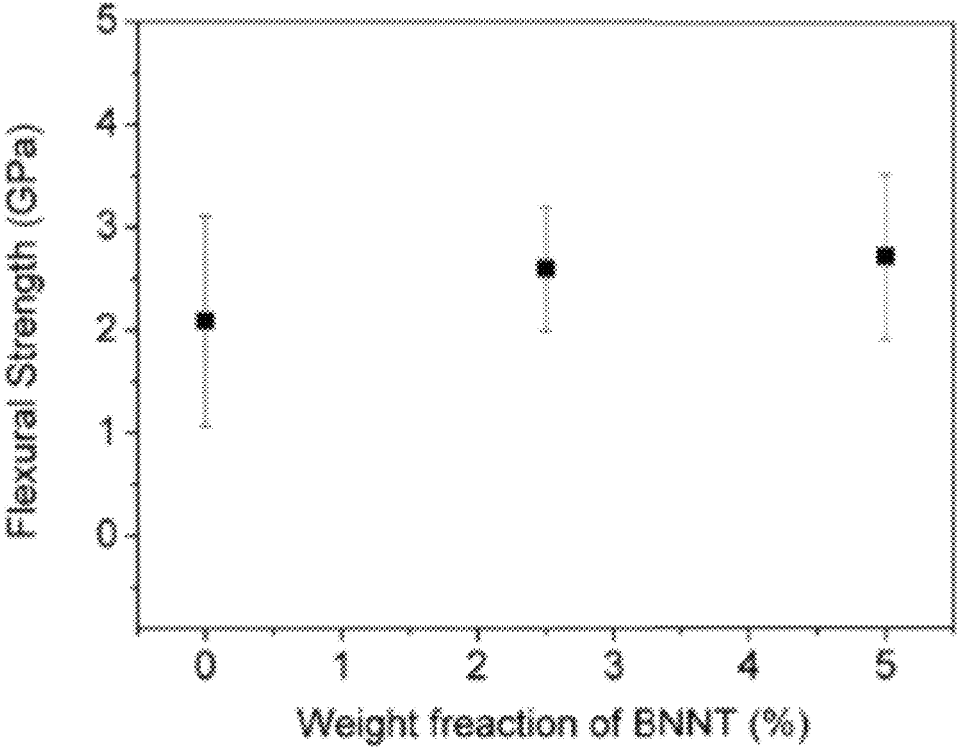
Figure 5C:
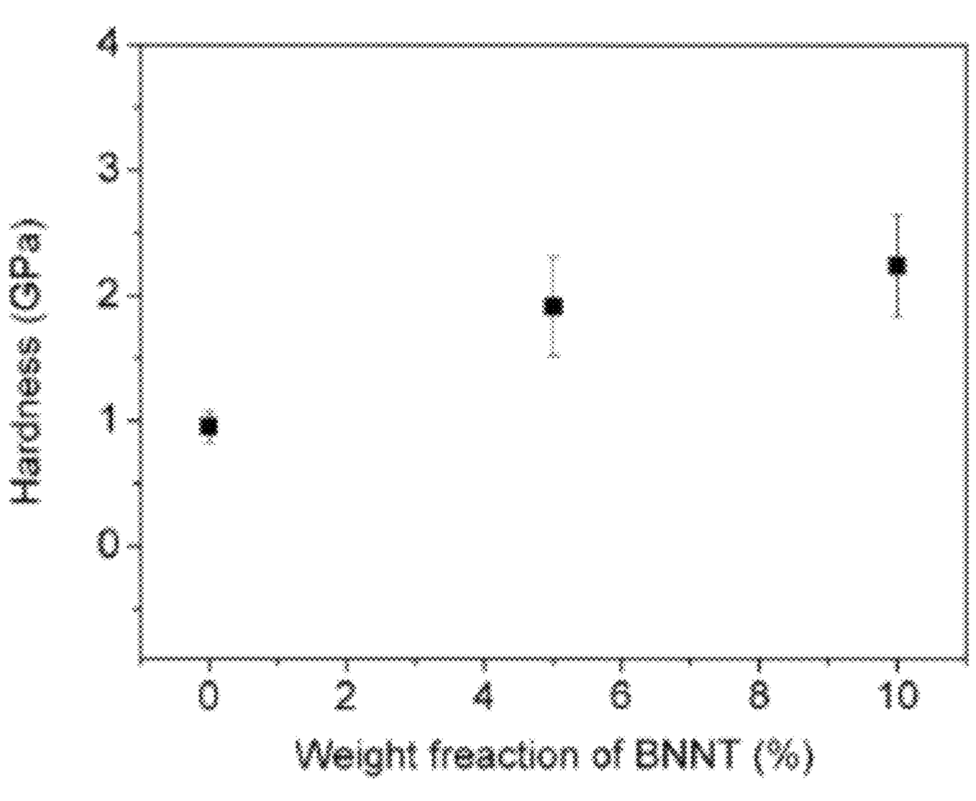
Figure 5D:
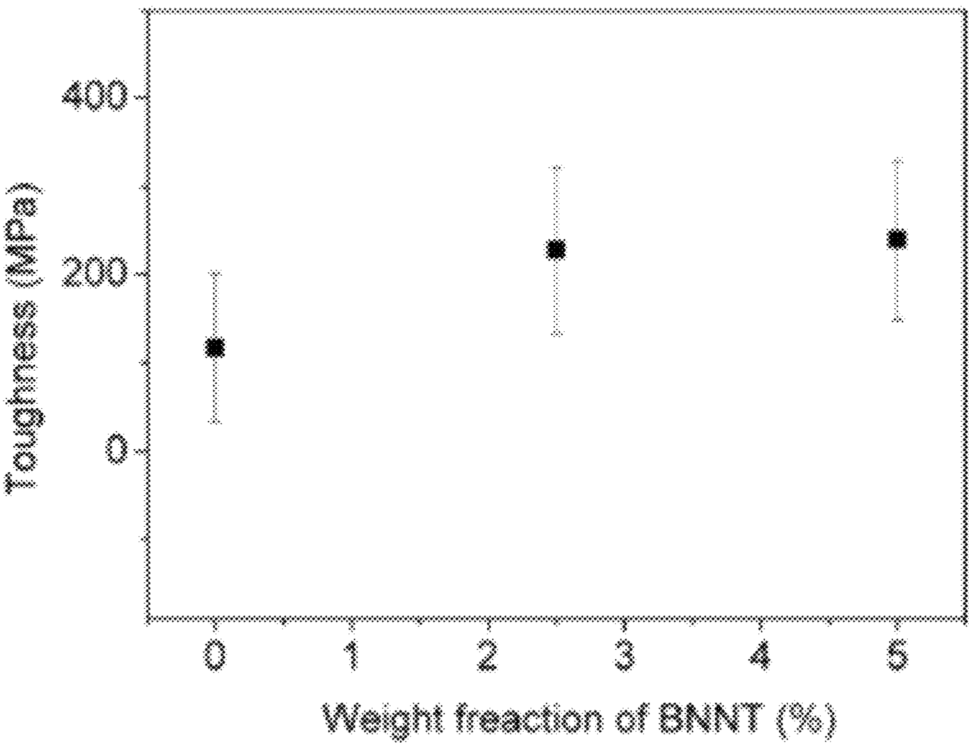

The densities and porosity of pristine PDC and the nano-composites with different weight fractions of BNNTs are shown in FIG. 5A. The BNNT-PDC nano-composites is denser than the pristine PDC and the density of the BNNT-PDC nano-composites slightly increases (the porosity slightly decreases) with the increasing BNNT weight fraction. The porosity of PDC reduces from 43.95% to 35.11% after addition of 25 wt. % BNNT. BNNTs act as fillers during the pyrolysis of PDC precursor, which can inhibit the shrinking and reduce the porosity of the PDC. The flexural strength, hardness and toughness of the materials are shown in FIGS. 5B-5D. The flexural strength, hardness and toughness were all improved after addition of the BNNTs. The flexural strength, hardness and toughness of the pristine PDC were 2.09 GPa, 0.95 GPa and 117.20 MPa, respectively. The flexural strength, hardness and toughness of the PDC with 5 wt. % BNNTs were 2.72 GPa, 1.91 GPa and 239.16 MPa, respectively. The flexural strength is higher than that of other potential electromagnetic wave transparent materials such as $Si_3N_4/SiO_2$ composite ceramics (120 MPa), $BN/SiO_2$ ceramic (121 MPa)$_3$, $BN/Si_3N_4$ (199 MPa) and $90Si_3N_4$-5MgO-$5Al_2O_3$ (wt %) composites (500 MPa).

Electrical Properties of the PCD-BNNT Nanocomposites

Figure 6A:
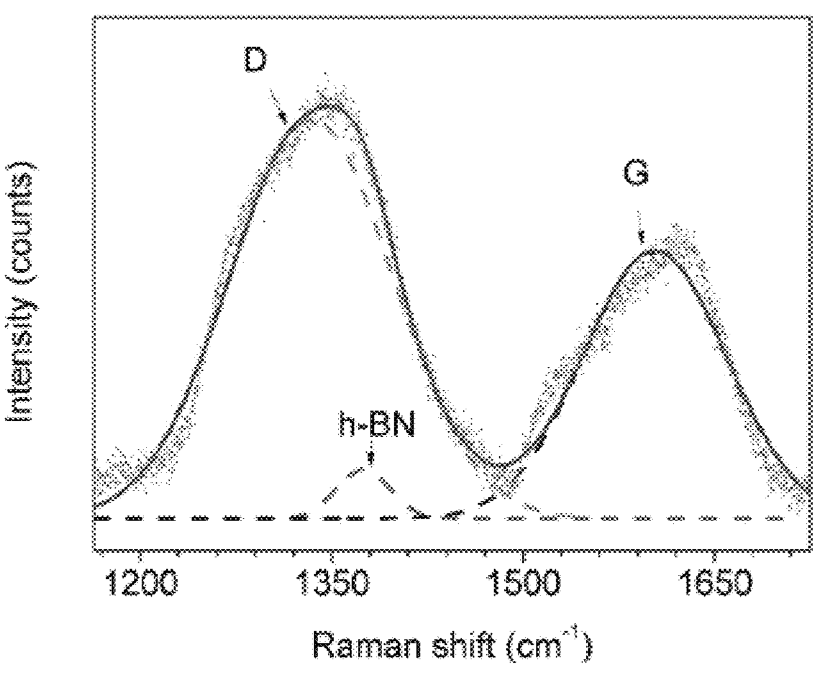
FIG. 6A shows Raman analysis of the PDC-BNNT nanocomposites.

FIG. 6A shows the Raman spectrum of the PDC-BNNT nano-composites. Two peaks around 1340 cm$^{-1}$ and 1603

Figure 6B:
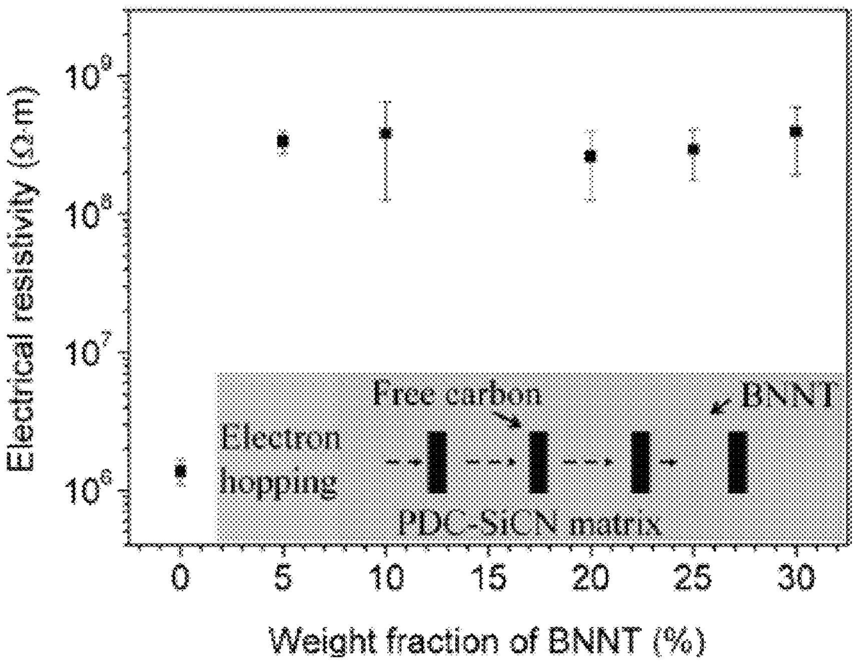
FIG. 6B shows electrical resistivity of the samples as a function of BNNT fractions. Inset of figure illustrates the electron hopping.

$cm^{-1}$, associated with amorphous carbon and graphite respectively indicate the existence of free carbon in the PDC matrix. The peak at around 1375 $cm^{-1}$ can be assigned to the h-BN. The electrical resistivity of PDC is associated with the $sp^2$ carbon (G) in the PDC matrix. A percolation network of $sp^2$ carbon will form when the pyrolysis temperature is above 1400° C. In this work, because of the low pyrolysis temperature (1000° C.), the percolation network is not formed, which results in a high electrical resistivity of the PDC matrix. Boron nitride nanotubes (BNNTs) are electrically insulating materials as a result of the constant and wide band gap of about 5.5 eV for BN. Therefore, with the increase of BNNTs content, the electrical resistivity sharply increases. FIG. 6B shows the electrical resistivity of the PDC with different fractions of BNNTs. The electrical resistivity of the pristine PDC is around $10^6$ Ω·m. After addition of 5 wt. % BNNTs, the electrical resistivity of the nanocomposites increases two orders of magnitude, reaching $10^8$ Ω·m. Further increasing the content of BNNTs does not drastically increase the electrical resistivity, indicating that the PDC-BNNT nanocomposites have good insulating capability. The electrical resistivity change is mainly due to the charge carrier hopping within the PDC-SiCN matrix phase. The introduction of BNNTs might impede the electron hopping which originally can hop from the adjacent free carbon, as illustrated in the inset of FIG. 6B.

Dielectric Properties of the PDC-BNNT Nanocomposites

Figure 7:
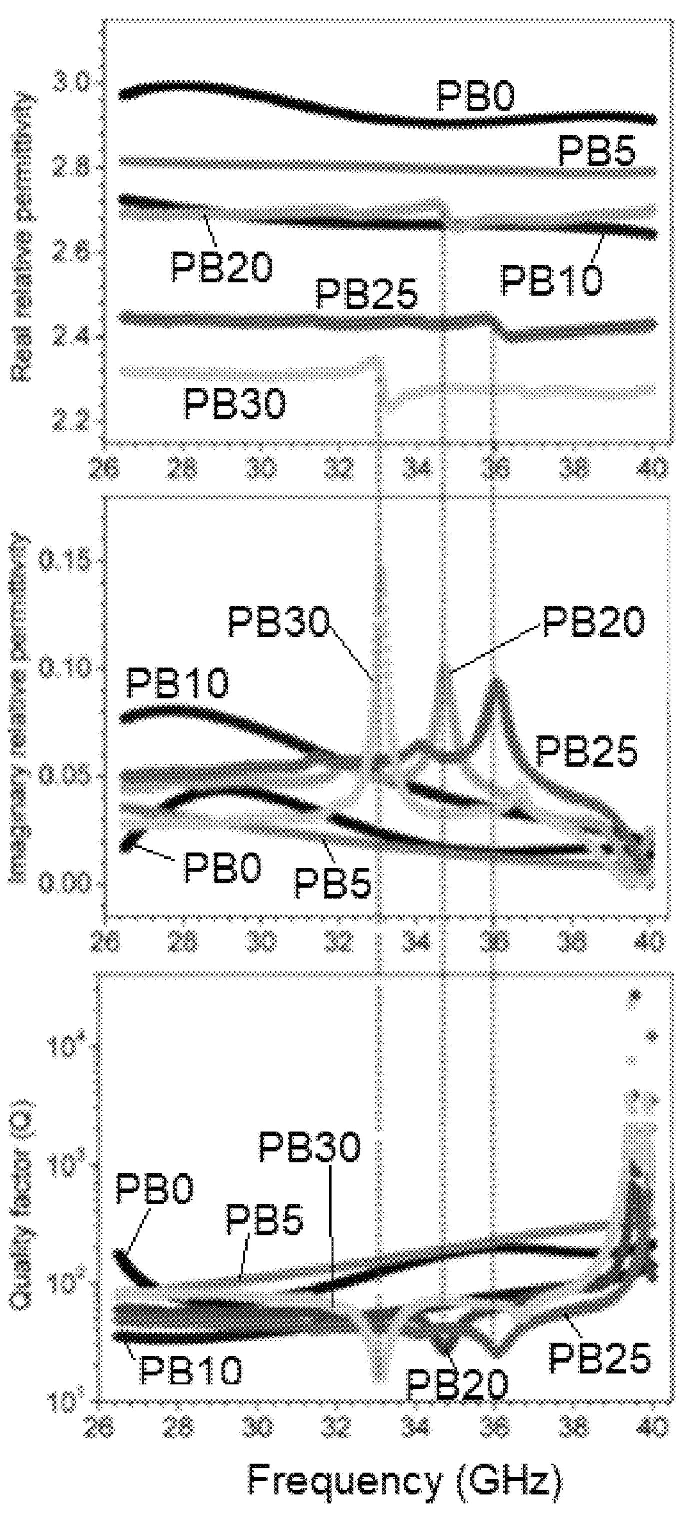
FIG. 7 (top and middle) shows complex relative permittivity of PDC-BNNT with various weight fractions.
Figure 8A:
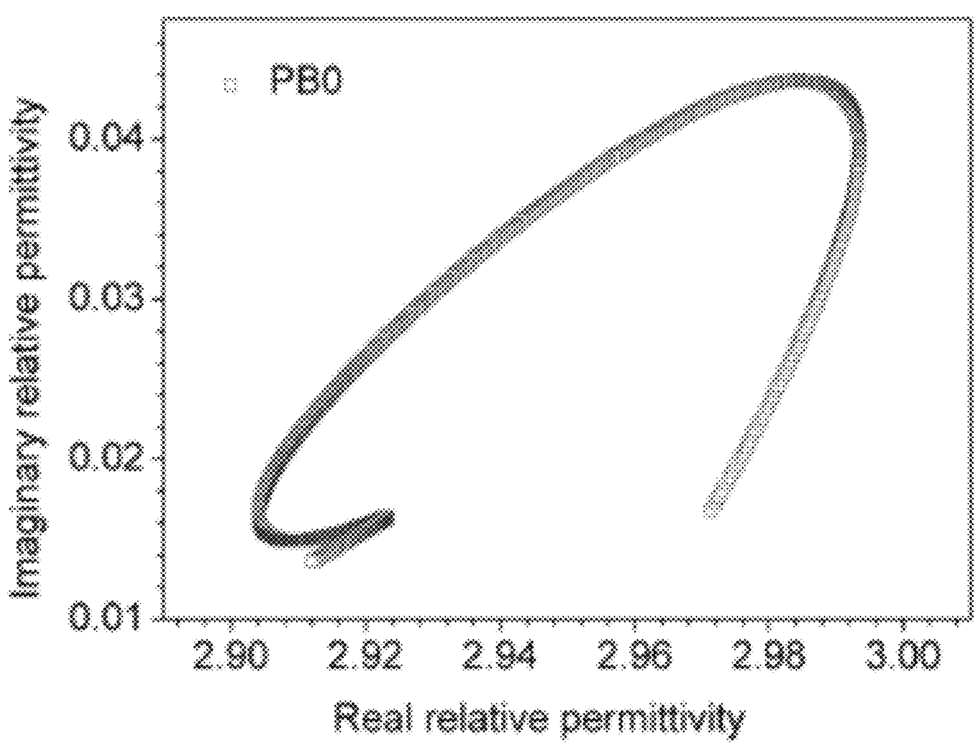
FIGS. 8A-8F show the relationship between the real relative permittivity and imaginary relative permittivity of PDC-BNNT with various weight fractions.
Figure 8B:
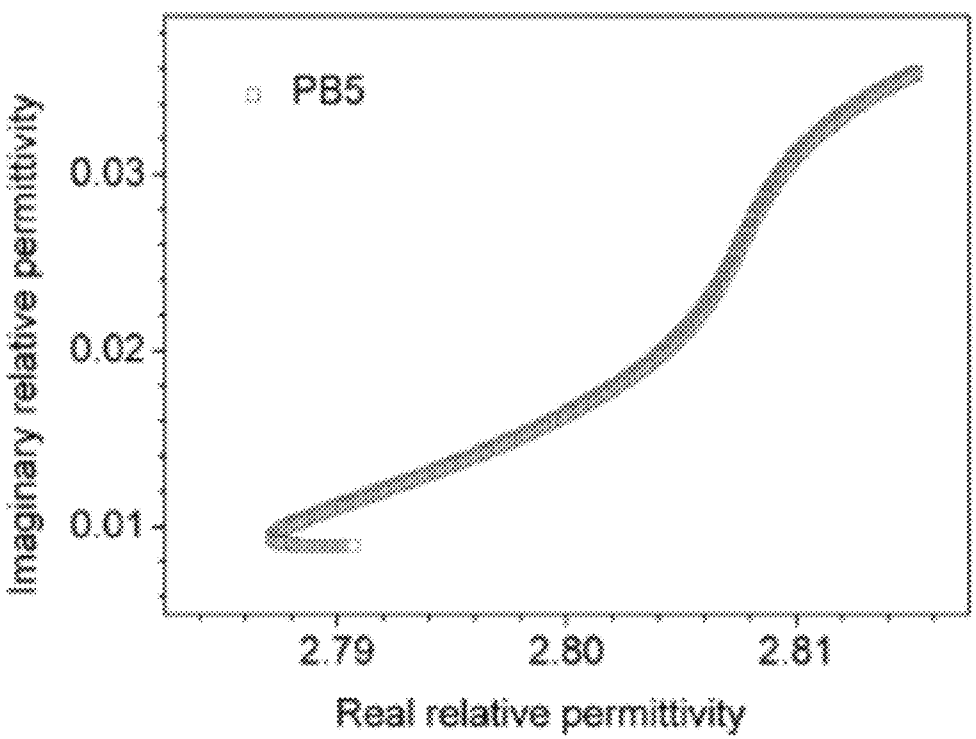
Figure 8C:
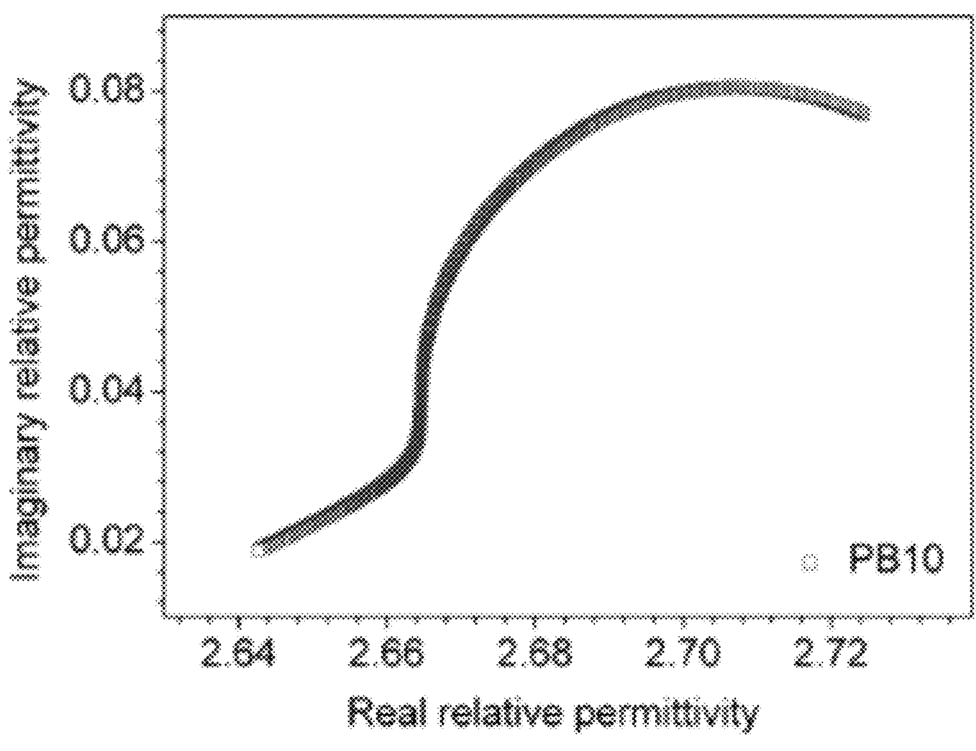
Figure 8D:
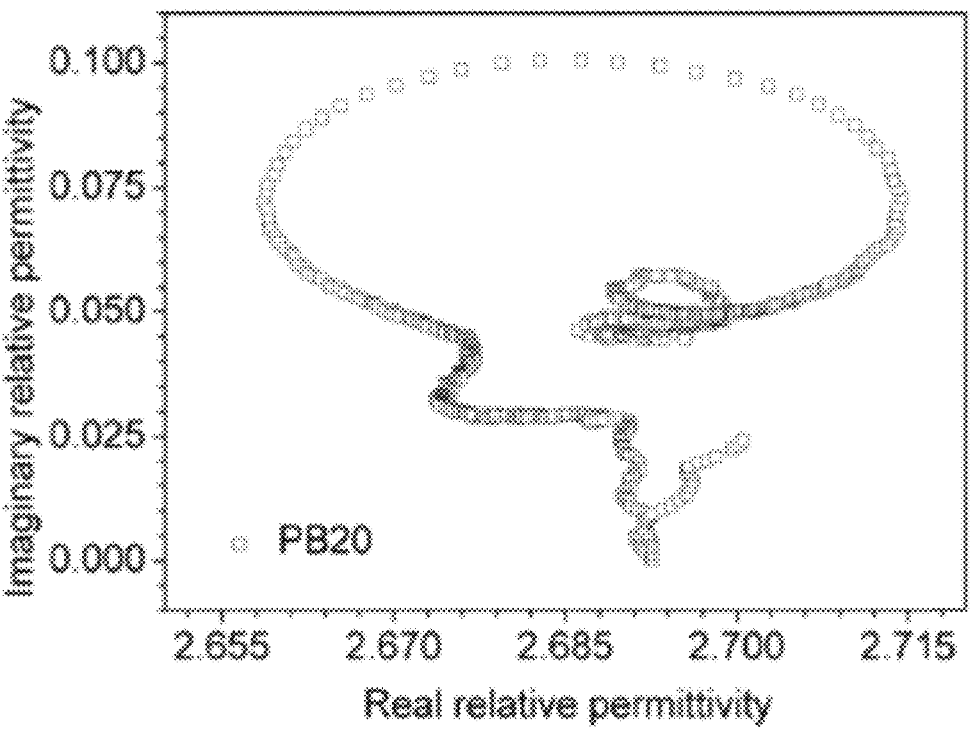
Figure 8E:
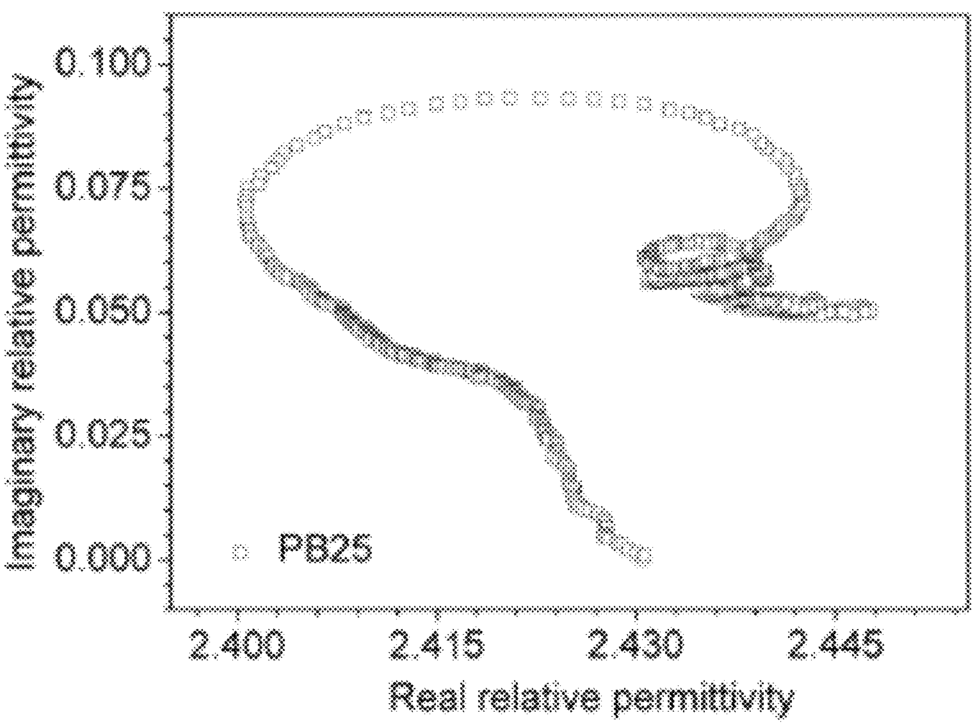
Figure 8F:
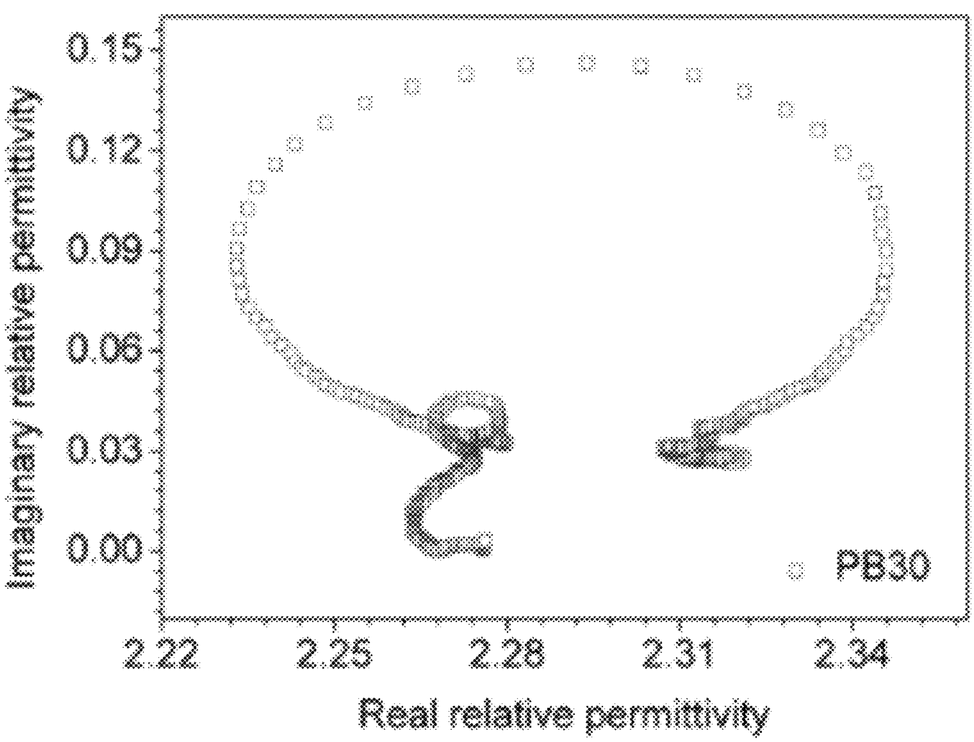

The relative complex permittivity and quality factor of the PDC-BNNT with various fractions is shown in FIG. 7. The average real (ε') and imaginary (ε") relative permittivity of the pristine PDC is 2.94 and 0.026 in Ka band, which results in a high quality factor (Q) of 134.40. The high Q factor suggests that the PDC matrix is a wave transmitting material. After the loading of BNNTs, the real relative permittivity of the nano-composites decreases. The average real relative permittivities of the nanocomposites decrease to 2.80 and 2.67, when the BNNT loading is increased to 5 wt. % and to 10 wt. %, respectively. The real relative permittivities of the nano-composites are further reduced when the BNNT content is higher than 10 wt. %, which is close to the value of BN reported previously. The average imaginary relative permittivity (0.019) decreases and the Q factor (176.77) increases, compared to that of pristine PDC when the BNNT content is 5 wt. %, which is due to the decreased porosity after introduction of BNNTs. However, further increasing the BNNT content increases the imaginary relative permittivity and decreases the Q factor at low and middle frequency, which means that excess BNNTs cause material losses when interacting with the EM wave at these frequency range, although the real relative permittivity of the nano-composites further decreases. The Q factor shows an increase at high frequency when the BNNT content is high, which makes the average Q factor of the PDC further increase. For example, the average real relative permittivity decreases to 2.29, while the average Q factor increases to 208.60 when the BNNT content is increased to 30 wt. %.

Figure 9:
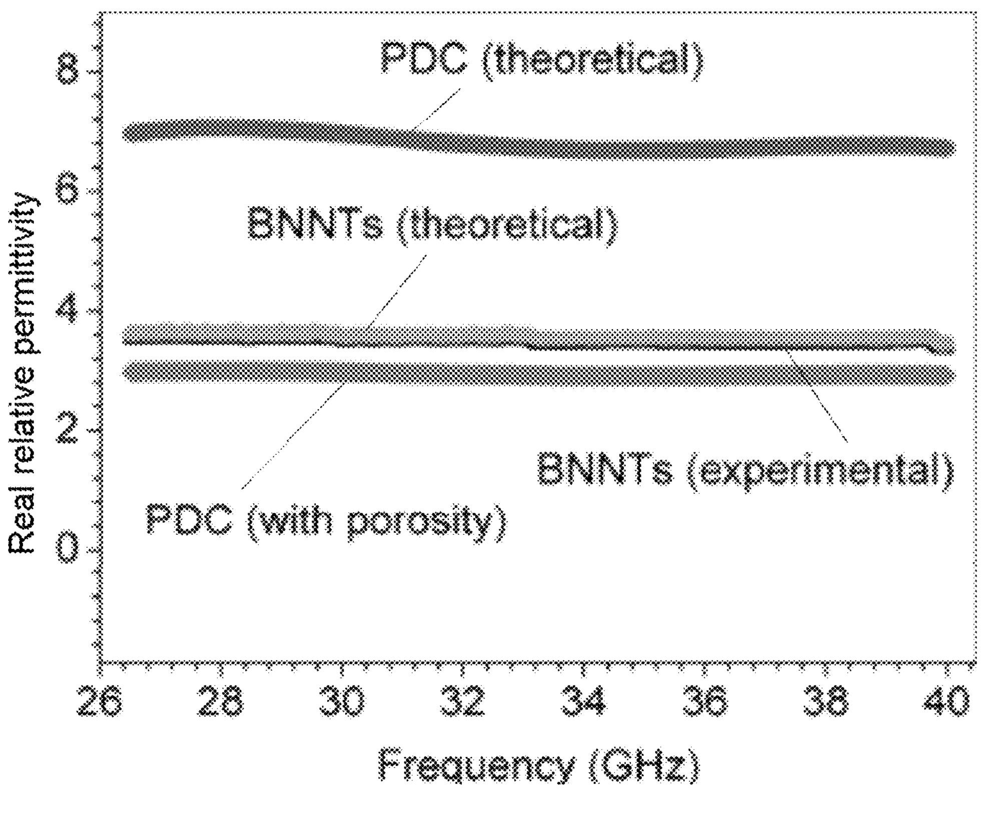
FIG. 9 shows calculated theoretical real permittivity of the pristine BNNTs and the pristine PDC.
Figure 10A:
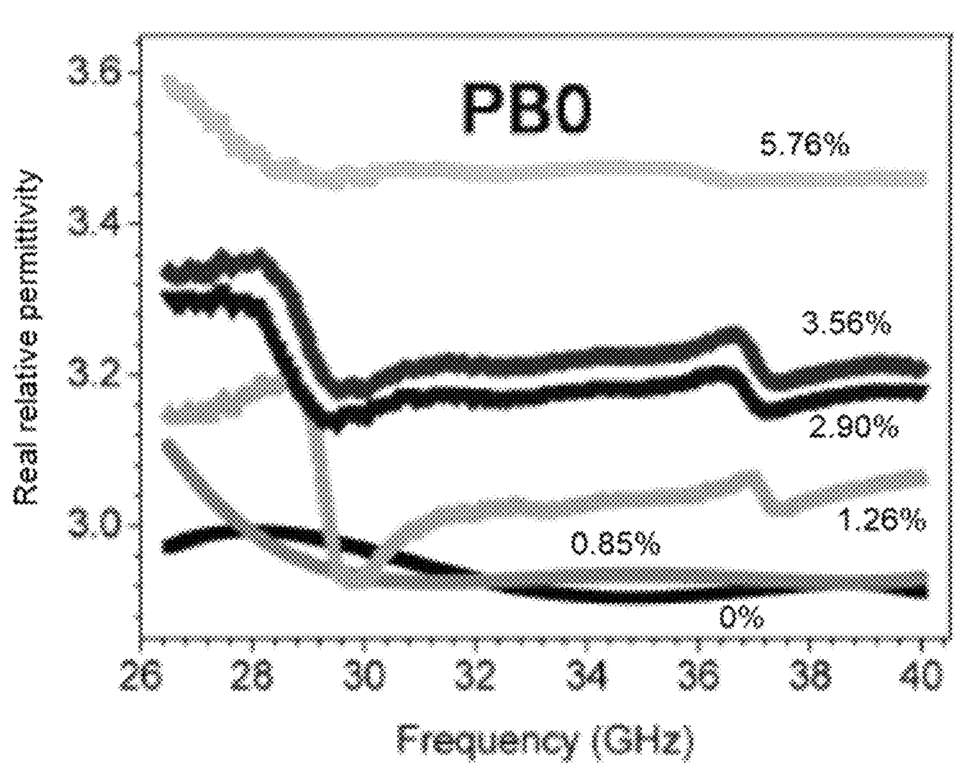
FIGS. 10A-10F show the effect of moisture on the dielectric properties of the PB0 (FIGS. 10A-10C) and PB5 (FIGS. 10D-10F) samples.
Figure 10B:
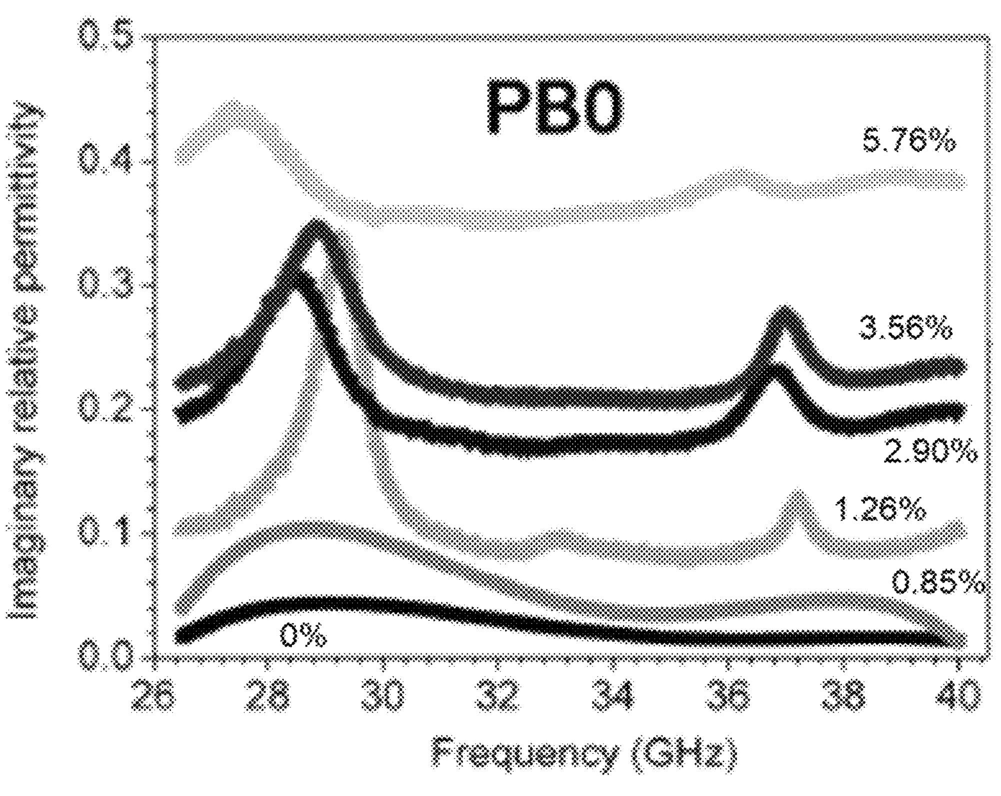
Figure 10C:
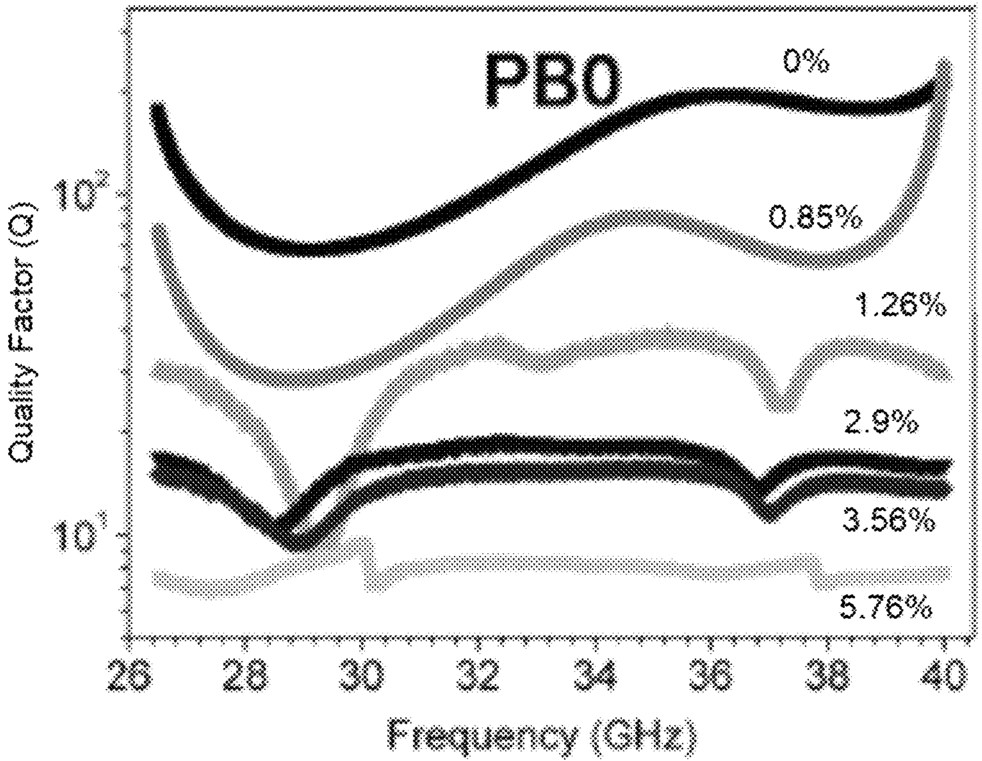
Figure 10D:
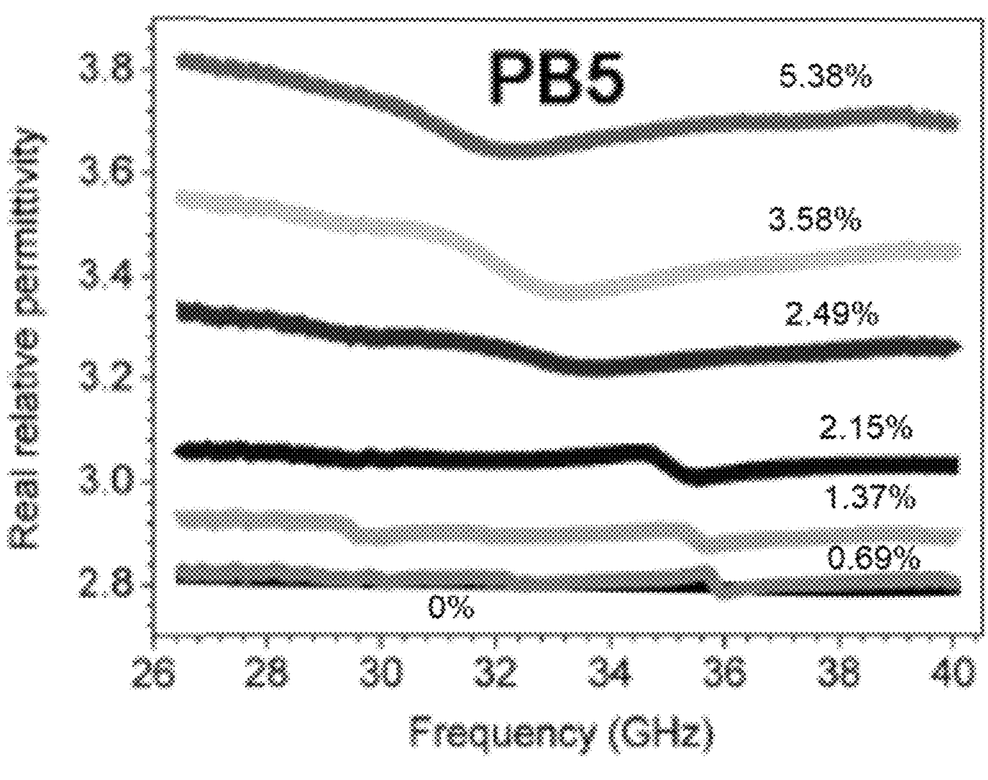
Figure 10E:
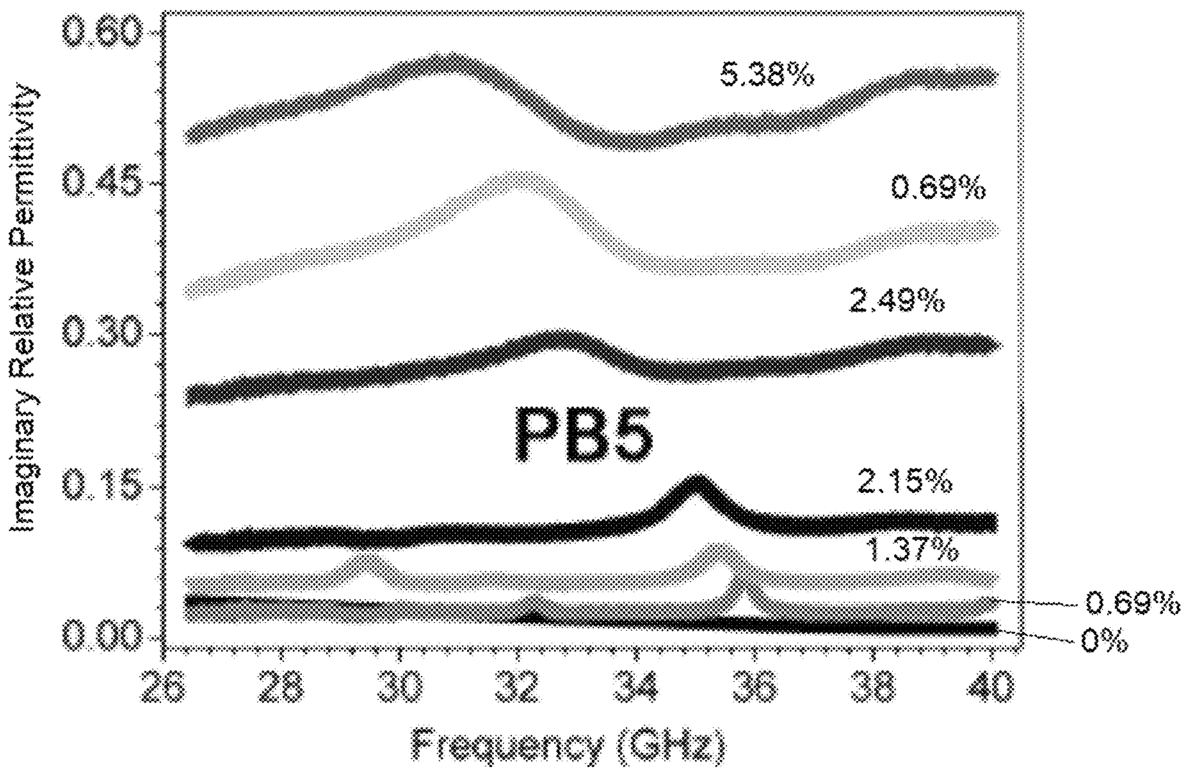
Figure 10F:
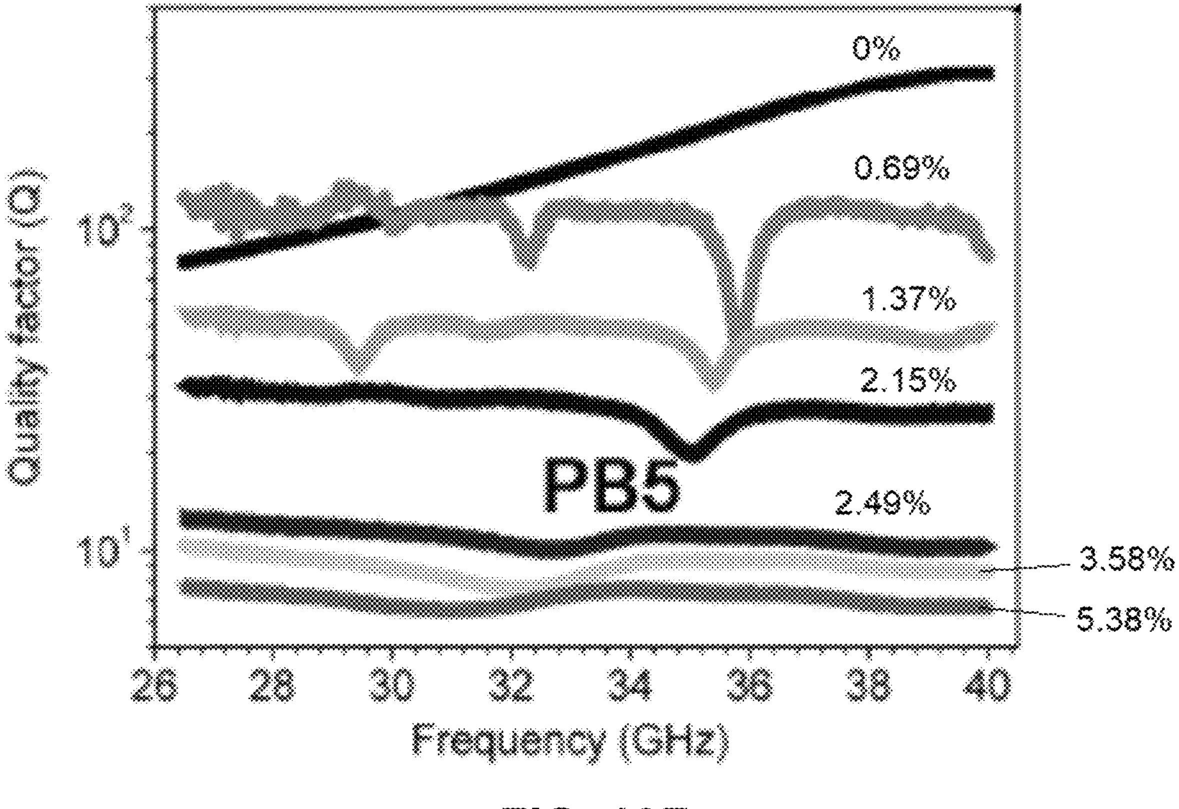

The effect of porosity on the real relative permittivity of the material can be described by the Lichtenecker-Rother equation:

$$\log \varepsilon'_p = (1-p)\log \varepsilon'_0 \qquad (1)$$

where $\varepsilon'_p$ and $\varepsilon'_0$ are the real relative permittivities of porous and dense materials, and p is the total porosity. The real relative permittivity will decrease when the porosity is increased. Since the porosity in this work is decreased while real relative permittivity is decreased when the BNNT content is increased, the decrease in the real relative permittivity of the PDC-BNNTs nano-composites is due to the introduction of BNNTs. However, the porosity influences the total real relative permittivity of the composites. The real relative permittivity of the pristine BNNTs was also measured using the PNA by pressing the BNNTs into disc samples. A density of 1.36 $g/cm^3$ was acquired after pressing the BNNTs, which is close to the theoretical density of BNNTs (1.38 $g/cm^3$). Therefore, the measured real relative permittivity of the pristine BNNTs should be close to the theoretical value in Ka band. The results are shown in FIG. 9, which reveals that the average real relative permittivity of the pristine BNNTs is 3.57, almost similar to the experimental value of the pristine PDC (3.51, containing the porosity). Because the real relative permittivity of the PDC-BNNTs composites is lower than that of the BNNTs, the porosity reduces the total real relative permittivity of the composites.

As fillers, the BNNTs can reduce the shrinkage and porosity of the PDC during pyrolysis. Therefore, the main effect of the BNNTs is to increase the Q factor of the nano-composites. Besides, the BNNT can increase the electrical resistivity of the PDC.

The relationship between the real relative permittivity and imaginary relative permittivity of PDC-BNNT is plotted in FIGS. 8A-8F. As shown, the relationship between the real relative permittivity and imaginary relative permittivity of PDC without BNNTs and with 5 wt. % and 10 wt. % BNNT reveals similar dielectric characters to that of the pristine PDC, without evident regular locus or semi-cycles (Lorentz resonance relaxation and Debye relaxation), indicating that there is no additional dielectric loss introduced in the PDC after addition of BNNTs. This phenomenon verifies the electromagnetic transparent characteristic of PDC SiCN after being reinforced by the BNNTs. The relationship between the real relative permittivity and the imaginary relative permittivity of PDC with BNNT content higher than 10 wt. % reveal helical lines, indicating that the dielectric loss might be caused by the Lorentz resonance relaxation process when the BNNT content is higher than 10 wt. %, which can be described by the following equation:

$$(\varepsilon'-\varepsilon_\infty)^2+(\varepsilon'')^2=\frac{(\varepsilon_0-\varepsilon_\infty)^2}{\left[1-(f/f_r)^2\right]^2+(f/f_d)^2} \qquad (2)$$

where $f_d$ and $f_r$ are the Debye relaxation and natural resonance frequencies defining the shape of dispersion curve, respectively. When the frequency increases, the locus of Eq. 2 becomes a helical line due to varying radius of the circle. The relationship between the real relative permittivity and the imaginary relative permittivity of PDC-BNNT indicates that dielectric loss occurs in the nano-composites after addition of high fractions of BNNTs.

Figure 11:
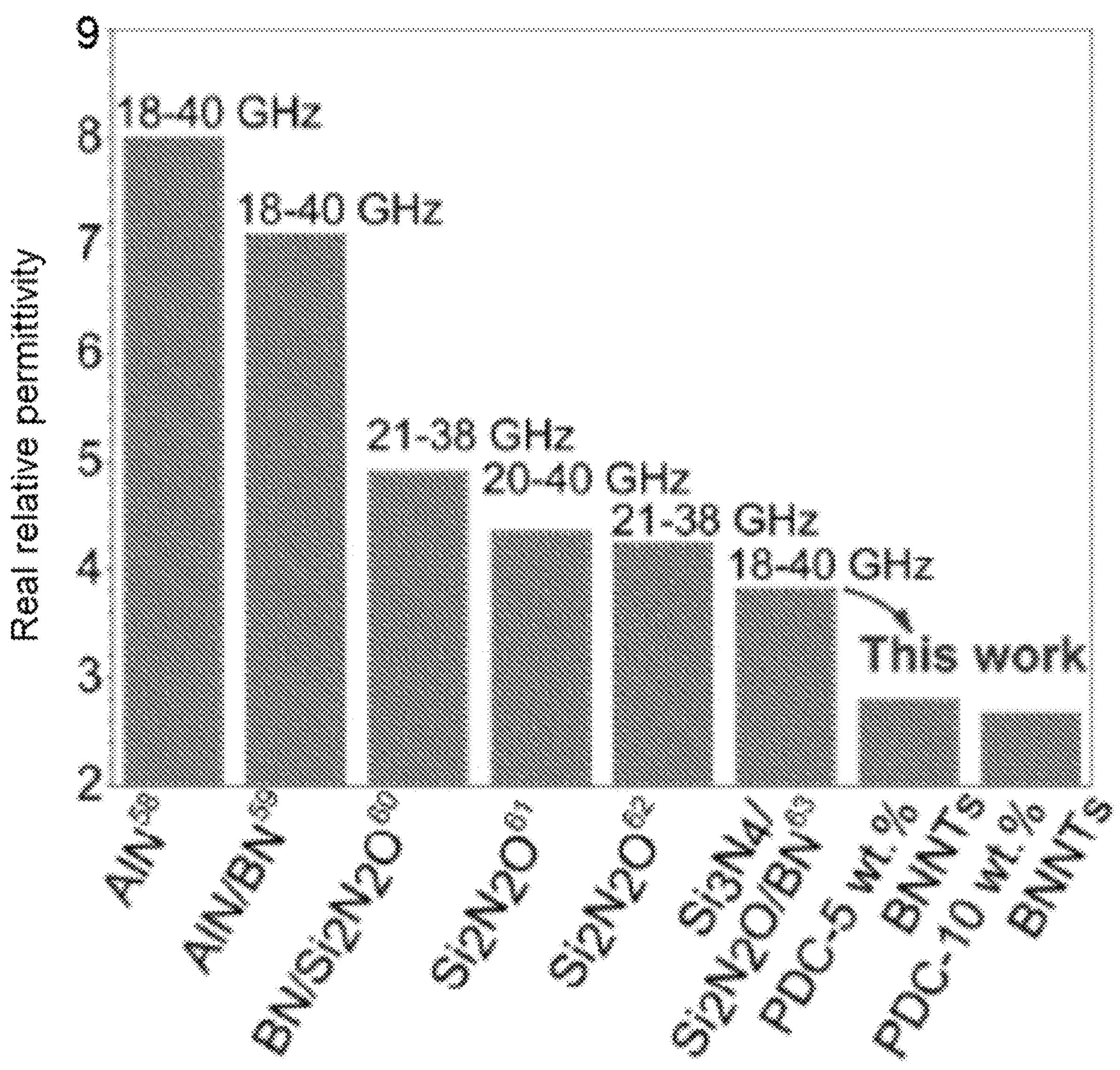
FIG. 11 shows a comparison of the dielectric properties of PDC-BNNT composites with other typical ceramics (ceramic composites) with similar dielectric properties for EM transparent applications, frequency overlapping the Ka band.

FIG. 11 compares the dielectric properties of the PDC-BNNT composites with other typical ceramic composites that can be used for EM transparent materials (dielectric loss meets the requirement for EM transparent application) in the literature overlapping with the Ka band (26.5-40 GHz). It can be seen that, our ceramic composites have a lower real relative permittivity compared to that reported in these references, which means that more EM wave can enter into the materials. Also, the quality factor of the PDC-BNNT composites can be tunable based on the BNNT content to meet the requirement for EM transparent application. These features make it an attractive ceramic composite with good thermal shock, corrosion resistance and EM transparent properties.

Effect of Moisture on the Dielectric Properties of the PDC-BNNT Nanocomposites To analyze the effect of moisture on the dielectric property of the PDC-BNNT nano-composites, water was introduced into the samples via full immersion in sealed containers of distilled water maintained at 25° C. in a constant temperature water bath. The water content of each sample was calculated based on gravimetric weight gain data, which was collected periodically during the absorption process using a high precision analytical balance. In order to isolate the effect of absorbed water from surface water, all samples were carefully dried with a lint-free cloth and exposed to 25° C. in air briefly to allow evaporation of all residual surface water prior to testing. FIGS. 10A-10F show the real relative permittivity and Q factor of the pristine PDC (PB0) and PDC with 5 wt. % BNNTs (PB10) under different water contents. As seen from the results, the moisture increases the real relative permittivity and decreases the Q factor of the materials. However, the moisture has a small effect on the dielectric properties of PB5 when the water content is low. The average real relative permittivity of the PB5 under different water content of 0.69 wt. % and 1.37 wt. % is 2.81 and 2.91, respectively (the value without moisture is 2.80). The average Q factor of the PB5 under different water content of 0.69 wt. % and 1.37 wt. % is 108.21 and 48.20, respectively (the value without moisture is 134.40).

Conclusion

Dielectric properties of different weight fractions of boron nitride nanotube (BNNT) reinforced ceramic composites fabricated by the polymer derived ceramic (PDC) processing route have been investigated in this paper. After the addition of 5 wt. % BNNTs, the electrical resistivity of the nanocomposites increases two orders of magnitudes, reaching to $10^8$ Ω·m. Further increasing the content of BNNTs does not evidently increase the electrical resistivity, indicating that the PDC-BNNT nanocomposites have good insulating property. The average real relative permittivity of the PDC decreased from 2.94 to 2.80, while the quality factor (Q) of the PDC increased from 134.40 to 176.77 when the BNNT content is 5 wt. %, which is due to the decreased porosity after introduction of the BNNTs. Further increasing the BNNT content decreases the real relative permittivity of the nanocomposites, and increases the Q factor at high frequency. The average real relative permittivity decreases to 2.29, while the average Q factor increases to 208.60 when the BNNT content is increased to 30 wt. %. Relationship between the real relative permittivity and the imaginary relative permittivity of the PDC-BNNT nanocomposites showed that the dielectric loss with a high loading fraction of BNNTs may be caused by a Lorentz resonance relaxation process. Results of this work illustrated a satisfactory microwave transparent material system when the BNNT loading is lower than 10 wt. %.

Example 3: Materials and Methods for BNNT/SiON Composites

Materials

Commercially available boron nitride nanotube (BNNTs) puffballs were provided by BNNT, LLC (SP10-R, Newport News, VA), wherein synthesis involves use of the HTP method during the manufacturing process. A proprietary purification method was used by the vendor to remove almost all of the elemental boron to produce this refined product with >99% boron nitride. Polysilazane (NN120-20 (A), durXtreme GmbH, Germany) was obtained in the format of a 20 wt. % solution of perhydropolysilazane (PHPS) in di-n-butyl ether.

Synthesis of BNNT/SiON Composites

To prepare the refined mat, a BNNT SP10-R refined puffball was selected and placed between two weighing paper (nitrogen-free, 4×4 inch, LAB SAFETY SUPPLY™) with the edge stapled. Then the above-mentioned materials were placed between two steel plates and applied a uniaxial pressure by benchtop presses (Model 4386, CARVER®, USA) until a BNNT sheet with a thickness of 0.2 mm formed. Subsequently, the BNNT sheets were completely immersed in the PHPS solution. After the infiltration was complete, the wet sample was squeezed out and the excess PHPS solution on the surface of the sample was also removed using paper towels. The drying process took place overnight, and the filtration step was repeated 3 times to synthesize the SiON/BNNTs composite. The thickness of the final sample was around 0.3 mm.

Characterization

Thermal stability was analyzed using a Discovery DSC250 (TA Instruments, USA) under an air atmosphere. Pure BNNTs, PHPS-derived SiON, and SiON/BNNTs composite were weighed into Tzero aluminum pans (TA Instruments) and measured in a heating cycle from room temperature to 950° C. at 10° C./min, respectively. Further thermal analysis was conducted in a tube furnace (Carbolite Gero 30-3000° C., USA) at 1000° C. in the air for up to 100 h.

The XRD analysis was measured with a multifunctional Rigaku SmartLab X-ray diffractometer (Rigaku Corporation, Tokyo, Japan) equipped with a rotating copper cathode in the Bragg-Brentano configuration. Samples were scanned at a step size of 0.25° in a 2θ range of 10-90°. High-temperature X-ray diffraction measurements were carried out using PANalytical Empyrean diffractometer with Anton Paar HTK 1200. The sample was heated from 25° C. to 1000° C. with a ramp of 2° C./min and a dwell time of 60 min.

The micro/nanostructures of the composite sample were characterized by a field-emission scanning electron microscope (FE-SEM, FEI Verios 460L). The hydrophilic or hydrophobic characteristics of pure BNNTs and SiON/BNNTs composite were evaluated via the contact angle measurement (Ramé-hart Model 260 Contact Angle Goniometer), measured using the tangent line between a drop of water and the sample surface.

The S-parameters and permittivity were measured through the waveguide method. The measurement setup consisted of a vector network analyzer (Keysight, N5225A PNA, 10 MHz to 50 GHz), coaxial cable, waveguide cavity, calibration kit (Keysight, R11644A, 26.5 GHz to 40 GHz), and sample holder. The scattering parameters (S-parameters) were directly measured and recorded by PNA, and the permittivity was calculated according to Nicolson-Ross-Weir (NRW) algorithm. The relative complex permittivity of samples with dimensions of 7.112 mm×3.556 mm×3.556 mm was measured within Ka-band frequency (26.5 GHz to 40 GHz).

Example 4: Results and Discussion

Structural Evolution

Figure 12:
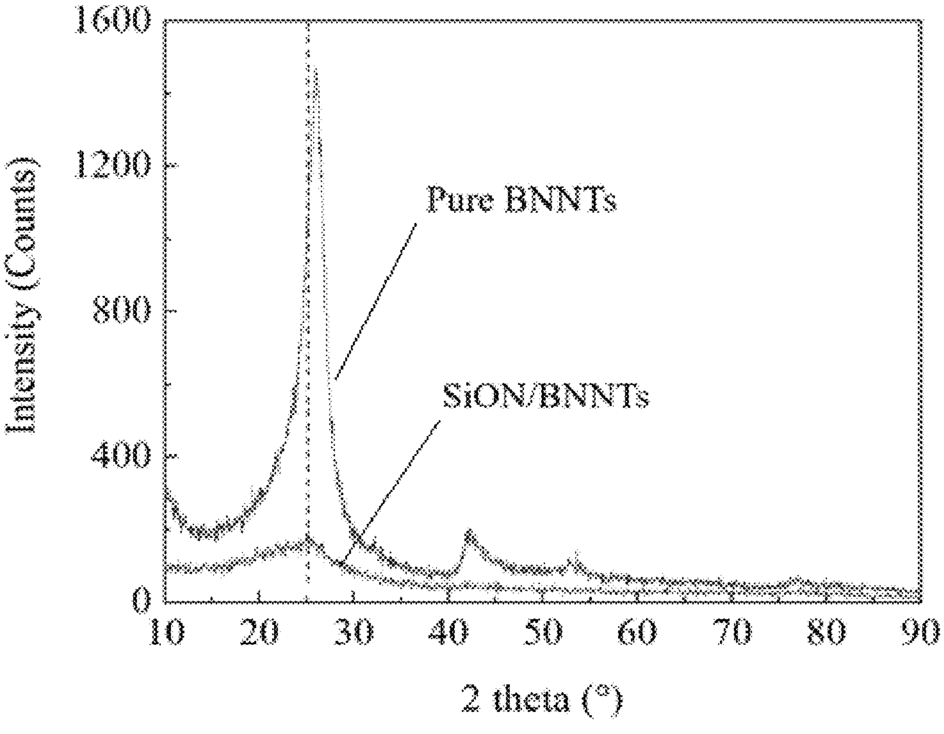
FIG. 12 shows room-temperature Bragg-Brentano geometry X-ray diffraction (XRD) patterns of pure BNNTs and SiON/BNNTs.

The XRD patterns of pristine BNNTs and SiON/BNNTs composite were presented in FIG. 12. For the pure BNNTs sample, all reflection peaks were located at 25.79°, 42.13°, and 53.20°, with the corresponding (002), (010), and (012) crystallographic planes. They showed the dominant BN phases which were mainly composed of hexagonal-BN with lattice constants of a, b=2.498 Å and c=6.636 Å (reference code: 98-012-3398). Only the (002) peak of BNNTs was visible in the sample of SiON/BNNTs, which was due to the amorphous structure of PHPS-derived SiON at room temperature. The structure of the converted SiON was the combination of amorphous $SiO_2$ and partially uncondensed Si—N, Si—OH, and O—H. The amorphous nature of this material was previously illustrated, and one broad peak at just less than 20° was detected and attributed to the amorphous structure. Compared to the (002) position of pristine BNNTs at 25.8°, the corresponding peak in SiON/BNNTs sample was slightly shifted to lower than 2θ at 23°. One was resulting from the amorphous nature of the SiON addition, and another was because of the slight expansion of the interplanar spacing in the nanometric morphology of BNNTs.

Figure 13A:
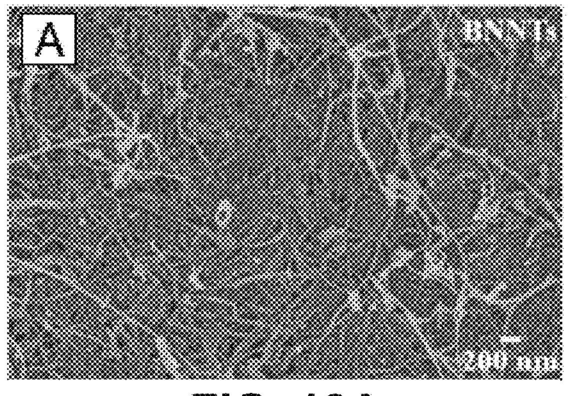
FIGS. 13A-13B show structural characterization: SEM surface and cross-section images of (FIG. 13A) the pristine BNNTs and (FIG. 13B) SiON/BNNTs composites.
Figure 13B:
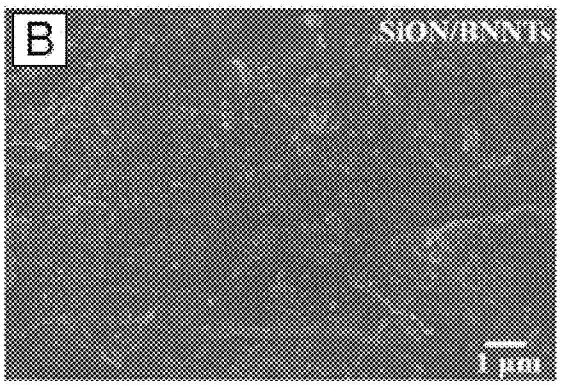

Understanding the micro- and nanostructures are also important in this work to fully investigate the effect of polymer-derived SiON ceramic on the properties of BNNTs. FIG. 13A shows the high density of BNNTs with diameters of 30-50 nm and a very high aspect ratio. The existence of dots dispersed inside the matrix was due to the remaining boron during BNNT fabrication. FIG. 13B illustrates the surface changes after the infiltration of SiON ceramic between the BNNTs. It is evident that the surface was dense and flat, which was different from pure BNNTs. The empty gaps between the BNNTs were fulfilled by SiON successfully, via the polymer-derived route in this study. This phenomenon reduced the influence of porosity on the S-parameters and permittivity measurements, as described below.

Figure 14A:
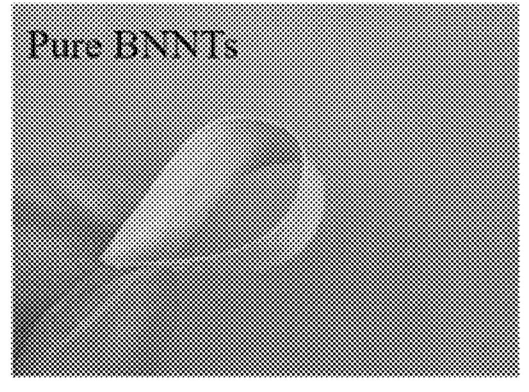
FIGS. 14A-14B show flexibility exhibition and FIGS. 14C-14D show contact angles of pure BNNTs and SiON/BNNTs materials, respectively.
Figure 14B:
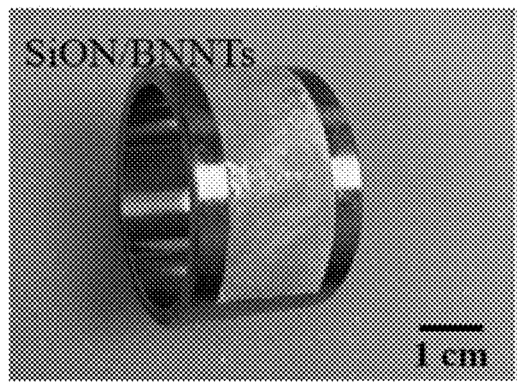
Figure 14C:
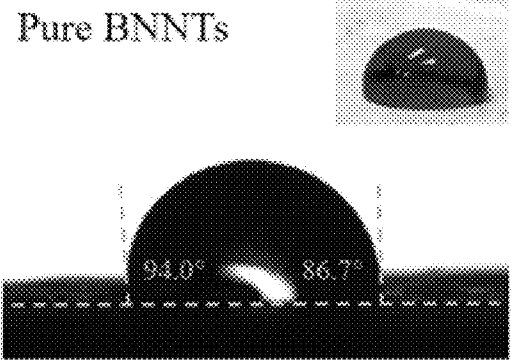
Figure 14D:
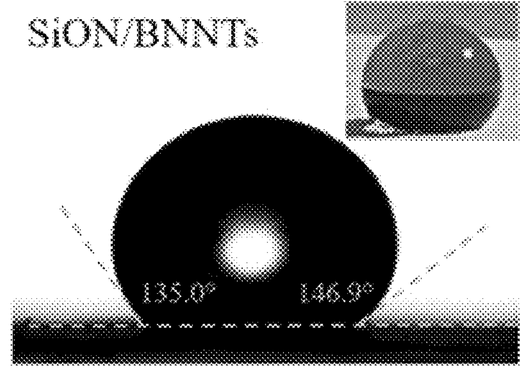

To be applied as a radome material, the material must protect the radar antenna system from the surrounding medium while remaining formable; thus, such material must be flexible. The pure BNNTs and SiON/BNNTs materials are available in thin, lightweight ceramics for flexibility in radome design and layup, and various curved shapes can be achieved. As seen in FIG. 14A, the prepared BNNTs sheet was highly flexible and foldable, which could easily recover to the original morphology shortly after release. Due to its highly flexible nature, the PHPS infiltrated BNNTs film easily rolled up on a curved metal surface (FIG. 14B), illustrating potential applicability as a radome material. The wettability of the surface of the material also determines whether it can resist the effects of rain on its service life. In this study, wettability was characterized by the contact angle of water with the solid surface from pure BNNTs and SiON/BNNTs materials in FIG. 14C-14D. A smaller contact angle indicates the greater wettability of the materials. The contact angles on pure BNNTs and SiON/BNNTs were 86.7-94.0° and 135-146.9°, respectively. These results revealed that the pure BNNTs were between the hydrophilicity and hydrophobicity, while the SiON coated BNNTs showed significant hydrophobicity. This conclusion shows that the coating derived from PHPS is a low surface energy material that can be applied on nanostructures of BNNTs to reduce surface energy. The addition of SiON coatings provides hydrophobic surfaces that play an important role in reducing the damage of rain.

Thermal Stability

Figure 15A:
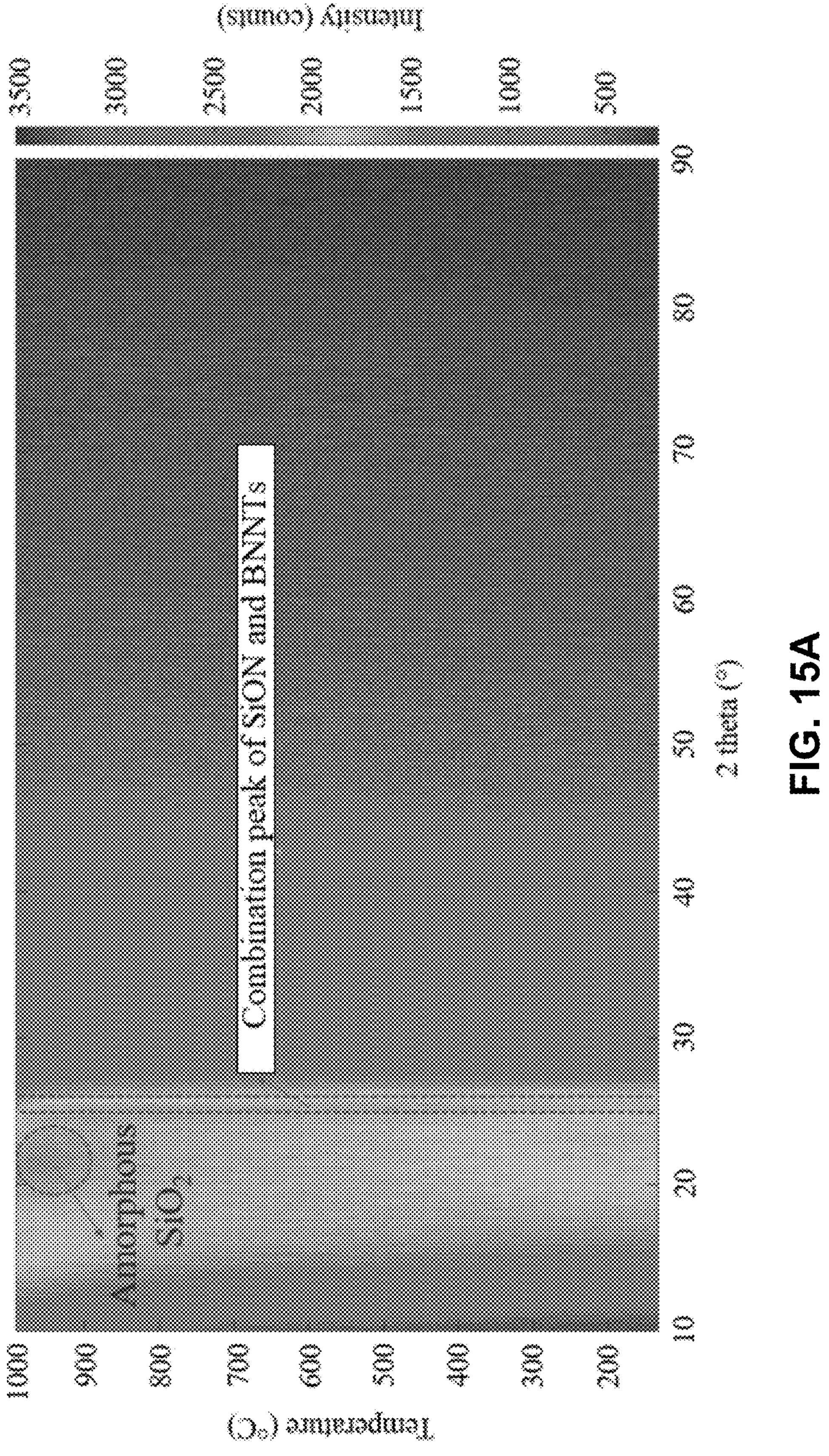
FIGS. 15A-15B show a series of XRD patterns were recorded for the SiON/BNNTs composite from (FIG. 15A) room temperature to 1000° C. with the heating rate of 2° C./min (air), and (FIG. 15B) holding at 1000° C. for 1 hour (air).

To further investigate the thermal protection provided by the addition of PHPS-derived SiON, HT-XRD can provide useful information on the thermal behavior in harsh environments. The numbered series of in situ high temperature (HT)-XRD scans in FIGS. 15A-15B highlighted the major advantage of the PHPS-derived SiON/BNNTs compared to the pure BNNTs. As it can be seen, the small peak at 24.8° in FIG. 15A was the combination of SiON and BNNTs existences, which was consistent with the results in FIG. 12. With the heat treatment from 25° C. to 1000° C., this peak was considered stable, but a minor change was detected at 900° C. around 23°. These broad diffraction peaks located at 23° were amorphous $SiO_2$, which has previously been reported. PHPS contains extensive Si—H and Si—N groups, and the oxidation/hydrolysis of these Si—H groups can form Si—OH groups to produce amorphous SiON(H) ceramic at room temperature. It explains the broad peak between 20-30° of SiON/BNNTs samples in FIG. 12. As the temperature goes up, elemental O and N can gradually be released from the chemical structure, and N can be almost eliminated at 800-900° C. The plethora of the Si—OH bonds can subsequently condense to synthesize numerous Si—O—Si bonds to form a $SiO_2$-rich phase and that is the reason it is shown at HT XRD in FIGS. 15A-15B. The abovementioned processes are shown in the following equations (3-6):

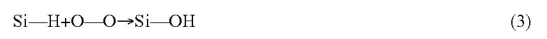

$$Si—H+O—O \rightarrow Si—OH \quad (3)$$

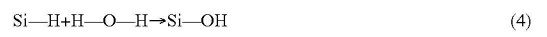

$$Si—H+H—O—H \rightarrow Si—OH \quad (4)$$

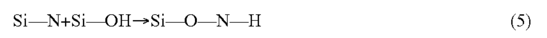

$$Si—N+Si—OH \rightarrow Si—O—N—H \quad (5)$$

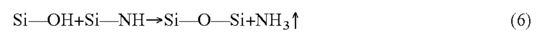

$$Si—OH+Si—NH \rightarrow Si—O—Si+NH_3\uparrow \quad (6)$$

Figure 15B:
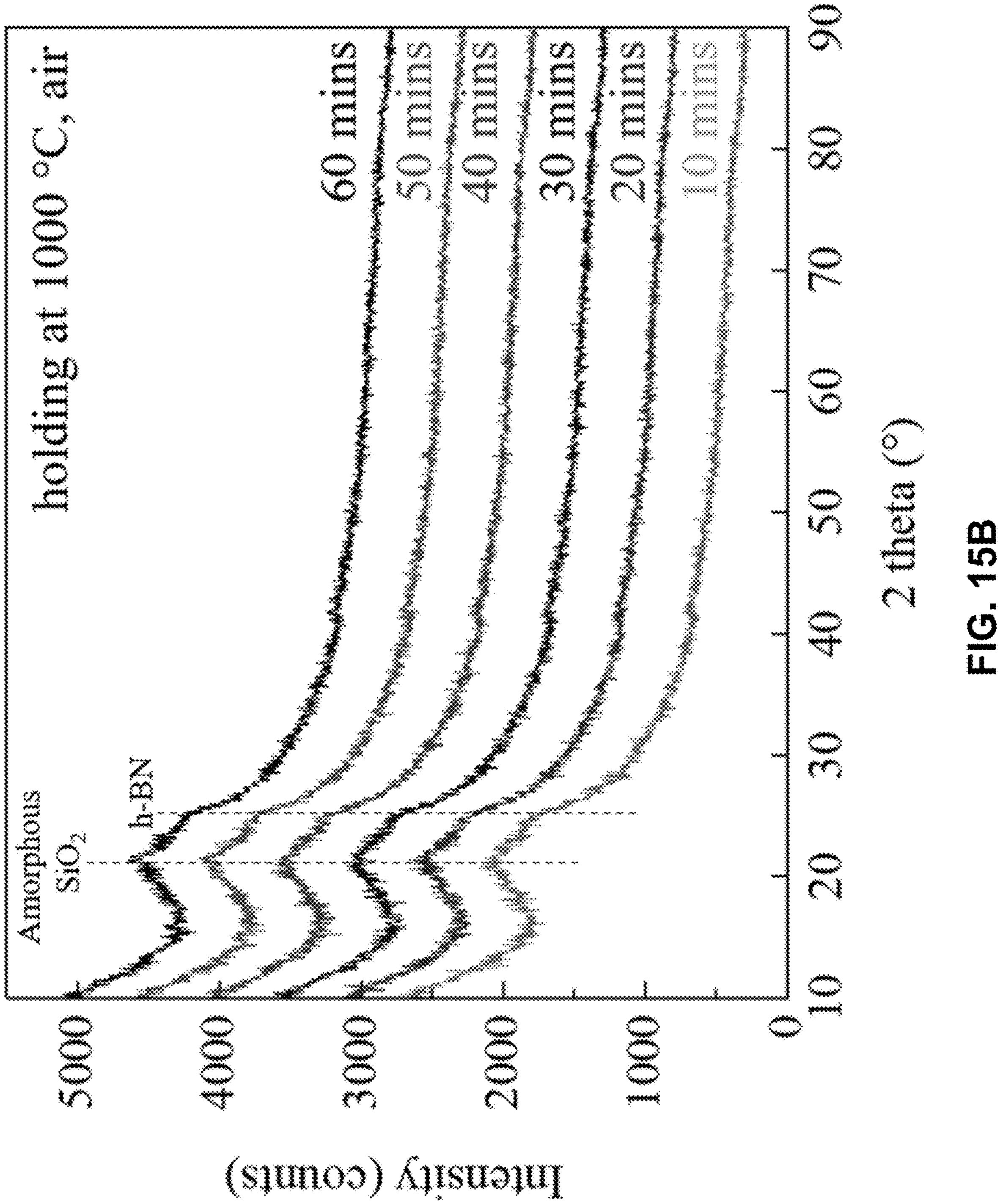

As for FIG. 15B, these XRD patterns are measured every 10 mins at the dwelling time at 1000° C. in the air, and it is evident that the SiON coating on the BNNT has converted into $SiO_2$ coating at higher temperatures, which offers the best thermal stability and insulation at the working environment. This transformation to $SiO_2$ signifies that the proposed SiON/BNNTs composites possess excellent thermal-resistance performance even at 1000° C. in the oxygen-containing atmosphere.

Figure 16A:
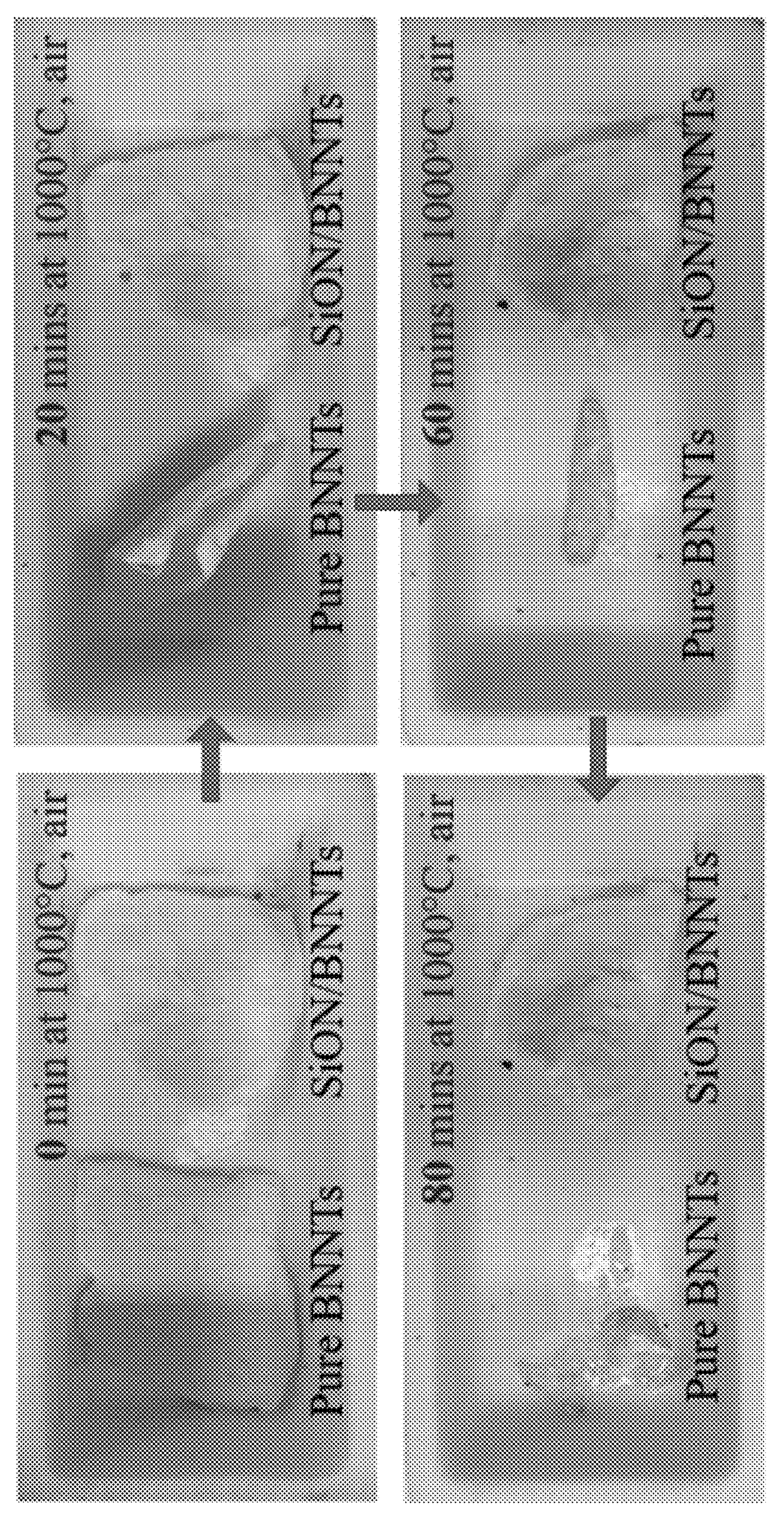
FIG. 16A shows sample change and FIG. 16B shows mass changes of pristine BNNTs and PHPS-derived ceramic/BNNTs samples with different dwelling times at 1000° C.

To better display the superior protection from PHPS-derived ceramic coating on the bulk BNNTs, the SiON/BNNTs composite and its control group-pure BNNTs were both placed in an alumina crucible and tested at a 1000° C. thermal treatment in air. From the changes in the samples' appearance in FIG. 16A, it is noted that the pristine BNNTs began to curl and shrink after only 20 mins at 1000° C., while the SiO(N)/BNNT composite maintained their shape regardless of their time in high temperatures. When the heat preservation experiment was carried out for the initial 60 mins, the BNNTs began to "melt". This melting is because the BNNTs can only maintain their oxidation resistance at 800-900° C., and they can be partly transformed to boron oxide at 1000° C. Based on these findings, the SiON ceramic coating is an effective and simple method to make BNNTs greatly desirable for numerous applications in harsh conditions.

Figure 16B:
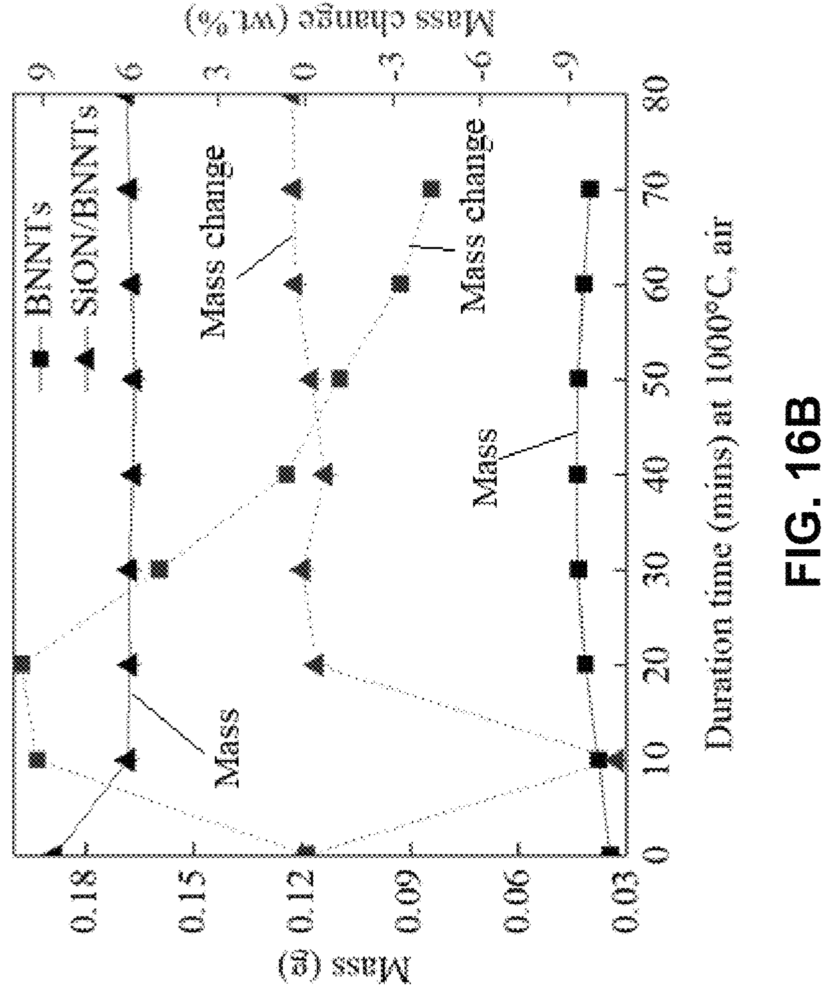

FIG. 16B depicts the mass loss within 0-80 mins after high-temperature oxidation treatment at 1000° C. The weight of BNNTs over a duration of 80 mins was unattainable as the sample melted and stuck to the container. A slight weight gain during the initial 40 mins was detected for pure BNNTs, due to the oxidation of boron. The chemical reaction followed equation (7):

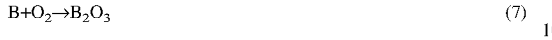

$$B+O_2 \rightarrow B_2O_3 \quad (7)$$

The subsequent weight loss may be due to the missing residual melt when weighing. The SiON/BNNTs composite displayed a major weight loss of 10.66 wt. % over the first 10 mins which can be attributed to the evaporation of the atmospheric moisture and the loss of N—H and Si—H parts. After this initial weight loss, the weight trace from the SiON/BNNTs was relatively stable, indicating the existence of SiON improved the oxidation behavior/thermal stability of pure BNNTs.

Figure 17:
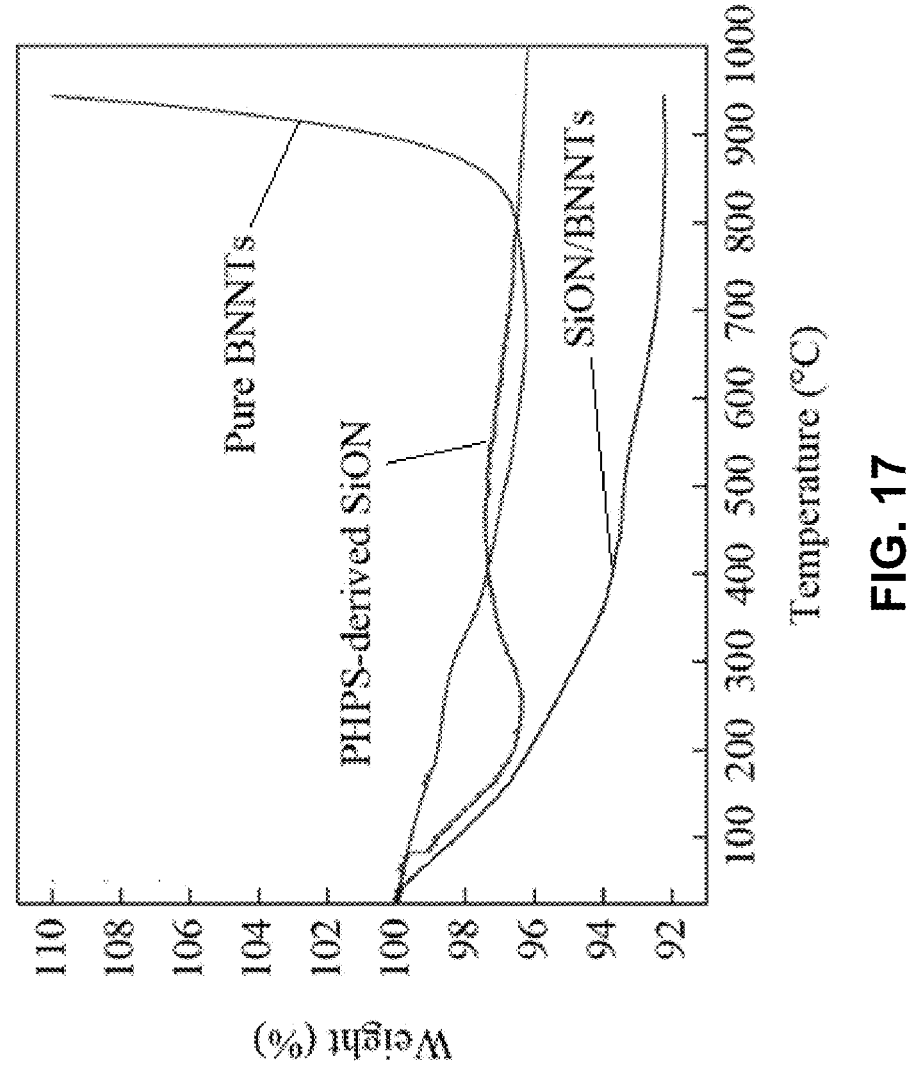
FIG. 17 shows a TGA curve of PHPS-derived SiON, pure BNNTs, and PHPS-derived SiON/BNNTs samples.

The changes in mass as a function of temperature were characterized by the TGA technique, and the corresponding results were shown in FIG. 17. The results aligned with the discussion from FIGS. 15A-16B. During the heating step of 25-200° C., the occurrence of quick weight losses (~4 wt. %) for PHPS-derived SiON and SiON/BNNTs were due to the evaporation of the remaining organic solvent and the loss of N—H and S—H species as explained before. For pristine BNNTs, the removal of moisture resulted in the weight loss of 1.33 wt. % during this phase. Different from the continuous weight loss for BNNTs and SiON/BNNTs samples after 250° C., a weight gain of ~1.06% from 250-450° C. was observed for the PHPS-derived SiON. This weight gain suggested oxidation of Si—NH which was shown as eq. (5). The main condensation of the Si—OH bonds caused the weight loss at >450° C. It has been reported that the silanol groups are highly likely to generate Si—O—Si bonds via the self-condensation process 30. In FIG. 17, the weight gain of pure BNNTs resulted from the oxidation of boron, which was also explained in eq. (7). Overall, the studied SiON/BNNTs composite is thermally stable up to 1000° C. in the air with >92 wt. % mass retention without shape changes. The addition of SiON greatly improved the heat resistance of BNNTs, especially in a sustained 1000° C. environment.

Wave-Transparent Properties

Figure 18A:
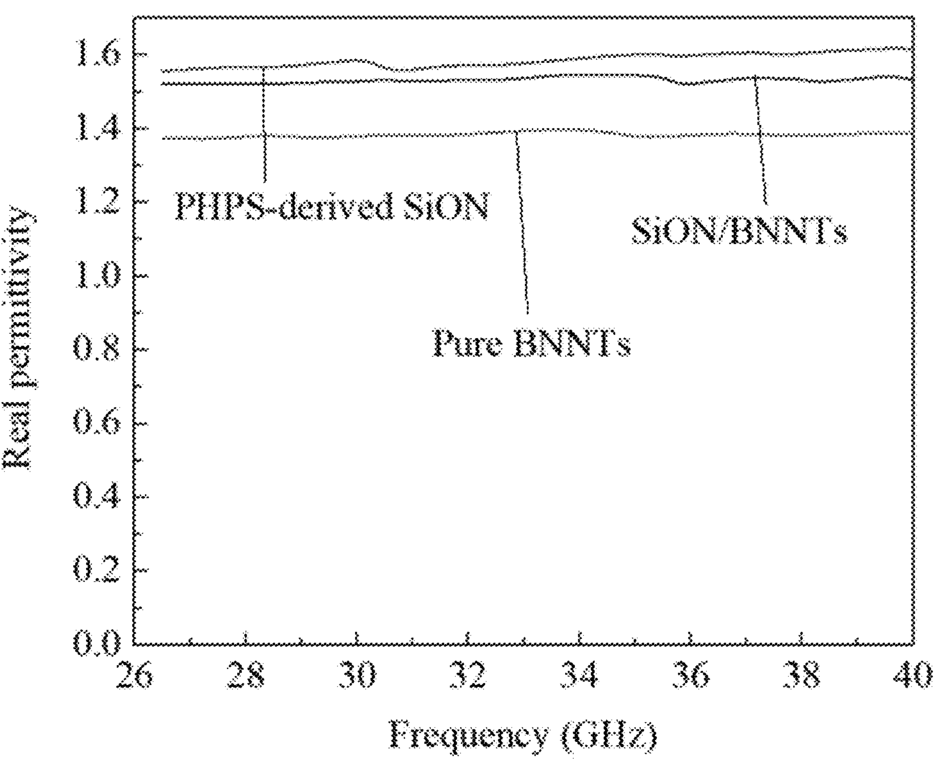
FIGS. 18A-18C show complex permittivity.
Figure 18B:
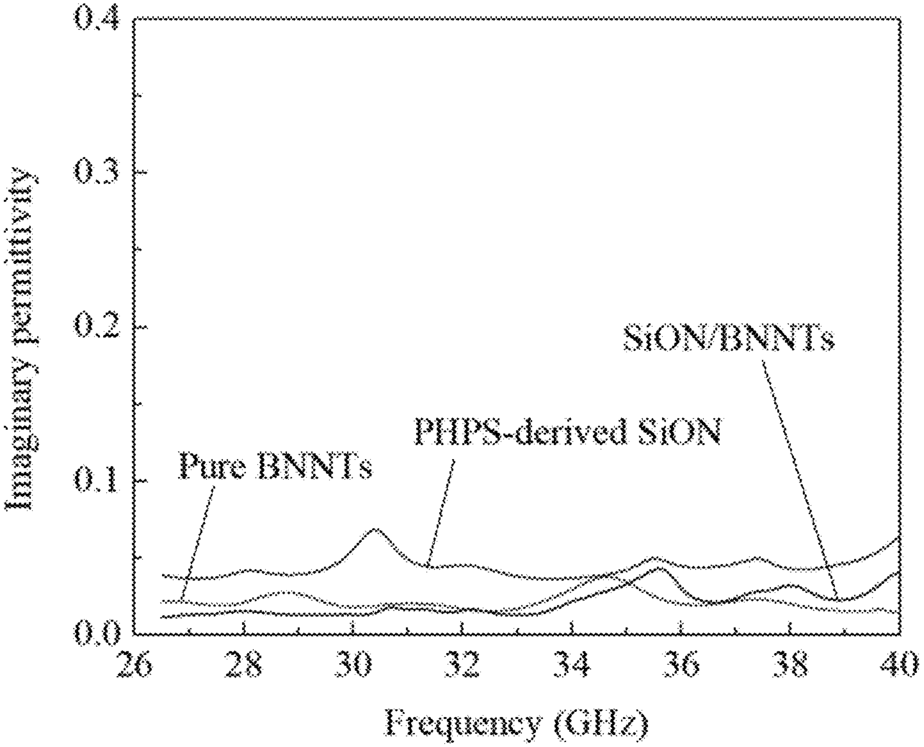
Figure 18C:
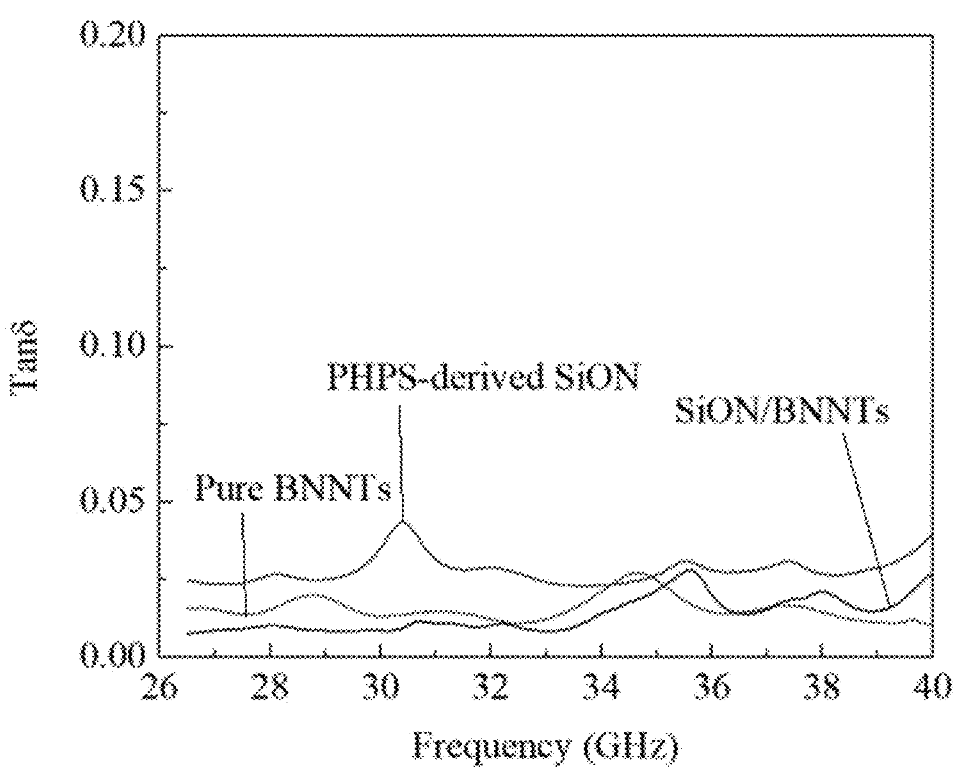

One of the most attractive properties of the PH PS-derived SiON ceramics is the low complex permittivity and loss tangent, and the corresponding results were depicted in FIGS. 18A-18C. All specimens showed relatively low real permittivity (ε'<1.62) and imaginary permittivity (ε"<0.07), which met the requirement for radome applications. The value of the ε' for pure BNNTs was ~1.38 in the whole frequency range. PHPS-derived SiON ceramics illustrated higher values of ε' between 1.55 and 1.62, relative to the pure BNNTs. This phenomenon was due to the higher polarization capability from PHPS-derived SiON. Also, the infiltration of SiON removed all the pores and caused a higher density of the resultant materials. The nature of dipole polarization results in the value of the real permittivity (ε') of SiON>SiON/BNNTs>BNNTs. If the external field frequency is low, the polarization in the medium can follow the change of the external field, which means no polarization loss. In the condition when the external field frequency increases, the required polarization stability time will be longer than the period of the external field, and the polarization loss will be introduced.

The analysis of the equation can be started from the Debye equation:

$$\varepsilon(\omega) = \varepsilon_\infty + \frac{\varepsilon_s - \varepsilon_\infty}{1 + j\omega\tau} = \frac{\varepsilon_s - j\omega\tau\varepsilon_\infty + j\omega\tau\varepsilon_s + \omega^2\tau^2\varepsilon_\infty}{1 + (\omega\tau)^2} \quad (8)$$

$$\varepsilon' = \frac{\varepsilon_s - \varepsilon_\infty}{1 + (\omega\tau)^2} + \varepsilon_\infty \quad (9)$$

$$\varepsilon'' = \frac{\varepsilon_s - \varepsilon_\infty}{1 + (\omega\tau)^2}\omega\tau \quad (10)$$

where ε' is the real part of permittivity, ε" is the imaginary part of permittivity, ω is the angular frequency, T is the relaxation time, $\varepsilon_s$ is the static permittivity (at low frequency), and $\varepsilon_\infty$ is the permittivity at extremely high frequency. It can be seen from the formulas that as the frequency increases, the ε' decreases. However, as the frequency increases to some extent, the real part of permittivity will be almost a constant within the frequency range. In the calculation of imaginary permittivity for a material, the conduction loss can be included. Thus, the equation of the imaginary part of permittivity is updated as:

$$\varepsilon'' = \frac{\varepsilon_s - \varepsilon_\infty}{1 + (\omega\tau)^2}\omega\tau + \frac{\sigma}{\omega\varepsilon_0} \quad (11)$$

where σ is the electrical conductivity of the material. This conduction normally occurs in the microwave region. FIG. 18B shows the variation in the imaginary dielectric constant at different frequencies, and it shows that the BNNTs acts as a very good electrical insulator. Overall, the value of ε" from pure BNNTs corresponded closely to that of SiON/BNNTs, with the range of 0.01-0.04. They both possess small electrical conductivity due to the limited electron density, based on the classical electron/Drude-Lorentz equation.

Figure 19A:
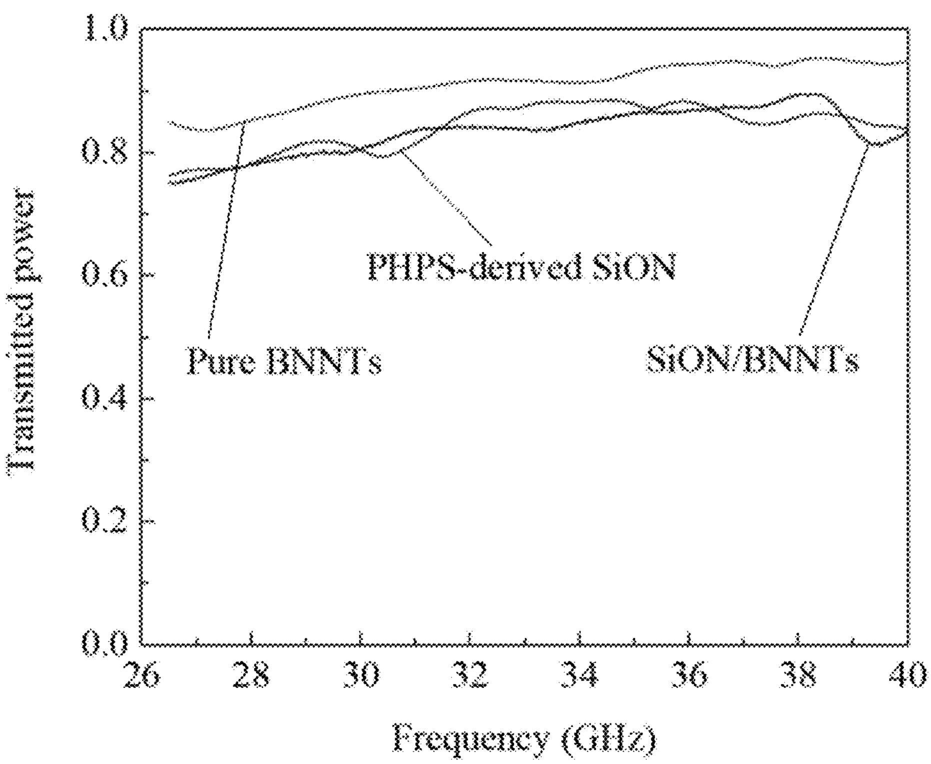
FIGS. 19A-19C show the (FIG. 19A) transmitted, (FIG. 19B) reflected, and (FIG. 19C) absorbed powers in percentage versus frequency of pure BNNTs, PHPS-derived SiON, SiON/BNNTs samples (thickness ~3 mm) at frequencies of 26.5-40 GHz.

Scattering parameters (S parameters) can be used to comprehensively describe how energy propagates through an electrical network. In this study, the samples were measured in a rectangular waveguide with a frequency ranging from 26.5 to 40 GHz. The measured S parameters, as well as absorption power, were shown in FIGS. 19A-19C. According to the law of the conservation of energy, the total values of transmitted, reflected, and absorbed powers can be defined as 1. In FIG. 19A, it is commonly understood that the capability of transmission increased with increasing frequency. However, higher frequencies are more sensitive to reflection, and that is the reason that the curves in reflection power were turning lower at higher frequencies. Overall, pure BNNTs showed the highest transmission exceeding 85% at 26.5 GHz and achieved as high as 95% at 40 Hz. With this superior performance, the prepared SiON/BNNTs samples also exhibited excellent results on transmission between 76-89% at 26.5-40 GHz. No obvious difference was observed between the SiON/BNNTs and PHPS-derived SiON samples. This absence of contrast may be attributed to the infiltration of the PHPS liquid. The PHPS liquid was fully infiltrated to the BNNTs sheet. Then, the SiON ceramic filled the gaps inside the BNNTs, especially on the surface of BNNTs. The SiON coating affected the matching effect and resulted in a similar result between SiON and SiON/BNNTs. Higher permittivity indicated a worse matching degree.

The relationship between S parameters and power can be described as below:

$$\frac{\text{Transmitted Power}}{\text{Total Input power}} = (S_{21} \text{ in percentage})^2 = 20\times\log_{10}(S_{21} \text{ in } dB) \quad (12)$$

$$\frac{\text{Reflected power}}{\text{Total Input power}} = (S_{11} \text{ in percentage})^2 = 20\times\log_{10}(S_{11} \text{ in } dB) \quad (13)$$

$$\text{Absorbed power} = \text{Total input power} - \text{Reflected power} - \text{Transmitted power} \quad (14)$$

Figure 19B:
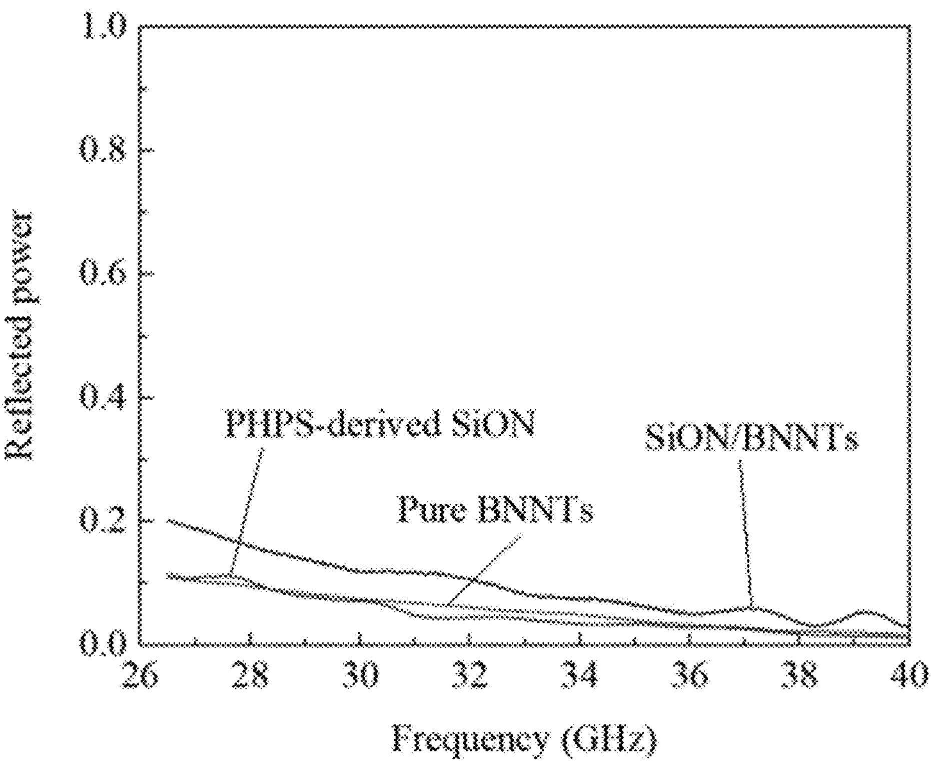
Figure 19C:
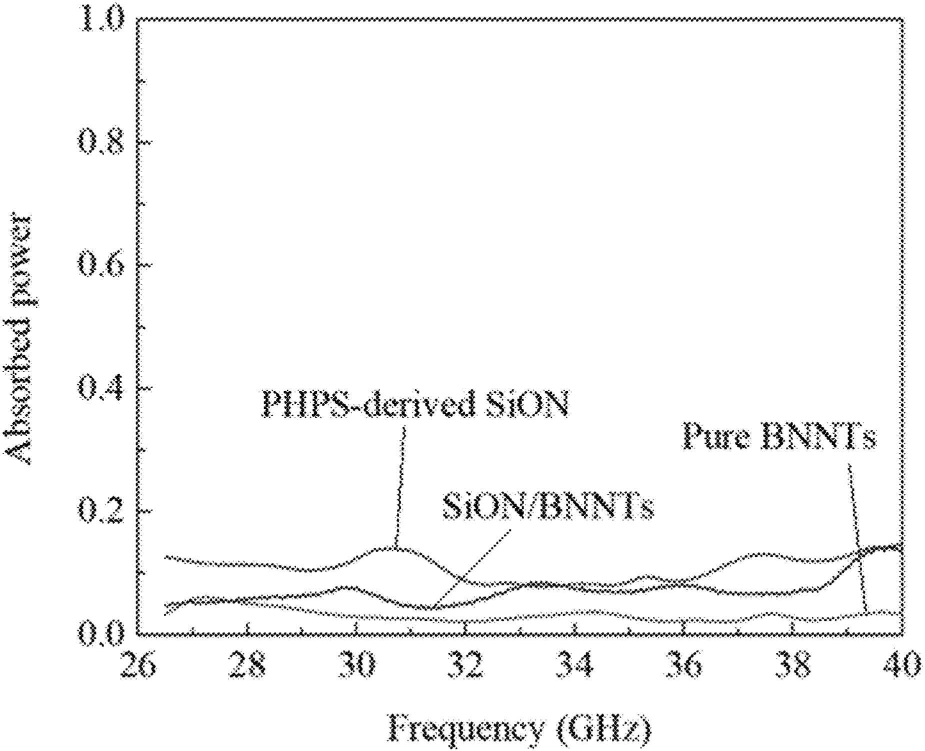

The reason that BNNT has the highest transmitted power can be explained in the following equations, $$R_L = 20\log\left|\frac{Z_{in}-1}{Z_{in}+1}\right| \quad (15)$$

$$Z_{in} = \sqrt{\frac{\mu_r}{\varepsilon_r}} \quad (16)$$

where $R_L$ is the reflection loss, $\varepsilon_r$ is the complex relative permittivity and $\mu_r$ is the complex relative permeability (which equals 1 for non-magnetic material). Based on the equations above, a lower relative permittivity will result in a lower return loss. The pure BNNT had the smallest relative permittivity, which resulted in the lowest reflected power. However, the pure PHPS also had low reflection power. These results appear to contradict the result obtained from the equations above. This phenomenon can be explained as the equations shown below in Eqs. (17-18).

$$P_a = P_0 \cdot \left(1 - e^{-2(\alpha+j\beta)d}\right) \quad (17)$$

$$\alpha = \frac{\sqrt{2}\pi f}{c} \times \sqrt{(\mu''\varepsilon'' - \mu'\varepsilon') + \sqrt{(\mu'\varepsilon'' + \mu''\varepsilon')^2 + (\mu''\varepsilon'' - \mu'\varepsilon')^2}} \quad (18)$$

where P is the absorbed power, $P_0$ is the power entered the sample, d is the thickness of sample, α and β are the real and imaginary parts of the propagation constant. More specifically, the higher a is the more power absorbed by the sample and consumed in the form of heat. α is highly related to the imaginary part of relative permittivity—the higher the imaginary part of relative permittivity, the more power absorbed by the material. This is the reason why most power is absorbed by PHPS instead of being reflected, as shown in FIGS. 19A-19C.

Sample thickness also affects the wave-transparent properties. The increase in the material thickness d means that the propagation distance of the electromagnetic waves in the medium also increases. When the incident angle of the electromagnetic waves remains unchanged, the absorption loss increases with increasing d. Therefore, the overall wave-transparent properties of the material decrease with the increasing thickness of the material. Based on the results from FIGS. 18A-19C, these three samples were both EM transparency materials, especially for pure BNNT and SiON/BNNTs. To investigate the effect of sample thickness on the measured results, different layers of SiON/BNNTs samples were prepared with different thicknesses. Each layer has a thickness of 0.3 mm. The transmitted, reflected, and absorbed powers were shown in FIGS. 20A-20C, respectively. It can be seen that the transmitted power decreased with increasing thickness, and the transmitted power can be maintained at more than 90% at the entire frequency range studied. The reflected power, even with varying sample thickness, can still maintain a great impedance matching degree across the entire frequency range. No more than 5% power was reflected and lost based on the measurement results. This small value of the power reflection is due to the matching degree, which is primarily determined by the front surface of the material instead of sample thickness, as the thickness is much smaller than the wavelength.

Figure 20A:
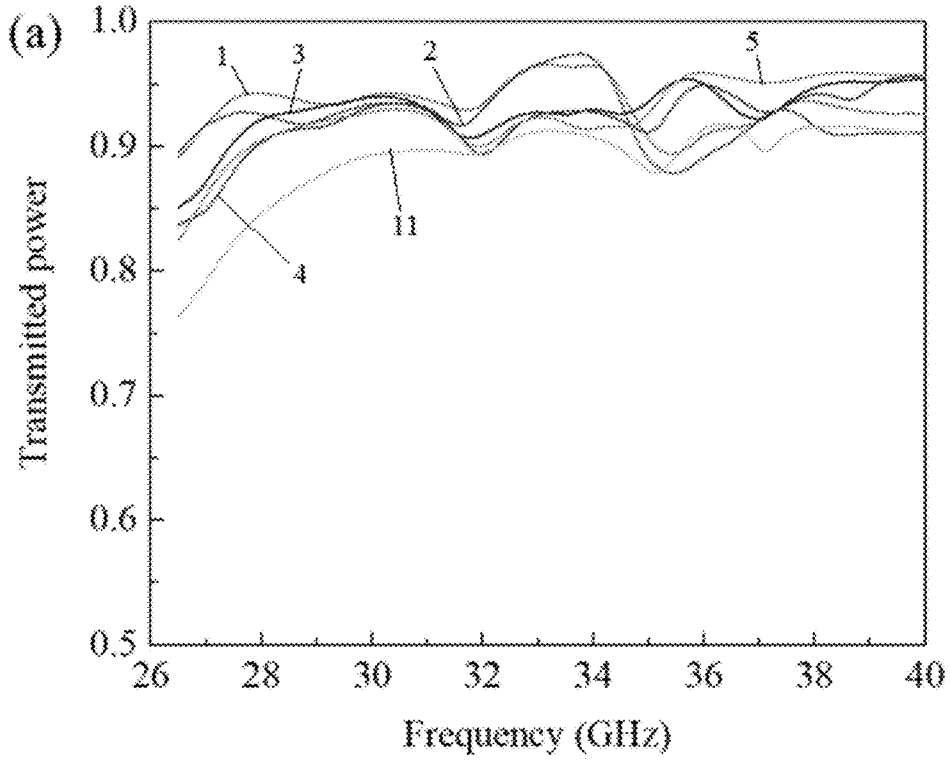
FIGS. 20A-20C show the (FIG. 20A) transmitted, (FIG. 20B) reflected, and (FIG. 20C) absorbed powers in percentage versus frequency of SiON/BNNTs samples at different thicknesses with the frequencies of 26.5-40 GHz. Numbers indicate number of layers.
Figure 20B:
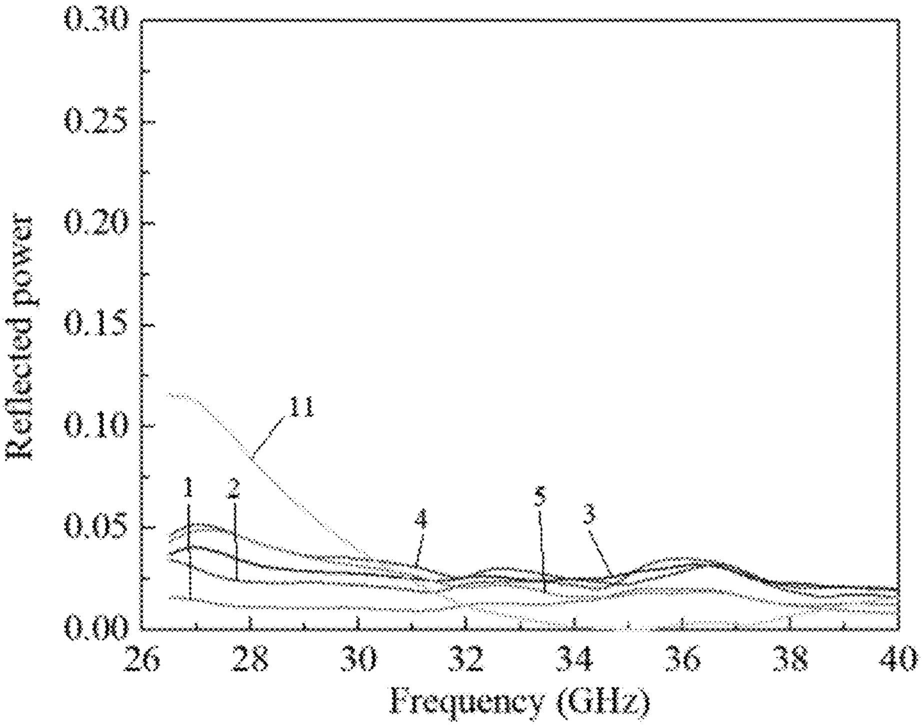
Figure 20C:
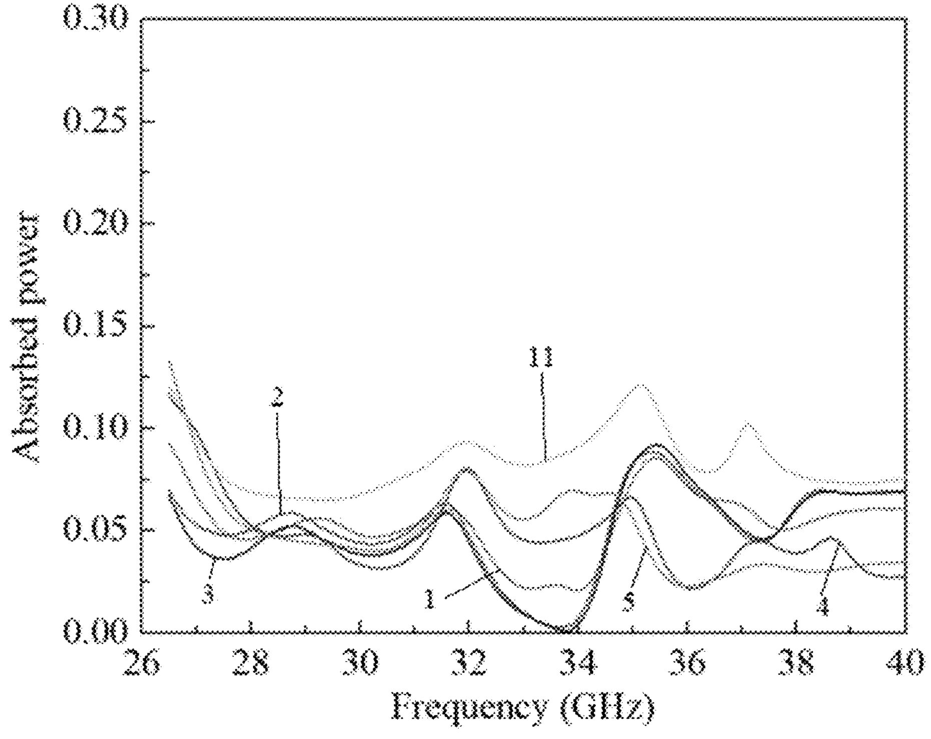

As the SiON/BNNTs sample thickness increases, the transmitted power (S21) decreases mostly because of the increased absorption, as shown in FIG. 20A. The dissipated power increases exponentially with the increasing thickness, which can be described in eq. (16). However, as the thickness increases to a certain extent, the phase difference between the signal reflected from the first and second surfaces needs to be taken into consideration. As shown in FIG. 20B, with 11 layers of SiON/BNNTs and within the frequency range of 34 GHz to 36 GHz, the reflection decreases to almost 0%. This minimal reflection occurs because the signals reflected from the top and bottom surfaces of the sample have a 180° phase difference and a similar magnitude, which cancel each other.

Conclusion

Preparation of SiON thin film from perhydropolysilazane (PHPS) at room temperature has attracted much attention because it provides a new way to prepare ceramic materials where high-temperature processing steps can be eliminated. This paper reports on the creation of EM-transparent SiON/BNNTs composite based on perhydropolysilazane and pure BNNTs, through the PDCs route. The empty gaps between the BNNTs were successfully filled by SiON, and the surface of the flexible SiON/BNNTs ceramic showed significant hydrophobicity with a contact angle of 135-146.9°. The studied SiON/BNNTs composites possess excellent thermal-resistance performance at 1000° C. in the oxygen-containing atmosphere, compared to that of pure BNNTs. More importantly, the prepared SiON/BNNTs samples exhibited excellent results on the electromagnetic (EM) transparency with an average real permittivity around 1.52-1.55 and an average loss tangent value in the range of 0.0074-0.0266, at 26.5-40 GHz. The transmitted power of SiON/BNNTs can achieve at 0.90-0.97 with the thickness of 0.3 mm, and this superior wave-transparent property is maintained with increasing thickness. Such EM transparent material with superior performance will shed light on the applications of radome materials in harsh environment applications.

Example 5: Additional Properties of PDC Reinforced with BNNTs

Figures 21A, 21B, 21C:
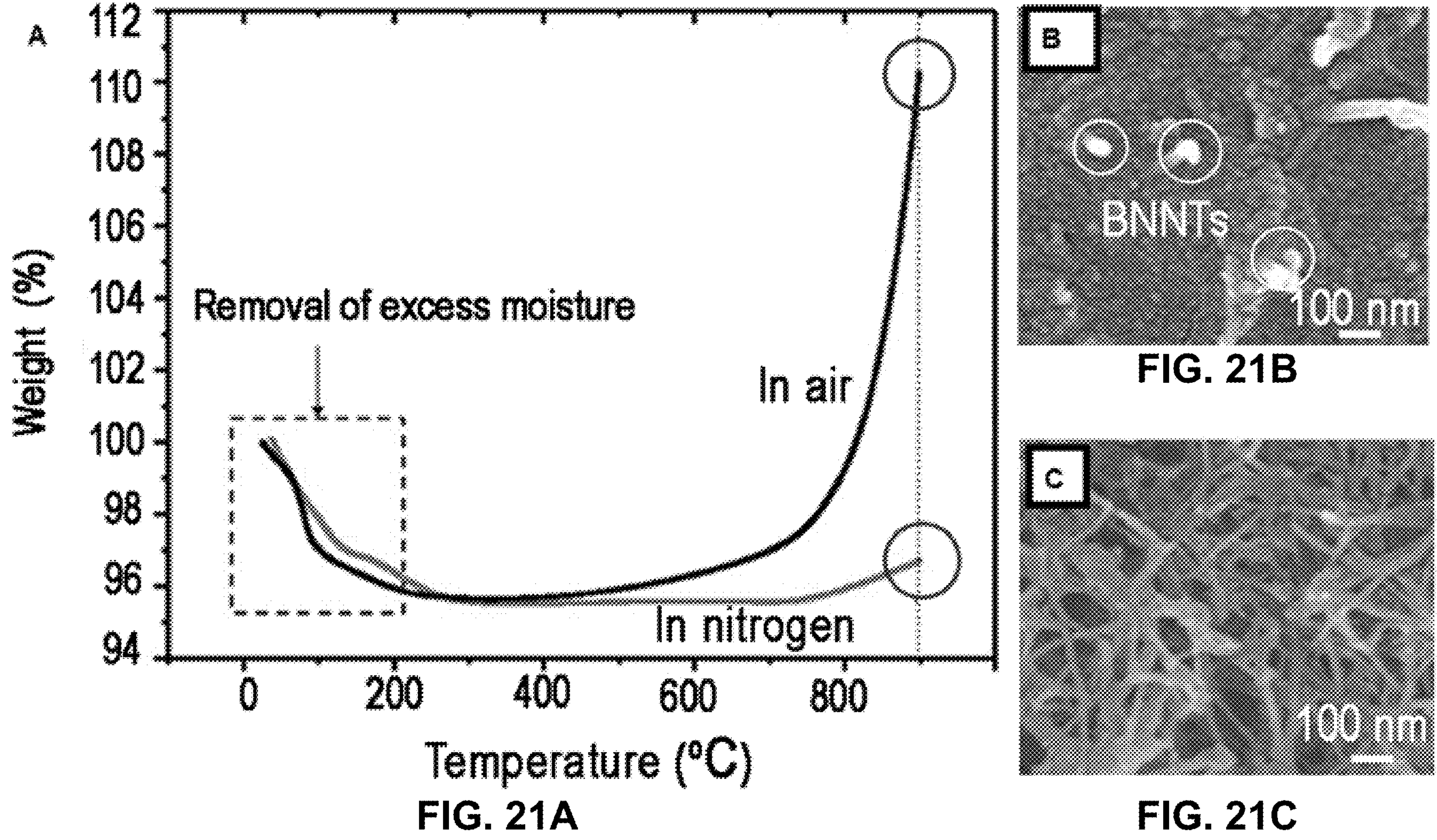
FIG. 21A shows weight change of pristine BNNTs in air and in nitrogen at elevated temperatures. SEM micrographs of pristine BNNTs after exposed in air (FIG. 21B), and in nitrogen (FIG. 21C) at 900° C.

Thermal Stability of Pristine BNNTs at Elevated Temperature in Air and Nitrogen FIG. 21A shows TGA results of pristine BNNTs at temperatures from 20° C. to 900° C. in air and nitrogen. The 4% weight loss observed with samples in both environments from the starting point to around 200° C. is attributed to the removal of excess moisture confined in the sample. The weight of the sample is relatively stable from 200° C. to around 800° C. Because the ‘as-received’ BNNTs used in this study contain boron impurities, thermal oxidation of these impurities is the source of some of the weight gain seen in TGA curves in air below 800° C. starting from just above 400° C. The TGA spectra indicate that BNNTs are stable up to 800° C. The SEM micrographs of pristine BNNTs after exposure in air and nitrogen at 900° C. are shown in FIGS. 21B-21C. BNNTs are viewed as thermally stable up to 800° C. because there is no morphology change at this temperature. After exposed in air at 900° C., BNNTs appear short because of damage by thermal oxidation, as shown in FIG. 21B. FIG. 21B also showed that the morphology was changed a lot after the TGA run. The remaining BNNTs appear more compact with granular morphology possibly because the oxidized boron that can be melted and resolidified to form granular morphology.

Thermal Stability of BNNT-PDC Nano-Composites at Elevated Temperature in Air

Figure 22A:
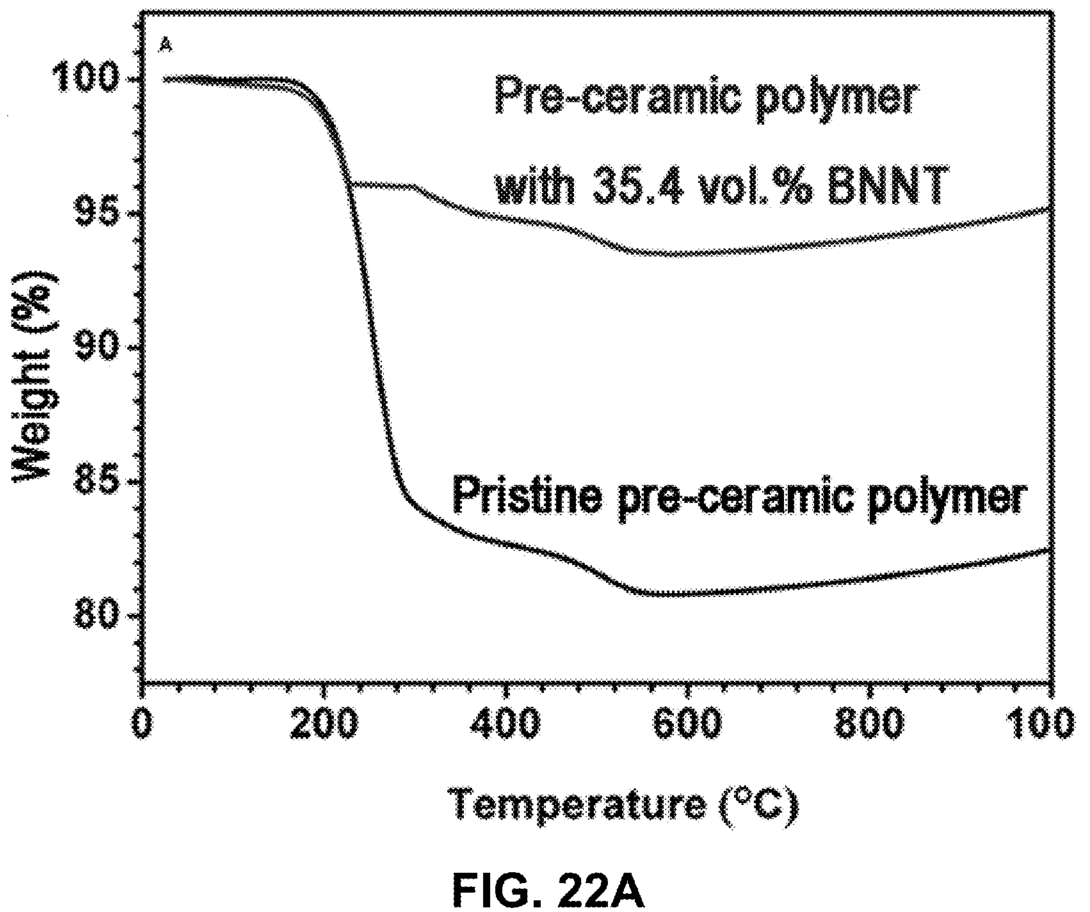
FIGS. 22A-22D show (FIG. 22A) TGA plots of pristine pre-ceramic polymer and pre-ceramic polymer with 35.4 vol. % BNNT up to 1000° C. SEM image of BNNT-PDC nano-composites (reinforced with 35.4 vol. % BNNT (FIG. 22B), pristine PDC (FIG. 22C), and 7.8 vol. % BNNT (FIG. 22D).
Figure 22B:
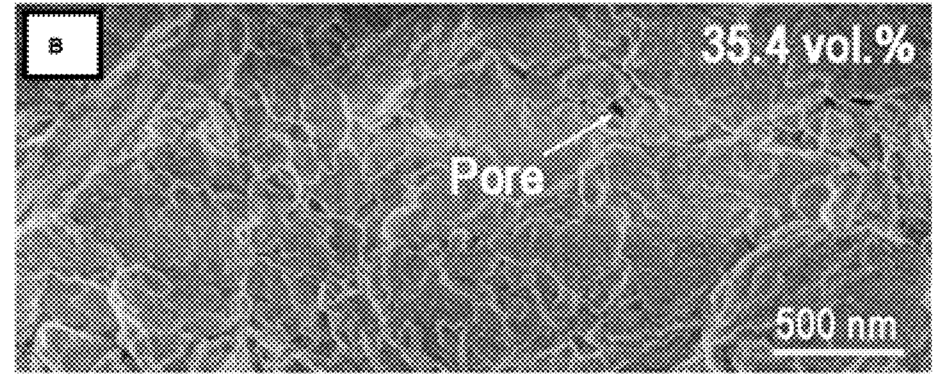
Figure 22C:
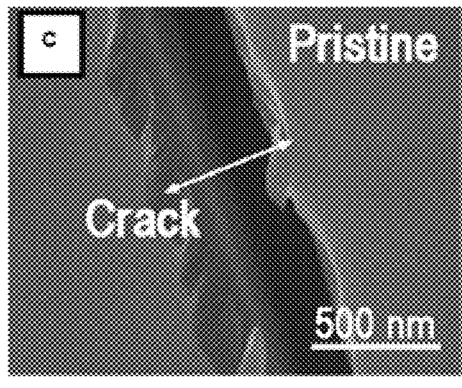
Figure 22D:
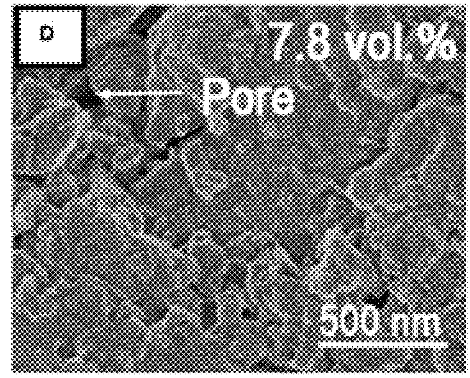

TGA results of pristine pre-ceramic polymer and representative pre-ceramic polymer with 35.4 vol. % BNNT in air are shown in FIG. 22A. The pristine pre-ceramic polymer experienced about 18% weight loss at 500° C., which could be attributed to the porous nature of the material and loss of free carbon during oxidation. The TGA results show that the mass loss of the pre-ceramic polymer in air is remarkably decreased by the introduction of BNNTs. The decrease is mainly due to the decreased pores and cracks, which reduce the oxidation of free carbon. Cracks (FIG. 22C) form for pristine PDC when subjected to heating. When BNNTs are introduced, the cracks in the nano-composites are decreased significantly (FIG. 22D) during the TGA heating process in air. Also, as seen from FIG. 22B, the number and size of pores in BNNT-PDC nano-composites (reinforced with 35.4 vol. % BNNT) are significantly reduced compared to those of BNNT-PDC nano-composites (reinforced with 7.8 vol. % BNNT) (FIG. 22D), and the porosity dropped from 33.0 to 13.1% dramatically (Table 1). The oxygen ingress therefore is reduced because of the decreased crack size and pores. The oxidation of free carbon in the composites is reduced and the thermal stability is improved.

Figure 23A:
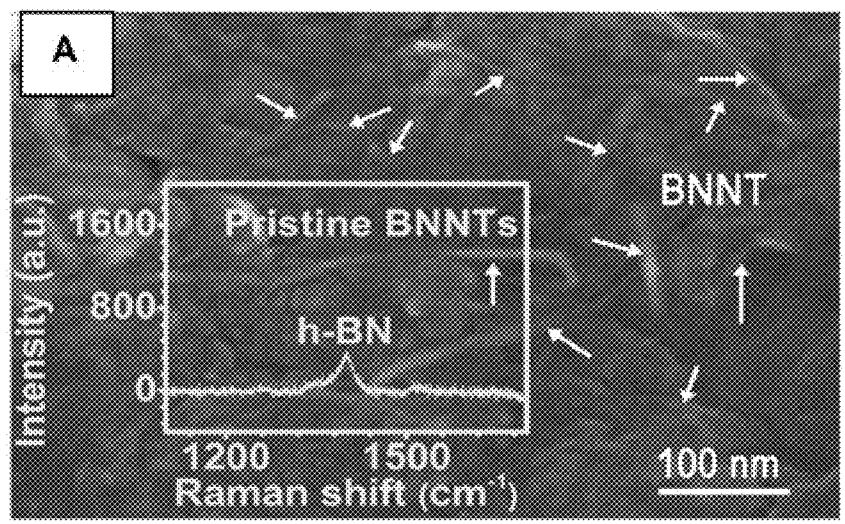
FIGS. 23A-23G show SEM images of BNNT-PDC nano-composites (reinforced with 35.4 vol. % BNNT) before (FIG. 23A) and after (FIG. 23B) oxidation at 900° C. in air for 1 h. TEM images of BNNT-PDC nano-composites (reinforced with 35.4 vol. % BNNT) before (FIG. 23C) and after (FIG. 23D) oxidation at 900° C. in air for 1 h. XRD curves of the pristine BNNTs, the BNNT-PDC nano-composites (35.4 vol. % BNNT) before and after exposed to air at 900° C. for 1 h (FIG. 23G).
Figure 23B:
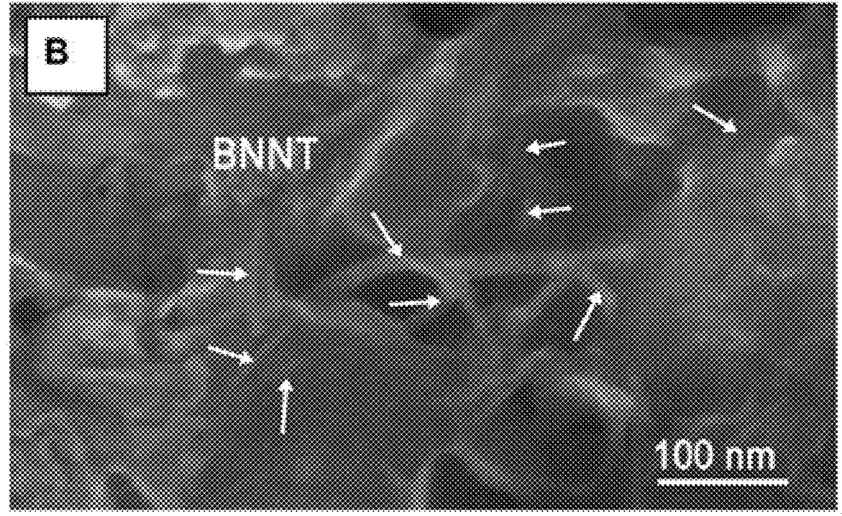
Figure 23E:
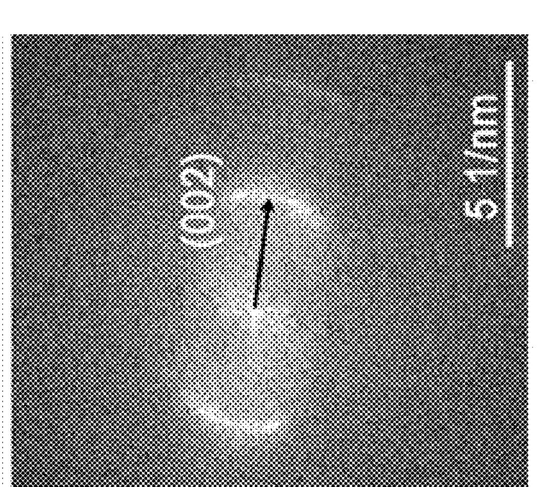
Figure 23E:
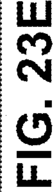
Figure 23D:
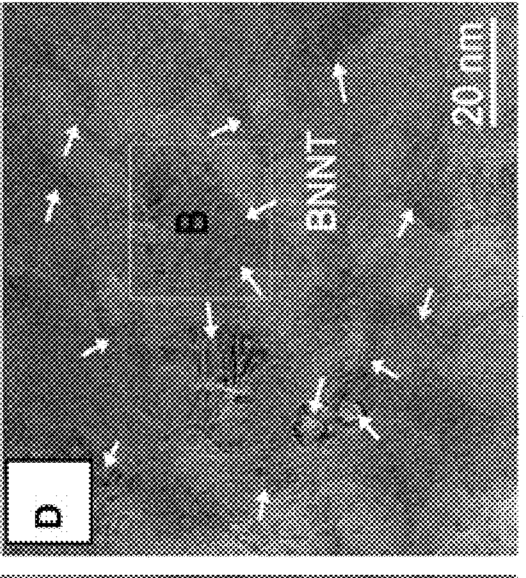
Figure 23C:
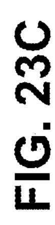
Figure 23G:
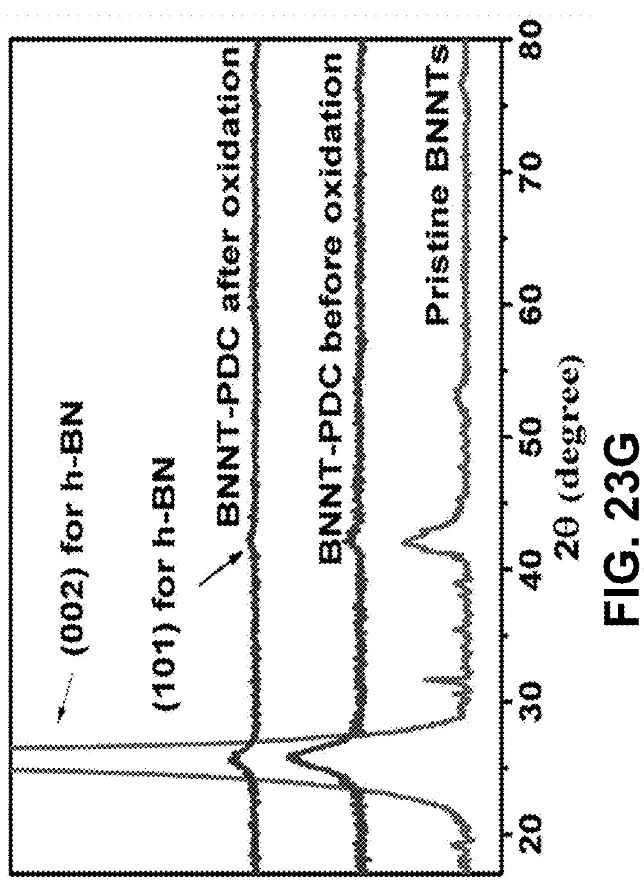
Figure 23F:
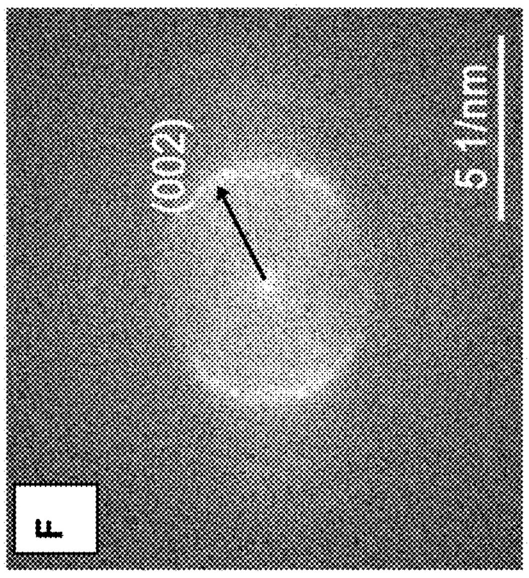

Although BNNTs are oxidized in air at 900° C. (FIGS. 21A-21C), the nano-composites may have potential application in harsh environments. The reason is that BNNTs inside the nano-composites are protected from being oxidized. Raman spectra of the pristine BNNTs shows a h-BN peak at around 1396 $cm^{-1}$, as shown in the insert of FIG. 23A. XRD analysis for the pristine BNNTs (in FIG. 23G) shows (002) and (101) peaks for hexagonal boron nitride. FIGS. 23A-23G are the SEM images, TEM images and XRD analysis of the BNNT-PDC nano-composites (35.4 vol. % BNNT) before and after exposed to air at 900° C. for 1 h. The nanotubes are embedded in the PDC matrix before oxidation, as seen from SEM image (FIG. 23A) and TEM image (FIG. 23C). FIG. 23E shows a Fast Fourier Transform (FFT) of the selected area (A) of the nanotubes. The (002) plane for BNNT verifies that the embedded nanotubes are BNNTs. After oxidation, there are still undamaged nanotubes inside the nano-composites, as seen from the SEM image (FIG. 23B) and the TEM image (FIG. 23D). XRD analysis (FIG. 23G) before and after oxidation at 900° C. in air for 1 h reveals the (002) and (101) peaks for hexagonal boron nitride, indicating the presence of BNNTs in both oxidized and un-oxidized samples. The FFT of the selected area (B) of the nanotubes reveals the (002) plane for BNNT (FIG. 23F), also verifying that BNNTs survive in the nanocomposites after oxidation at 900° C., which make the nano-composites thermally stable.

Thermal Conductivity Results at Room Temperature

Figure 24:
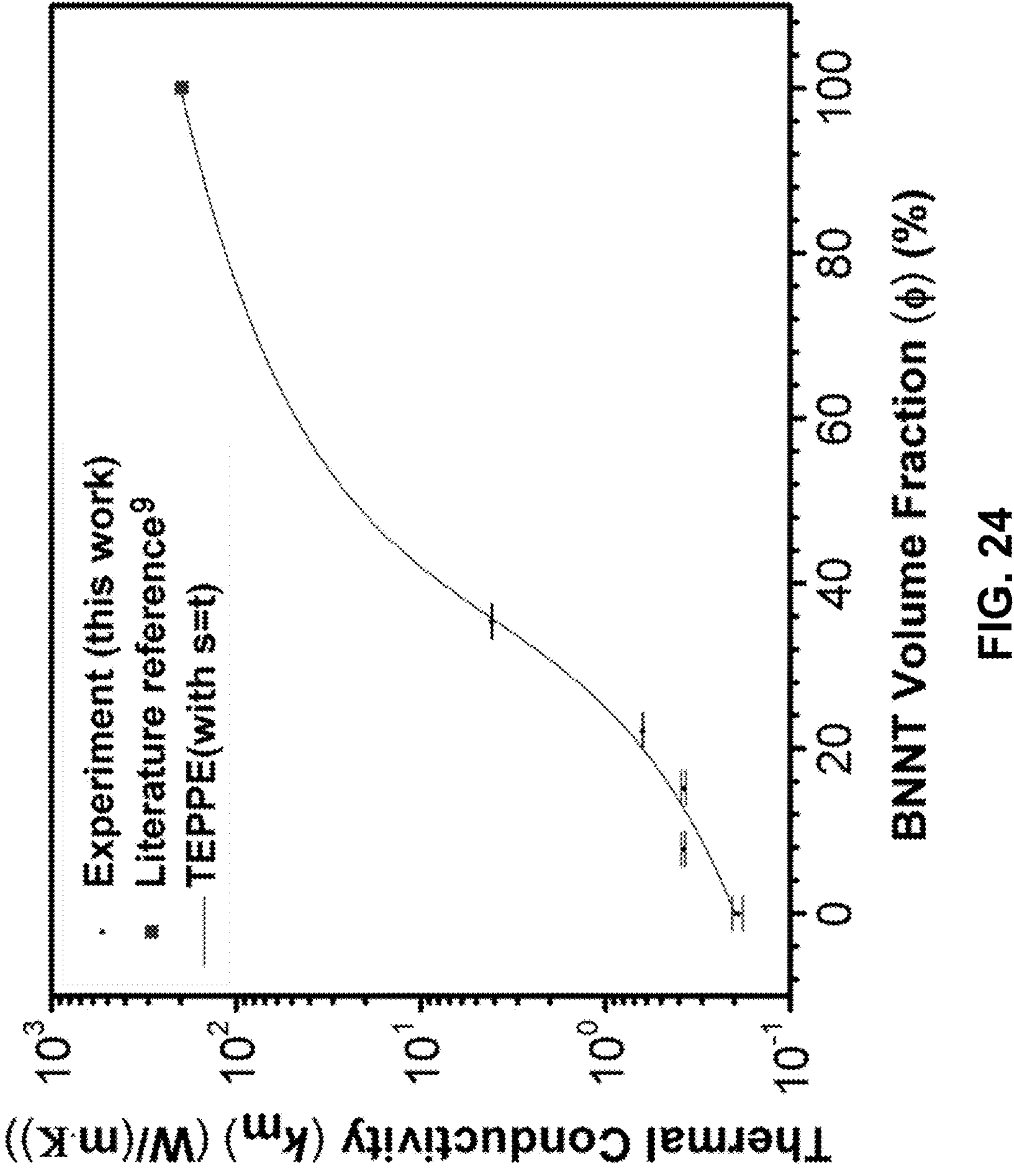
FIG. 24 shows he BNNT-PDC nano-composites fitted to the Single Exponent Phenomenological Percolation Equation (SEPPE). The SEPPE is obtained by putting the same value for the exponents s and t in the Two Exponent Phenomenological Percolation Equation (TEPPE).

The thermal conductivity of the BNNT-PDC nano-composites was studied as a function of volume fraction of BNNTs, which is illustrated in FIG. 24. The thermal conductivity increased with increasing BNNT content. When the volume fraction of BNNTs is low, the thermal conductivity of the BNNT-PDC nano-composites increased slowly with the increase of BNNT content. There is a significant increase in thermal conductivity when the BNNT content is higher than 22.2 vol. %, indicating a percolation transition (FIG. 24).

Figure 25:
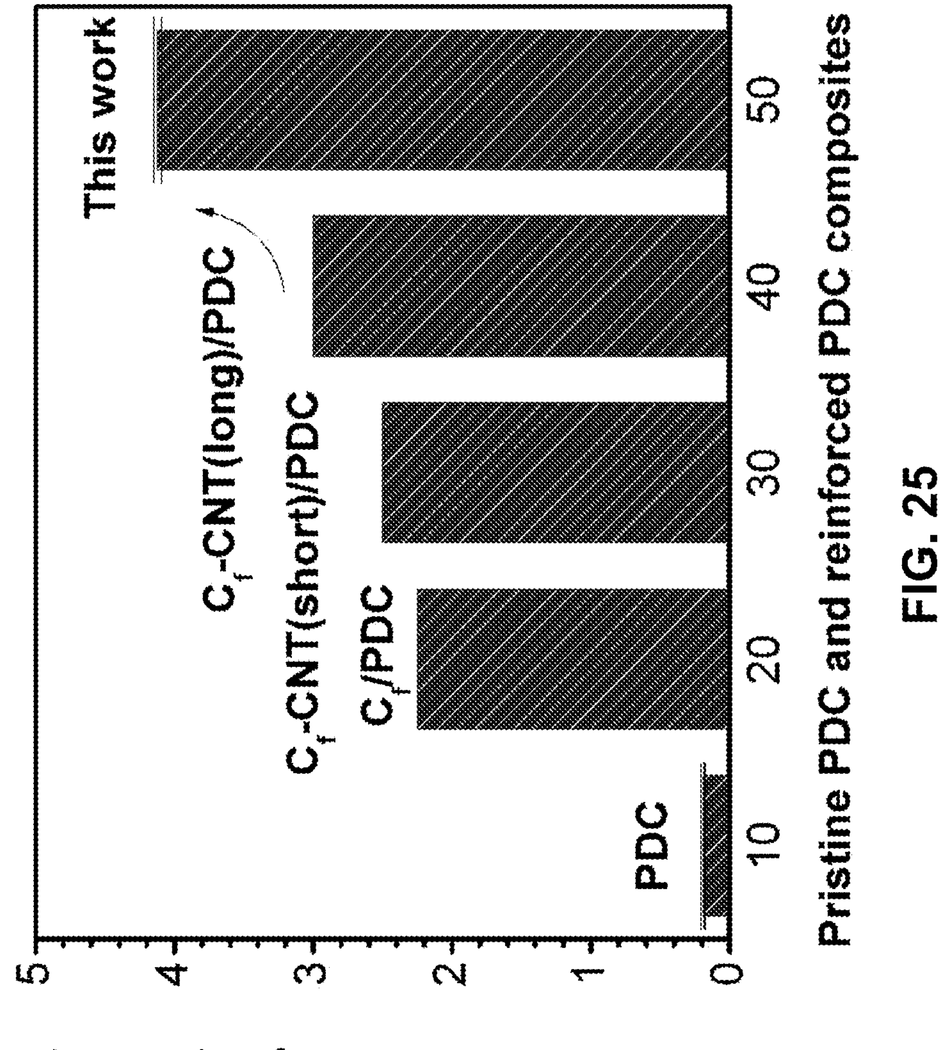
FIG. 25 shows room temperature thermal conductivity of pristine PDC and 35.4 vol. % BNNT-PDC nano-composites reported in this work compared to other PDC composites (45 vol. % $C_f$/PDC, 45 vol. % $C_f$+10 vol. % CNT(short)/PDC, 45 vol. % $C_f$+10 vol. % CNT(long)/PDC).

The thermal conductivity of BNNT-PDC nano-composites (reinforced with 35.4 vol. % BNNT) was measured as 4.123 W/(m·K) at room temperature, which is a 2100% increase compared to that of the pristine PDC, as illustrated in FIG. 25. The BNNT-PDC nano-composites exhibit an improved thermal conductivity than other types of PDC composites reinforced with carbon fiber (Cr) and/or carbon nanotube (CNT) as seen in FIG. 25.

Thermal Conductivity of the BNNT-PDC Nano-Composites at Elevated Temperature

Figure 26A:
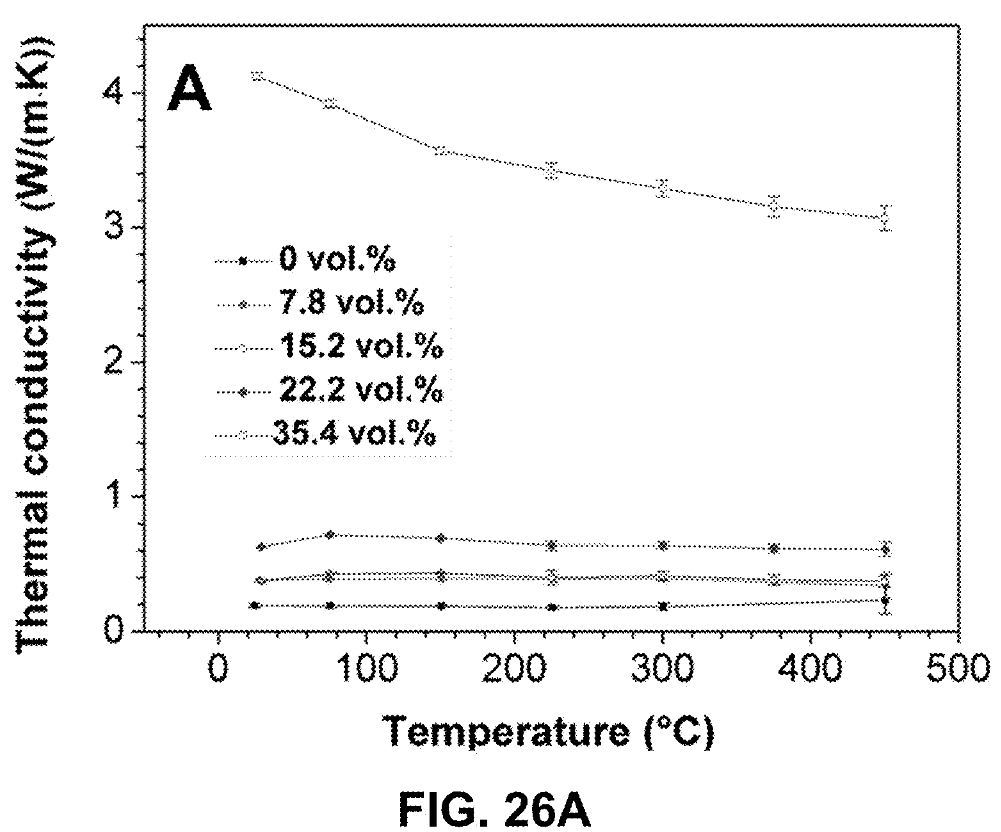
FIGS. 26A-26B show change of thermal conductivity (FIG. 26A) and heat capacity (FIG. 26B) as a function of elevated measurement temperature.

The changes of thermal conductivity as a function of temperature for different BNNT-PDC nano-composites and pristine PDC are illustrated in FIG. 26A. Phonons play an important role in the thermal conduction of the nano-composites. Above room temperature, thermal conduction is mainly affected by phonon-phonon interactions, and phonon scattering by lattice defects, impurities, secondary phases, pores and grain boundaries.

Figure 26B:
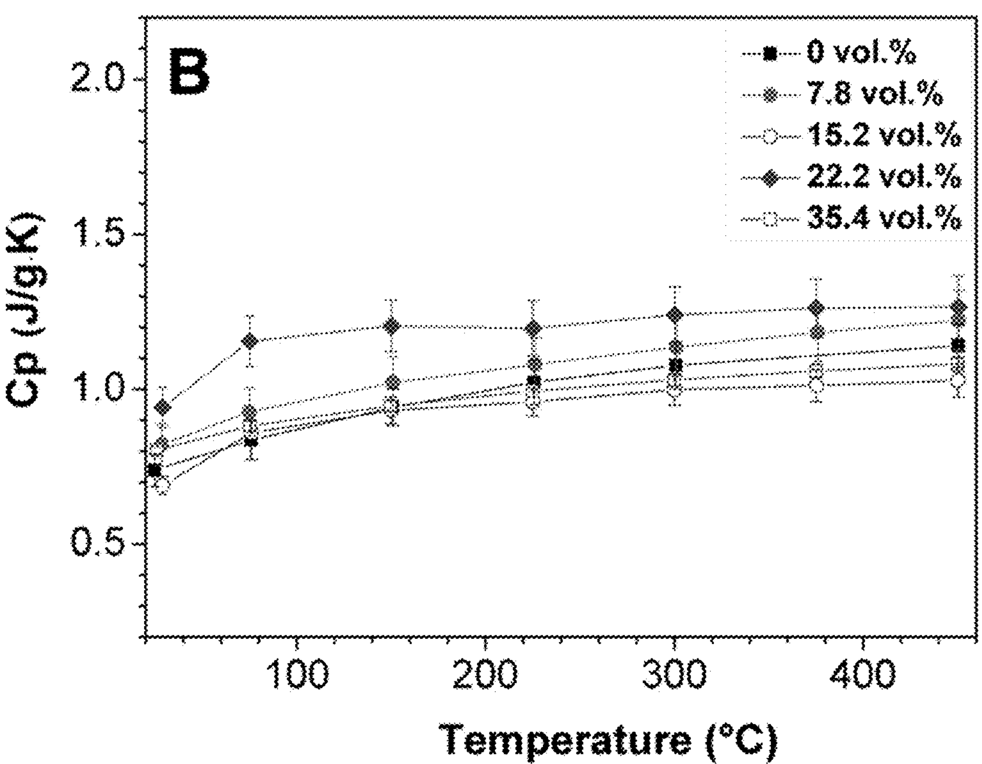

The scattering frequency of phonon increases as the temperature rises. An increase in scattering frequency of phonon will result in a decrease of thermal conductivity of the nano-composites, due to the decease of phonon mean free path. Thermal conductivity k can be expressed by:

$$k = \frac{1}{3}Cvl \tag{19}$$

where C is heat capacity, v is the phonon velocity and l is phonon mean free path. For pristine PDC and PDC with low volume fractions of BNNTs (e.g. volume fraction less than 22.2 vol. %), the thermal conductivity of the nano-composites is low because of the amorphous state of PDC. The lower bound of phonon mean free path is the lattice spacing. The amorphous PDC can be considered to consist of small crystals with a size of several lattice spacing. The value of the phonon mean free path of PDC therefore is within several lattice spacing. Because the PDC is still in an amorphous state under the measuring temperature, the phonon mean free path of PDC cannot be decreased further when the temperature increases, implying that the thermal conductivity of PDC is not sensitive to the temperature change. For the nano-composites with high volume fractions of BNNTs (e.g. 35.4 vol. %), the thermal conductivity decreases significantly when the temperature increases (FIG. 26A). BNNTs are in a nanocrystal state. Their phonon mean free path is estimated to be 40-320 nm at 290 K. At high temperatures, the phonon mean free path of BNNTs will decrease when the temperature rises. The reduction will be within a large range from 40-320 nm to several lattice spacing. Meanwhile, the heat capacity of the BNNT-PDC nano-composites is stabilized at around 1±0.3 J/g·K, as shown in FIG. 26B when the temperature is increased. This means that the decrease in thermal conductivity is mainly induced by the decrease of phonon mean free path of BNNTs when the temperature is increased according to Equation 19. Although the thermal conductivity of the nano-composites reduces with the increase of temperature, the reduction becomes more and more slow as the temperature increases (FIG. 26A), indicating that BNNTs are still effective in improving the thermal conduction of the nano-composites at elevated temperatures.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

REFERENCES

1. Abass M A, et al. Synthesis and electrochemical performance of a polymer-derived silicon oxycarbide/boron nitride nanotube composite. RSC Adv. 2017; 7:21576.
2. Akintola, T. M. et al, Journal of Composites Science, 2021, 5, 61.
3. Al-Jawhari H A, et al. The influence of microwave frequencies at high temperatures on structural properties of h-BN. International Journal of Engineering & Technology. 2011; 11:87-90.
4. An L, et al. Carbon nanotube reinforced polymer derived ceramic composites. Adv Mater. 2004; 16:2036-2040.
5. Bansal N P, et al. Boron nitride nanotubes reinforced glass composites. J Am Ceram Soc. 2006; 89:388-390.
6. Barta J, et al. $Si_3N_4$ and $Si_2N_2O$ for high performance radomes. Mater Sci Eng. 1985; 71:265-272.
7. Bharadwaj L, et al. Oxidation behavior of a fully dense polymer-derived amorphous silicon carbonitride ceramic. J Am Ceram Soc. 2004; 87:483-486.
8. Chen X, et al. Preparation and Electrochemical Hydrogen Storage of Boron Nitride Nanotubes. J Phys Chem B. 2005; 109:11525-11529.
9. Chen X, et al. Quantitative characterization of structural and mechanical properties of boron nitride nanotubes in high temperature environments. Sci Rep-UK. 2017; 7:11388.
10. Chuang, I. S. et al, The Journal of Physical Chemistry B, 1997, 101, 3052-3064.
11. Ciofani G, et al. Small. 2013; 9:1672.
12. Colombo P, et al. Polymer-derived ceramics: 40 years of research and innovation in advanced ceramics. J Am Ceram Soc. 2010; 93:1805-1837.
13. Ding S Q, et al. Oxidation bonding of porous silicon nitride ceramics with high strength and low dielectric constant, Mater Lett. 2007; 61:2277-2 280.
14. Du M, et al. Influence of sintering temperature on microstructure and properties of $SiO_2$ ceramic incorporated with boron nitride nanotubes. Mater Sci Eng A. 2012; 543:271-276.
15. Du M, et al. Microstructure and properties of $SiO_2$ matrix reinforced by BN nanotubes and nanoparticles. J Alloys Compd. 2011; 509:9996-10002.
16. Fathalizadeh A, et al. Scaled synthesis of boron nitride nanotubes, nanoribbons, and nanococoons using direct feedstock injection into an extended-pressure, inductively-coupled thermal plasma. Nano Lett. 2014; 14:4881-4886.
17. Foroutan M, et al. A mini-review on dispersion and functionalization of boron nitride Nanotubes. J Nanostruct Chem. 2019:1-10.
18. Funayama, O. et al, Journal of materials science, 1994, 29, 4883-4888.
19. Golberg D, et al. Boron Nitride Nanotubes and Nanosheets. ACS Nano. 2010; 4:2979-2993.
20. Han W Q, et al. Transformation of $B_xC_yN_z$ nanotubes to pure BN nanotubes. Appl Phys Lett. 2002; 81:1110-1112.
21. He X L, et al. Microstructure and properties of AlN-BN composites prepared by sparking plasma sintering method. J Alloy Compd. 2016; 675:168-173.
22. He X L, et al. Study on microstructure and dielectric properties of aluminum nitride ceramics. Mater Charact. 2015; 106:404-410.
23. Holand, W. et al, Glass-ceramic technology, John Wiley & Sons, 2019.
24. Hong, X. et al, Journal of Electronic Materials, 2016, 45, 453-461.
25. Huang, X. et al, Advanced Functional Materials, 2013, 23, 1824-1831.
26. Hong X H, et al. Strong viscous behavior discovered in nanotube mats, as observed in boron nitride nanotube mats. Compos Part B. 2016; 91:56-64.
27. Huang Q, et al. Enhancing superplasticity of engineering ceramics by introducing BN nanotubes. Nanotechnology. 2007; 18:485706.
28. Huang X Y, et al. Polyhedral Oligosilsesquioxane-Modified Boron Nitride Nanotube Based Epoxy Nanocomposites: An Ideal Dielectric Material with High Thermal Conductivity. Adv Funct Mater. 2013; 23:1824-1831.
29. Jia Y J, et al. Thermal properties of polymer-derived ceramic reinforced with boron nitride nanotubes. J Am Ceram Soc. 2019; 102:7584-7593.
30. Jia, Y. et al, J Am Ceram Soc, 2020, 103, 5731-5742.
31. Jiang T, et al. Making bulk ceramics from polymeric precursors. J Am Ceram Soc. 2010; 93:3017-3019.
32. Jin H Z, et al. Mechanical and dielectric properties of 3D printed highly porous ceramics fabricated via stable and durable gel ink. J Eur Ceram Soc. 2019; 39:4680-4687.
33. Kenion, T. et al, J Eur Ceram Soc, 2022, 42, 1-17.
34. Kim, J. H. et al, Nano Convergence, 2018, 5, 17.
35. Kinashi, K. et al, Journal of Photochemistry and Photobiology A: Chemistry, 2010, 213, 136-140.
36. Kostoglou, N. et al, Nanomaterials, 2020, 10, 2435.
37. Lahiri D, et al. Boron nitride nanotube reinforced hydroxyapatite composite: Mechanical and tribological performance and invitro biocompatibility to osteoblasts. J Mech Behav Biomed. 2011; 4:44-56.
38. Lednor, P. W. et al, Journal of the Chemical Society, Chemical Communications, 1989, 320-321.
39. Li L H, et al. Boron nitride nanotube reinforced polyurethane composites. Progress in Natural Science: Materials International. 2013; 23:170-173.
40. Li, W, et al, J Ceram Soc Jpn, 2014, 122, 688-694.
41. Li, W. G. et al, Journal of Mechanics, 2015, 31, 449-455.
42. Li X, et al. Mechanical and dielectric properties of porous $Si_3N_4$—$SiO_2$ composite ceramics. Mater Sci Eng A. 2009; 500:63-69.
43. Li X, et al. Microstructure and properties of porous $Si_3N_4$ ceramics with a dense surface. Int J Appl Ceram Technol. 2011; 8:627-636.

44. Liao Y L, et al. Adv Funct Mater. 2014; 24:4497-4506.
45. Ligthart, L P. A fast computational technique for accurate permittivity determination using transmission line methods. IEEE Transactions on Microwave Theory and Techniques. 1983; 31:249-254.
46. Lim, S. W. et al, Japanese journal of applied physics, 1996, 35, 1468.
47. Lin S, et al, Mechanical, dielectric properties and thermal shock resistance of porous silicon oxynitride ceramics by gas pressure sintering. Mater Sci Eng A. 2015; 635:1-5.
48. Lin S, et al. Fabrication and properties of porous boron nitride/silicon oxynitride ceramic composites via gas pressure sintering. Mater Des. 2015; 87:272-277.
49. Ma B S, et al. Frequency-dependent conductive behavior of polymer-derived amorphous silicon carbonitride. Acta Mater. 2015; 89:215-224.
50. Ma R, et al. Hydrogen Uptake in Boron Nitride Nanotubes at Room Temperature. J Am Chem Soc. 2002; 124:7672-7673.
51. Ma R Z, et al. Growth, Morphology, and Structure of Boron Nitride Nanotubes. Chem Mater. 2001; 13:2965-2971.
52. Nautiyal, P. et al, Adv Eng Mater, 2016, 18, 1747-1754.
53. Nautiyal, P. et al, Scientific reports, 2016, 6, 1-8.
54. Sharma S, et al. Experimental and molecular dynamics study of boron nitride nanotube-reinforced polymethyl methacrylate composites. J Compos Mater. 2019; 0:1-9.
55. Silva W M, et al. Samarium doped boron nitride nanotubes. Appl Radiat Isot. 2018; 131:30-35.
56. Smith M W, et al. Very long single- and few-walled boron nitride nanotubes via the pressurized vapor/condenser method. Nanotechnology. 2009; 20:505-604.
57. Stabler C, et al. Silicon oxycarbide glasses and glass-ceramics: “All-Rounder” Materials for Advanced Structural and Functional Applications. J Am Ceram Soc. 2018; 101:4817-4856.
58. Sugino T, et al. Synthesis of boron nitride film with low dielectric constant for its application to silicon ultralarge scale integrated semiconductors. Diamond Relat Mater. 2001; 10:1375-1379.
59. Tang, Y, et al, Composites Communications, 2018, 8, 36-41.
60. Terao T, et al. Alignment of Boron Nitride Nanotubes in Polymeric Composite Films for Thermal Conductivity Improvement. J Phys Chem C. 2010; 114:4340-4344.
61. Trivedi S, et al. Evaluations of young’s modulus of boron nitride nanotube reinforced nano-composites. Procedia Materials Science. 2014; 6:1899-1905.
62. Verma V, et al. Elastic moduli of a boron nitride nanotube. Nanotechnology. 2007; 18:435711.
63. Wang, H. et al, Procedia Engineering, 2012, 27, 1222-1227.
64. Wang, K. et al, Langmuir, 2013, 29, 2889-2896.
65. Wang S, et al, Fabrication and characterization of in situ porous $Si_3N_4$—$Si_2N_2O$—BN ceramic. Int J Appl Ceram Technol. 2014; 11: 832-838.
66. Wu X J, et al. Chemical Functionalization of Boron-Nitride Nanotubes with $NH_3$ and Amino Functional Groups. J Am Chem Soc. 2006; 128:12001-12006.
67. Xia, L. et al, Ceram Int, 2018, 44, 14896-14900.
68. Xiang C S, et al. Electromagnetic interference shielding effectiveness of multiwalled carbon nanotube reinforced fused silica composites. Ceram Int. 2007; 33:1293-1297.
69. Xue Y, et al. Aluminum matrix composites reinforced with multi-walled boron nitride nanotubes fabricated by a high-pressure torsion technique. Mater Design. 2015; 88:451-460.
70. Yang J S, et al. High electrical conductivity and anisotropy of aligned carbon nanotube nanocomposites reinforced by silicon carbonitride. Scripta Mater. 2016; 124: 21-25.
71. Yang J S, et al. Strong and ultra-flexible polymer-derived silicon carbonitride nanocomposites by aligned carbon nanotubes. Ceram Int. 2016; 42:13359-13367.
72. Yang J S, et al. Three dimensional-linked carbon fiber-carbon nanotube hybrid structure for enhancing thermal conductivity of silicon carbonitride matrix composites. Carbon. 2016; 108:38-46.
73. Yang, N. et al, Corrosion Science, 2020, 177, 108946.
74. Yang, N. et al, J Am Ceram Soc, 2021.
75. Yang, N. et al, J Eur Ceram Soc, 2019, 39, 4029-4037.
76. Yang, N. et al, Microporous and Mesoporous Materials, 2020, 306, 110477.
77. Yin X W, et al. Electromagnetic properties of Si—C—N based ceramics and composites. Int Mater Rev. 2014; 59:326-355.
78. You G L, et al. Effect of diatomite additive on the mechanical and dielectric properties of porous $SiO_2$—$Si_3N_4$ composite ceramics. Journal of Wuhan University of Technology-Mater Sci Ed. 2016; 31:528-532.
79. Yuan X Y, et al. Influence of temperature on dielectric properties and microwave absorbing performances of TiC nanowires/$SiO_2$ composites. Ceram Int. 2014; 40:15391-15397.
80. Zhang, C. et al, J Eur Ceram Soc, 2021, 41, 7620-7629.
81. Zhang C, et al. Aminopropyltrimethoxysilane-functionalized boron nitride nanotube based epoxy nanocomposites with simultaneous high thermal conductivity and excellent electrical insulation. J Mater Chem A. 2018; 6:20663-20668.
82. Zhao D, et al. BN nanoparticles/$Si_3N_4$ wavetransparent composites with high strength and low dielectric constant. J Nanomater. 2011; 2011:1-5.
83. Zhao Y D, et al. Mechanical deformations of boron nitride nanotubes in crossed junctions. J Appl Phys. 2014; 115: 164305.
84. Zheng M, et al. Radial elasticity of multiwalled boron nitride nanotubes. Nanotechnology. 2012; 23:095703.
85. Zhi C Y, et al. Boron nitride nanotubes: functionalization and composites. J Mater Chem. 2008; 18:3900-3908.
86. Zhi C Y, et al. Characteristics of boron nitride nanotube-polyaniline composites. Angew Chem Int Ed. 2005; 44:7929-7932.
87. Zhi C Y, et al. Dielectric and thermal properties of epoxy/boron nitride nanotube composites. Pure Appl Chem. 2010; 82:2175-2183.
88. Zhi C Y, et al. Specific heat capacity and density of multiwalled boron nitride nanotubes by chemical vapor deposition. Solid State Commu. 2011; 151:183-186.
89. Zhong, B. et al, Nanoscale Res Lett, 2011, 6, 1-8.
90. Zhuang Y L, et al. Fabrication of gel cast BN/$Si_3N_4$ composite ceramics from surface-coated BN powder. Mater Sci Eng A. 2015; 626:27-33.

What is claimed is:

1. A nanocomposite radome material consisting of:

(a) a ceramic material; and (b) boron nitride nanotubes (BNNTs);

wherein the ceramic material has an amorphous structure;

wherein the BNNTs have a crystalline structure;

wherein the BNNTs are embedded in and distributed uniformly in the ceramic material; and wherein the nanocomposite radome material has a porosity of from about 0.5% to about 45% and a density of from about 1.2 to about 2 g/cm$^3$.

2. The nanocomposite radome material of claim 1, wherein the ceramic material comprises SiCN, SiC, SiOC, SiON, or any combination thereof, wherein the ceramic material is optionally doped with a transition metal.

3. The nanocomposite radome material of claim 1, wherein the nanocomposite radome material comprises from about 0.1 wt % to about 90 wt % BNNTs.

4. The nanocomposite radome material of claim 1, wherein the nanocomposite radome material has a real relative permittivity of from about 2 to about 10 over a frequency range of from about 10 MHz to about 100 GHz.

5. The nanocomposite radome material of claim 1, wherein the nanocomposite radome material has an imaginary relative permittivity of from about 0 to about 0.5 over a frequency range of from about 10 MHz to about 100 GHz.

6. The nanocomposite radome material of claim 1, wherein the nanocomposite radome material has a quality factor of from about 10 to about 10000 over a frequency range of from about 10 MHz to about 100 GHz.

7. The nanocomposite radome material of claim 1, wherein the nanocomposite radome material is transparent to electromagnetic radiation.

8. A radome structure comprising the nanocomposite radome material of claim 1.

9. The radome structure of claim 8, wherein the radome structure is a component of a warhead, an aircraft, a spacecraft, a satellite, a protective structure for a stationary antenna, a protective structure for a radar dish, or a nuclear reactor.

10. A method for making the nanocomposite radome material of claim 1, the method comprising:

(a) admixing a pulverized ceramic precursor with a source of boron nitride nanotubes (BNNTs) to form a first composition;

(b) compressing the first composition to form a solid material; and (c) pyrolyzing the solid material to form a nanocomposite radome material;

wherein pyrolyzing the solid material produces a ceramic material from the ceramic precursor.

11. The method of claim 10, wherein the pulverized ceramic precursor comprises a polysilazane, a polysiloxane, a polycarbosilane, a polysilylcarbodiimide, a polycarbosiloxane, a perhydropolysilazane, or any combination thereof, wherein the ceramic precursor is optionally doped with a transition metal.

12. The method of claim 10, further comprising curing the pulverized ceramic precursor at a temperature of from about room temperature to about 350° C. prior to step (a).

13. The method of claim 10, wherein the solid material is pyrolyzed at a temperature of from about room temperature to about 2200° C.

14. A method for making the nanocomposite radome material of claim 1, the method comprising:

(a) preparing a solution of boron nitride nanotubes (BNNTs);

(b) drying the solution of BNNTs to create a mat;

(c) infiltrating the mat with a liquid ceramic precursor to form an infiltrated mat; and pyrolyzing the infiltrated mat.

15. The method of claim 14, further comprising infiltrating a sheet of carbon fiber with the solution of BNNTs prior to step (b), and wherein the mat comprises the BNNTs and the sheet of carbon fiber.

16. The method of claim 14, further comprising curing the infiltrated mat at a temperature of from about room temperature to about 350° C. prior to step (d).

17. The method of claim 14, wherein the liquid ceramic precursor comprises a polysilazane, a polysiloxane, a polycarbosilane, a polysilylcarbodiimide, a polycarbosiloxane, a perhydropolysilazane, or any combination thereof, wherein the ceramic precursor is optionally doped with a transition metal.

18. The nanocomposite radome material of claim 1, wherein the nanocomposite radome material is made by a method comprising:

(a) admixing a pulverized ceramic precursor with a source of boron nitride nanotubes (BNNTs) to form a first composition;

(b) compressing the first composition to form a solid material; and (c) pyrolyzing the solid material to form a nanocomposite radome material;

wherein pyrolyzing the solid material produces the ceramic material from the ceramic precursor and incorporates the BNNTs from the source of BNNTs into the nanocomposite material; and wherein the pulverized ceramic precursor comprises a polysilazane, a polysiloxane, a polycarbosilane, a polysilylcarbodiimide, a polycarbosiloxane, a perhydropolysilazane, or any combination thereof.

19. The nanocomposite radome material of claim 1, wherein the BNNTs have a diameter of less than about 5 nm and a length greater than about 5 μm.

* * * * *